US 12,478,404 B2

(12) United States Patent
Goldsmith

(10) Patent No.: US 12,478,404 B2
(45) Date of Patent: Nov. 25, 2025

(54) STAY INSERTION TOOLS

(71) Applicant: David S. Goldsmith, Atlanta, GA (US)

(72) Inventor: David S. Goldsmith, Atlanta, GA (US)

(*) Notice: Subject to any disclaimer, the term of this patent is extended or adjusted under 35 U.S.C. 154(b) by 506 days.

(21) Appl. No.: 17/965,073

(22) Filed: Oct. 13, 2022

(65) Prior Publication Data
US 2023/0172633 A1 Jun. 8, 2023

Related U.S. Application Data

(63) Continuation-in-part of application No. 17/865,025, filed on Jul. 14, 2022, which is a continuation-in-part of application No. 15/932,172, filed on Feb. 14, 2018, now Pat. No. 11,389,171, which is a continuation-in-part of application No. 13/694,835, filed on Jan. 9, 2013, now abandoned, which is a continuation-in-part of application No. 11/986,021, filed on Nov. 19, 2007, now abandoned.

(60) Provisional application No. 60/860,392, filed on Nov. 21, 2006.

(51) Int. Cl.
*A61B 17/34* (2006.01)

(52) U.S. Cl.
CPC ...... *A61B 17/3423* (2013.01); *A61B 17/3468* (2013.01)

(58) Field of Classification Search
CPC ...... A61F 2/06; A61F 2/82; A61F 2/90; A61F 2/91; A61F 2/848; A61F 2002/821; A61F 2002/823; A61F 2002/825; A61F 2002/826; A61F 2002/828; A61F 2002/8483; A61F 2002/8486; A61B 17/12118; A61B 17/00491; A61B 17/0057; A61B 17/12181; A61B 17/3468
See application file for complete search history.

(56) References Cited

U.S. PATENT DOCUMENTS

| | | | | |
|---|---|---|---|---|
| 5,601,572 A | * | 2/1997 | Middleman | A61B 18/082 606/139 |
| 6,248,116 B1 | * | 6/2001 | Chevillon | A61B 17/064 606/139 |
| 2002/0173786 A1 | * | 11/2002 | Kortenbach | A61B 10/06 606/49 |

(Continued)

*Primary Examiner* — Tuan V Nguyen
(74) *Attorney, Agent, or Firm* — Meunier Carlin & Curfman LLC

(57) ABSTRACT

Described are surgical hand tools to facilitate the proper implantation beneath the outer layer of ductus to include vessels, the trachea, esophagus, and ureters, as well as glands, organs, or other tissue of medicinal, magnetically susceptible, magnetized, and/or radiation-emitting stays, or ribs—arcuate bands sized in proportion to the substrate structure which incorporate substances for implantation toward the surface of the substrate. Stay insertion tools allow access to and expedite stay insertion into deeper tissue through a small, or 'keyhole' incision at the body surface, eliminating the need for more extensive incision, reducing procedural duration, and can coat each stay with medication and/or an adhesive as each is ejected. Susceptible and magnetized stays allow extraluminal stenting, which avoids the lumen, allowing the in situ treatment of a ductus which malacotic, infected, or otherwise diseased, would likely incur incisions, perforations, and/or abrasions during transluminal treatment.

6 Claims, 5 Drawing Sheets

(56) References Cited

U.S. PATENT DOCUMENTS

2008/0195146 A1\* 8/2008 Wardle ............ A61B 17/06109
606/1

\* cited by examiner

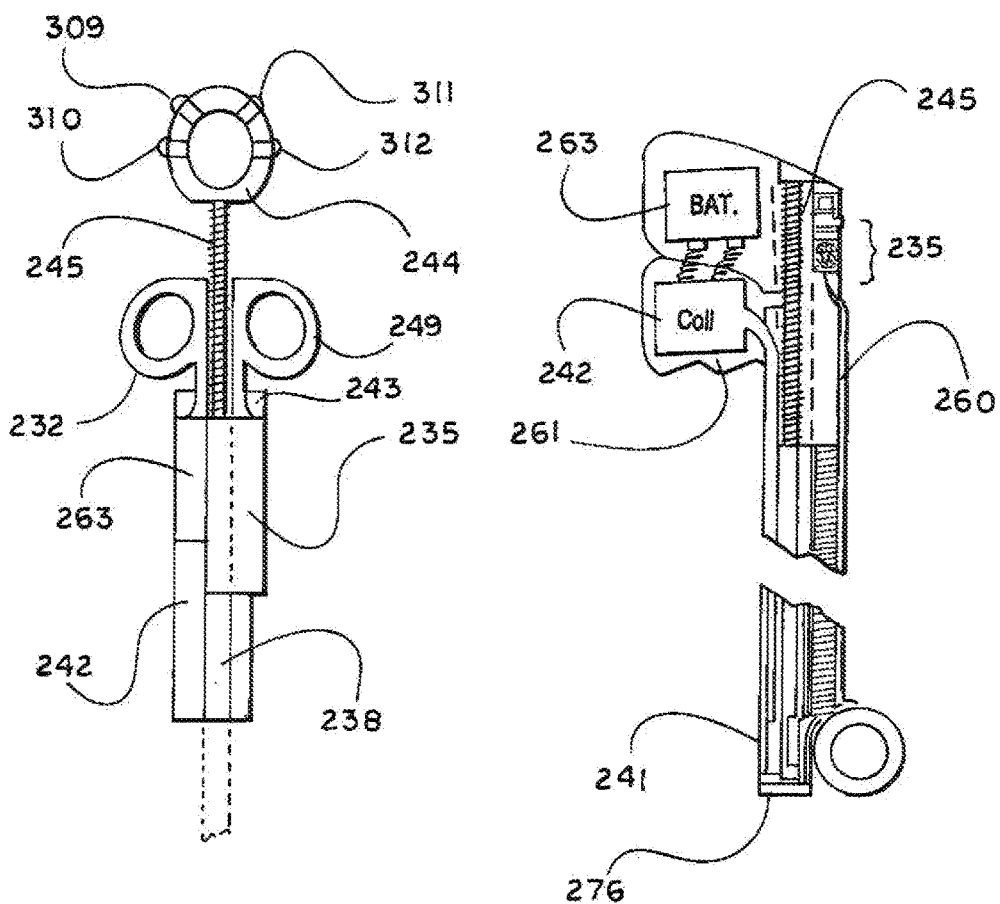
Fig.3
Fig.4
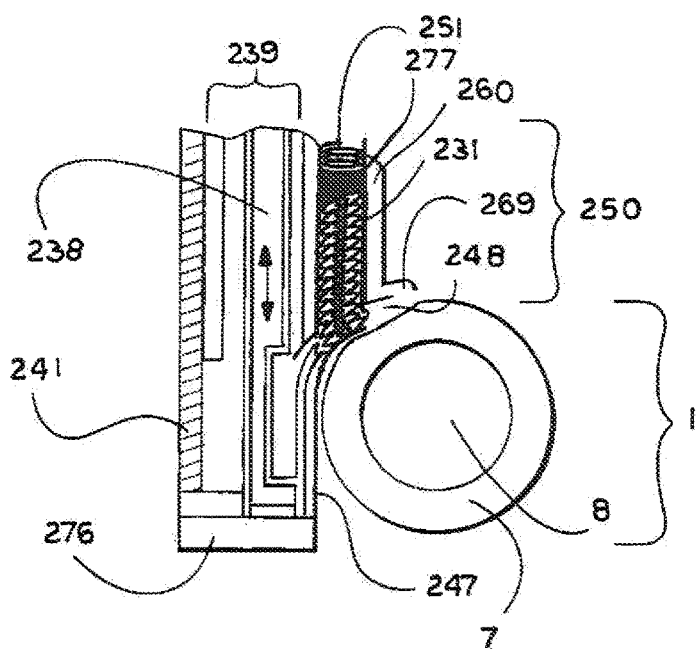
Fig.5

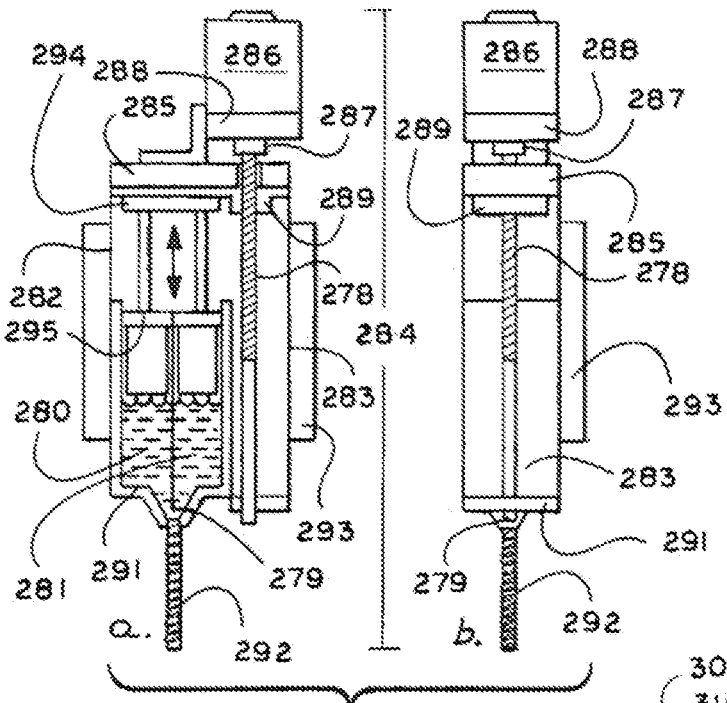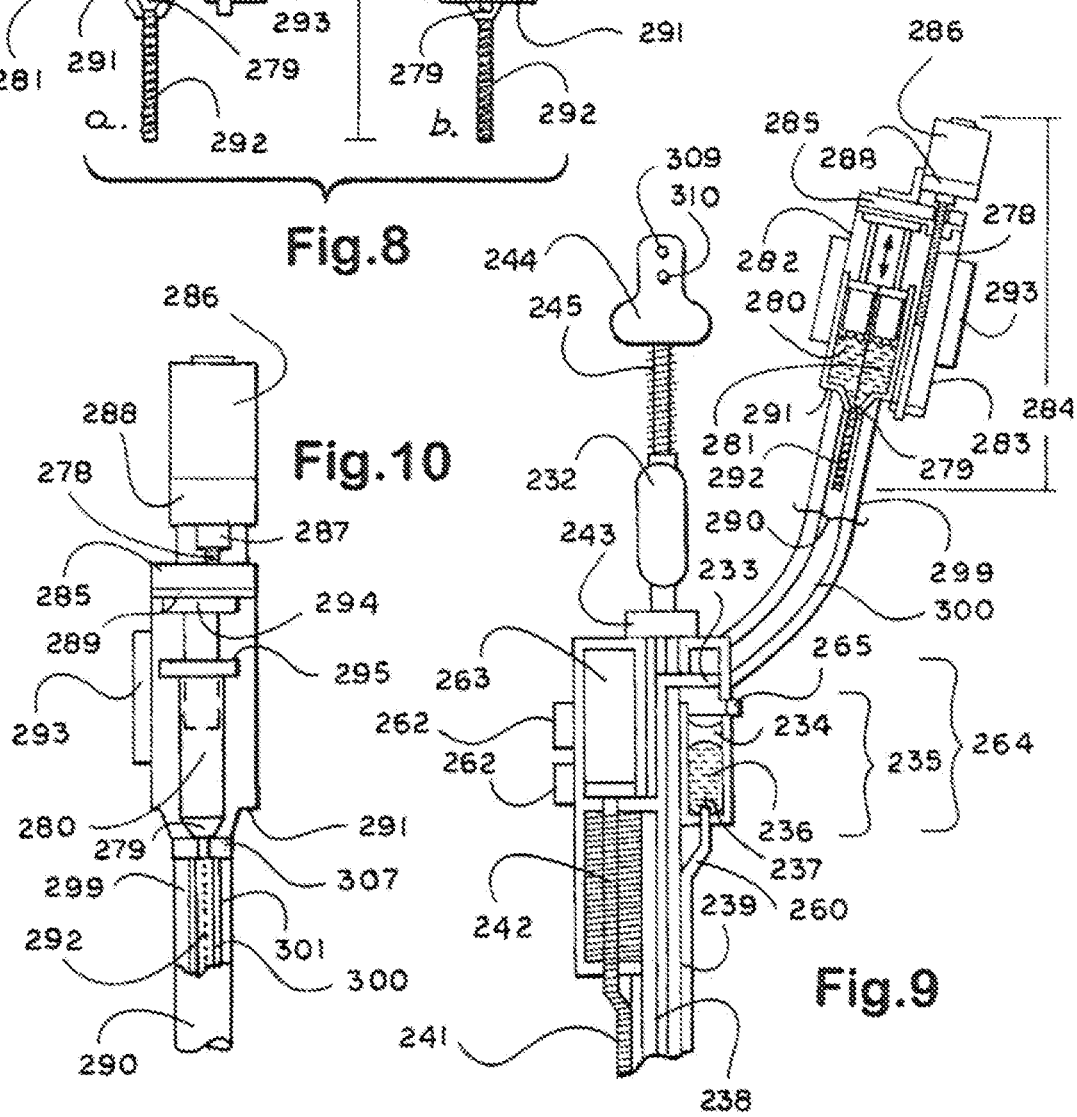

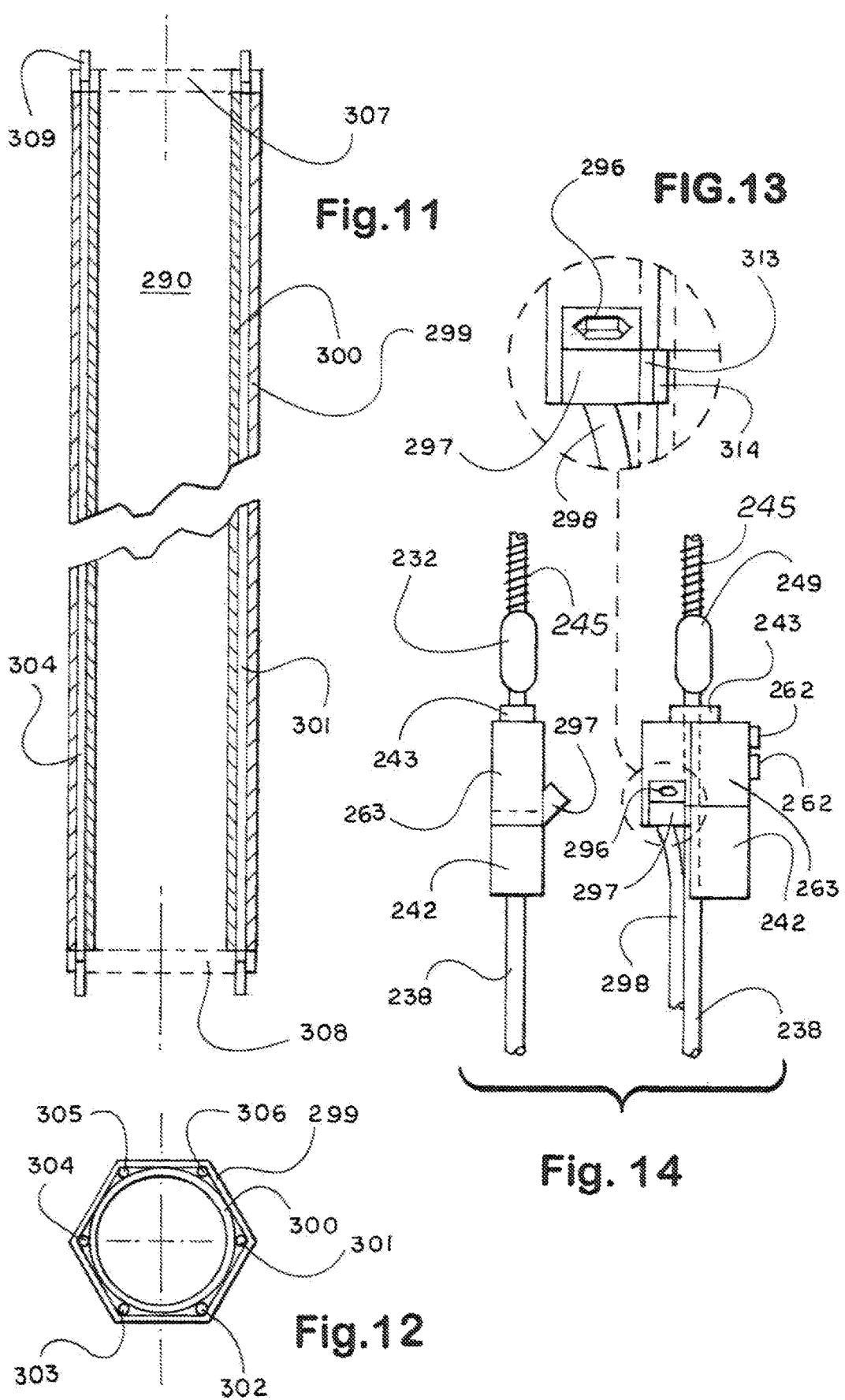

STAY INSERTION TOOLS

RELATED U.S. APPLICATION DATA

This application is a continuation-in-part of U.S. application Ser. No. 17/865,025, filed on Jul. 14, 2022, which is a continuation-in-part of U.S. application Ser. No. 15/932,172, filed on Feb. 14, 2018, now U.S. Pat. No. 11,389,171, which is a continuation-in-part of U.S. application Ser. No. 13/694,835, filed on Jan. 9, 2013, which is a continuation-in-part of U.S. application Ser. No. 11/986,021, filed on Nov. 19, 2007, which claims the benefit of U.S. Provisional Application No. 60/860,392, filed on Nov. 21, 2006, applications which are incorporated herein by reference in their entireties.

BACKGROUND OF THE INVENTION

1. Field of the Invention

This divisional application concerns stay insertion tools, also referable to as stay inserters, stay injectors, or subadventitial stay injectors, which apparatus is intended for use by veterinary specialists, pulmonologists, gastroenterologists, urologists, endourologists, nephrologists, hepatologists, interventional radiologists, and cardiologists, internists, gynecologists, and general, endocrine, oncological, cardiovascular, cardiothoracic, pediatric cardiac, and neurosurgeons to infix tissue, organ, or ductus-intramural implants called stays, or small broad bands of solid medication and/or magnetically susceptible and/or radioactive matter beneath the outer or adventitial layer or tunic.

2. Subadventitial Implants, or Stays

Implanted beneath the surface of any anatomical structure, radiation emitting stays can, for example, be used to treat a lesion by direct insertion therein—much as low dose-rate radiation emitting 'seeds' placed to destroy malignant cells are infixed within the prostate gland—with anti-inflammatory-releasing stays positioned nearby thereto. This divisional application is submitted pursuant to nonprovisional parent application Ser. No. 15/932,172, entitled Integrated System 8 for the Infixion and Retrieval of Implants, as concerns subadventitially placed broad band-type ductus-intramural implants, or stays, and the means for their insertion. However, stays can incorporate not just radiation emitting but any kind of medicinal substance to include anti-inflammatory, antimicrobial, and/o chemotherapeutic, and generally contain sufficient magnetically susceptible material to allow their extraction and recovery.

Ductus and organ subadventitial intramural implants are of two kinds—stays and spherules, or miniballs. Usually magnetically susceptible, bands referred to as stays, or broad stays, are sized in proportion to the substrate ductus. To prevent incisions at their ends or extraction, stays for insertion in a tubular anatomical structure, or ductus, such as a vessel, the trachea, esophagus, or a ureter, are arcuate, or bowed toward concentricity with the substrate ductus. Concentricity also prevents the forward, or distal tip of a stay from penetrating into the subjacent lumen, although the stay insertion tool incorporates a magnet to retrieve a stay that does penetrate.

As shown in FIG. 1, to provide a high degree of magnetic susceptibility, susceptible stays are elliptical and somewhat thicker at the center, those tractive having magnetization normal to their major axis concentrated there. The applications of stays are not properly separable from their relation to the use of barrel-assemblies and radial projection catheters as described in the parent application. This a divisional application, for more thorough and detailed information concerning the subject matter addressed, see parent application Ser. No. 15/932,172, entitled Integrated System for the Infixion and Retrieval of Implants.

To preclude tunical or tissue layer delamination under tractive force when used for extraluminal stenting, stay insertion tools incorporate means for laying down a surgical grade adhesive such a cyanoacrylate cement to each stay as it is ejected to bond each to the tissue investing it until a fibrous capsule is formed. The adhesive also incorporates a topical anesthetic to suppress initial discomfort which once formed, the fibrous capsule should dispel. Stays can always be placed one a. a time with the aid of a surgical pliers, but an injector allows rapid and secure positioning as well as provides means for the coating of stays. The facility lent allows the completion of a procedure in less time. Injectors also incorporate an extraction electromagnet to retrieve a stay that for any reason had been mispositioned and can mount a scope with lamp, for example.

Especially if coated with cyanoacrylate cement, for example, due to their flatter profile, broad, or wide, stays are far less susceptible to perforation, pull-through, or delamination, that is, separation of the adventitia from the subjacent tissue would be spherules, or miniballs. Most if not all adhesives eventually broken down by enzymatic and hydrolytic action, that an initial coating of cement is gradually eliminated only means that it has served its purpose, since after a brief period following insertion the stay becomes encapsulated and thus stabilized within a fibrous layer, truncating an initial period of foreign body irritation suppressed with the aid of immunosuppressives.

In some cases, stays can maintain patency without perivascular traction. When the need for traction is unclear, a stay with susceptible content is inserted to see whether the patency established is adequate. Giving stays a textured surface encourages infiltration into the stay of the fibrous capsule, positionally stabilizing each stay, isolating it from nervelet endings that would generate discomfort, and—especially if bonded in place with protein solder, for example—reducing susceptibility to delamination of the outer tunic under tractive force or the constant passage of the pulse. In general, the larger surface area of the stay allows more bonding agent and superior adhesion.

Parent application Ser. No. 15/932,172, entitled Integrated System for the Infixion and Retrieval of Implants, addresses the use of partially and completely absorbable stays, as well as stays coated with a heat-activated (-melted, -denatured) tissue adhesive strengthener or hardener, or binder-fixative and stays coated with a solid protein solder coating with or without cyanoacrylate cement. Upon dissolution, absorbable stays can release or elute medication. Stays can be internally layered to include multiple drugs such as neodymium, anti-inflammatory, and antimicrobial.

Used to insert stays close to the surface of the target tissue, such means are completely different than the needles used to infix radiation emitting seeds within the prostate gland, for example. Both stays and miniballs constitute ductus-intramural implants, but placed more toward the surface, stays are more precisely referred to as subadventitial. Both afford more compliance in expanding with the passing pulse or peristaltic wave than do endoluminal stents.

As might be used to reduce and stop the expansion of rather than apply 'watchful waiting' to an incipient abdominal aortic aneurysm, reverse magnetization of the stays in relation to the surrounding magnets makes it possible to urge inward, or compress, rather than expand, the target lumen without the placement of a surrounding bandage, for example, likely to result in injury to the substrate vessel (see, for example, Concannon, J., Moerman, K. M., Hynes, N. Sultan, S. and McGarry J. P. 2021. "Influence of Shape-memory Stent Grafts on Local Aortic Compliance," *Biomechanics and Modeling in Mechanobiology* 20(6):2373-2392; Kizilski, S. B., Coletti, F., Faizer R., and Barocas, V. H. 2020. "Evaluating the Effect of a Compliant Stent-graft Prototype on Effectiveness of Stiffness in a Cadaveric Aorta," *Journal of Clinical and Translation Science* 4(Supplement 1):7; Guan, Y., Wang, L., Lin, J., and King, M. W. 2016. "Compliance Study of Endovascular stent Grafts Incorporated with Polyester and Polyurethane Graft Materials in Both Stented and Unstented Zones," *Materials* (Basel, Switzerland) 9(8):658).

For such a compressive application, the stays are inserted with the arc contrary to the concentricity of the substrate structure. The compliance of a tractive stay-implanted esophageal stricture, for example, is less likely to result in odonophagia, much less dysphagia. When only a few stays are to be inserted, the operator can manually insert each with a nonlocking forceps or surgical pliers. However, to position each of several arcuate stays to the proper depth with the concentricity prescribed into the wall of a substrate ductus, for example, is likely to require repeated insertions and retractions of which the result will be to disrupt the integrity of the tissue to be implanted and thus necessitate a less than optimal repositioning of the stays.

Given the considerable potential of stays for implementing a wide array of therapeutic processes alone or as adjuvant as tightly targeted, avoiding systemic dispersal with its susceptibility for adverse side effects, this mechanical hindrance which is easily capable of discouraging the use of stays, would best be dispelled. Many applications for stays requiring that numerous stays with the same of different composition be positioned in a train along the substrate tissue, typically a ductus, the potential benefits in the use of stays is best encouraged by providing a new type surgical hand tool designed to facilitate the placement of stays positionally where the time needed from one to the next is slight. Accordingly, the practical implementation. of stays without limitation to applications that call for a very few requires a tool to facilitate their proper insertion.

While the ideal positioning of stays requires both clinical judgment and skill and therefore cannot simply be relegated to the design of an insertion tool, the desiderata for good placement can be reduced to pressing down on the tool to achieve the proper depth and angling the tool to achieve concentric placement. In this, the design of the tool supports the ability to reach farther along a ductus through a small incision by providing an ejection head that can pivot. Entering through a short, laparoscopic, or 'keyhole' incision at the body surface, a stay insertion tool with pivot head can maintain a right angle relation to the ductus over a short segment of the ductus at shallow depths.

Otherwise, unless the length of the segment to be affected is small or the ductus can be pulled up to and shifted sideways beneath the entry incision, stays might necessitate an incision longer than would be required to insert a magnetized periductal collar, or stent jacket were such sought. As shown in FIG. 2, the overall length of a stay insertion tool allows considerable angling through the small access incision to reach farther antegrade and retrograde spots, which the pivoting head of the tool increases. When access to the target ductus from outside it would require much dissection, miniballs, delivered from within the lumen can access a vessel, for example, that plunges to a significant depth.

The conformation and mass of stays is more efficient from the standpoint of providing for a higher flux density through the magnetic circuit allowing the use of lower field strengths and therefore lighter and less obtrusive magnets less likely to cause discomfort. Stay susceptibility is easily increased by incorporating silicon soft iron or neodymium iron boron, which if necessary, can completely constitute the stay, except that toxic, magnetic material must be contained by encapsulation. Due to their conformation, stays incorporating neodymium iron boron content provide greater tractive susceptibility than would the equivalent mass of susceptible spherules, or miniballs.

According to the orientation of the surrounding tractive magnets or magnetized perivascular collar, or stent-jacket, can be used to maintain, dilate, or reduce, that is, to narrow the substrate lumen. The latter infrequent, such serves to truncate further enlargement in an incipient aneurysm, for example. The soft iron content of stays is too slight to induce a condition of iron overload or hemochromatosis; however, the use of an inordinate number should use encapsulated stays.

Where magnetic stent circuit leakage flux (flux leakage, flux spillover) is essential to attract drug carrier bonded nanoparticles from the passing blood, stays can project greater tractive force and are generally preferable to miniballs. Impasse jackets and the extraction of susceptible carrier bound substances from the passing blood is addressed in copending application Ser. No. 15/932,172, entitled Integrated System for the Infixion and Retrieval of Implants. The deliberate introduction of pits or rust into miniballs used to both stent and attract magnetic drug carrier particles thereby to produce leakage flux is considered self-evident to those skilled in magnetic circuitry.

In such use, the strength of the ductus wall must be confirmed as capable of sustaining the tractive force used for stenting before drug attraction as an attendant or ancillary use can be considered. While stays might be inserted with a forceps manually one at time, a stay injector allows a superior placement at far greater speed. As apprehended by the operator, the ejection head is pressed down to insert each tractive stay to a depth proportional to the tractive force to be applied. While the parent application provides for a calibrated thumb-shaft return-spring screw adjustment in the stay insertion tool, operator intuition is probably just as good as well as free of charge.

The stay insertion tool is designed to prevent the entry of a stay into the lumen, and is so weighted and configured that the operator must intentionally apply downward force in excess of the passive weight of the tool on the ductus to obtain a greater depth of insertion. This also expedites stay insertion by stabilizing the adventitia under the injector head despite the pulse. Stays are infixed from outside the substrate organ, gland, or vessel through the adventitia to a depth sufficient to preclude extraction due to the tractive force and will usually be coated with a medication to include at least a topical anesthetic.

A stay injector incorporates a recovery electromagnet, part number 242 in the drawing figures to allow a misinserted stay to be withdrawn immediately. Insertion from outside an artery known to harbor nonvulnerable plaque retained by a calcified cap avoids the risk for rupture and thromboembolism were a miniball to break through the cap. For this reason, the placement of miniballs is best preceded by imaging means such as intravascular ultrasound to identify any vulnerable plaques calcified or not. Unlike miniball insertion, stay insertion cannot be combined with an angioplasty as a review of the means provided in parent application Ser. No. 15/932,172 will make clear.

As in brachytherapy, the precise placement of radiation-emitting, medicinal, and/or magnetically susceptible stays is inherently location-targeted and therefore without the lack of focus involved in systemic administration obtained with oral or intramuscular injection or venous infusion, for example. To treat a ductus that exhibits frequent differences in pathology and strength from one segment to the next, each stay can differ in any or all of its constituents and attributes. When perivascular fat, an attachment, or an adhesion can be resected expeditiously without significant injury to allow insertion, stays can be used. Otherwise, stays are avoided in favor of miniballs, which inserted from within the lumen, avoid having to deal with perivascular obstacles.

Not requiring traction, purely medicinal implants are preferably individual or multiple miniballs placed from within the lumen. That is, inserted through the integument, stays unlike miniballs—which delivered transluminally are generally preferable purely to target medication—are seldom purely medicinal but primarily traction-susceptible, but will almost always include an outer layer of medication to include a topical anesthetic such as tetracaine hydrochloride or lidocaine to suppress any significant discomfort (see, for example, (Lee, H.-S. 2016. "Recent Advances in Topical Anesthesia," *Journal of Dental Anesthesia and Pain Medicine* 16(4):237-244, section 2. Tetracaine Hydrochloride) (see also Mundiya, J. and Woodbine, E. 2022. "Updates on Topical and Local Anesthesia Agents," *Oral and Maxillofacial Surgery Clinics of North America* 34(1):147-155.)

Inserted from outside the ductus, purely medicinal stays are usually limited to use in an open surgical field or where tractive stays are essential. Then to position anti-inflammatory medicinal stays antegrade and retrograde in relation to one or more radiation-emitting stays, for example, would be used. More generally, adjacent stays can be the same in size, shape, and composition, or can differ in these regards. Unless risking excessive dissection to gain access to the adventitia, in which case miniballs should be used, applications that require both traction and medication, such as an esophageal stricture caused by gastroesophageal reflux (see, for example, Desai, J. P. and Moustarah, F. 2021. "Esophageal Stricture," Treasure Island, Florida: StatPearls Publishing Online), are dealt with using stays both medicinal and tractive.

While an excessive amount of perivascular fat may interfere with normal blood gas exchange, nutritive, and endothelial function, a small amount is beneficial. For this reason, should the placement of stays necessitate the imposition of excessive damage to perivascular fat, it is better to use miniballs. When used with a tractive perivascular collar, or stent-jacket, excessive fat is trimmed away. Prospective benefit relative to risk the deciding basis, attachments such as omental or mesenteric are seldom so vulnerable that the small interruptions needed to allow stays to be inserted would prove problematic. Stays can be coated with or consist not only of medication and/or other therapeutic substances, but can be absorbable to release the medication or nonabsorbable.

Stays, especially those larger, can incorporate radioactive seeds, telemetric sensors, or resonant circuits, for example (see, for example, Ferguson, J. E. and Redish, A. D. 2011, Op cit.). The alternative type ductus-intramural implants, small spherules, or miniballs, are transluminally placed from within the lumen aeroballistically, eliminating the need for access through the integument. Not subject to the extractive force of a magnetic field and not requiring a conformation that imparts tractive efficiency, purely medicinal implants can always be spherical and therefore introduced from within the lumen without incisive access from outside the target structure. Consecutive stays in a train thereof can incorporate different content. Stays can be used in combination with ballistic implantation to treat only certain segments of a ductus for which ballistic implantation is contraindicated. Where extraductal access dropped off, a ductus that plunges into deeper tissue can continue to be implanted transluminally.

The better to resist extraction by the tractive force, when implanted within the wall of a vessel or other tubular anatomical structure to serve as an extraluminal stent in cooperation with an extravascular magnet or stent-jacket, miniballs are inserted to the greater depth inherent in endoluminal insertion and in a sufficient number to distribute the tractive force and thus extend the tissue drawn and minimize the risk of extraction. For this reason, tractive intramural implants are almost always laid down in a train as the stays shown in FIG. 1. In contrast, unless the dose would better be divided among two or more implants, medicinal implants can be singular.

When paired with one or more permanent magnets—which unlike electromagnets, are inherently tractive—mounted upon and affixed by means of nonjacketing side-entry connectors to the superficial fascia and to a small depth into the subjacent skeletal muscle—stays can incorporate high soft iron and silicon content. Nonjacketing side-entry connectors are fully described and illustrated in U.S. Pat. No. 11,013,858. Portative rather than tractive, when paired with one or more electromagnets mounted the same way, stays incorporate silicon-iron for its greater magnetic susceptibility.

For sufficient tractive force when necessary, as when stays used to treat tracheal collapse in a small dog are to be drawn toward one or more small permanent magnets attached to the superficial fascia at the back of the neck for example, the material incorporated is neodymium iron boron. That method for keeping the tracheal roof from dropping down into the lumen is considerably less traumatizing to the already impaired patient than is the conventional surgical procedure.

Rather than entry through a long incision, the stay injector is inserted through a small 'keyhole' incision. Never requiring a general anesthetic during placement, the anchoring needles of the nonjacketing side-entry connector or connectors as well as the implants themselves are coated with a surgical grade cyanoacrylate cement during ejection and additionally wetted with a topical anesthetic, typically a 0.15% solution of tetracaine hydrochloride, or lidocaine, the latter mostly rubbed off onto the adjacent tissue giving access thereto of the adhesive.

As described and illustrated in parent application Ser. No. 15/932,172, entitled Integrated System for the Infixion and Retrieval of Implants, depending upon the facility with which the substrate ductus—blood vessel, esophagus, gut, or trachea—can be encircled, both stays and miniballs can also be paired with a local permanently magnetized periductal, or perivascular collar, or stent-jacket, or a perivascular collar mounting tiny neodymium iron boron permanent magnets. Toxic, for use within the body, neodymium iron boron magnets must be encapsulated within a containing coating, any medication, adhesive, and anesthetic then applied over this outer covering. Stent jackets incorporate multiple features to prevent the atherogenic (atherogenous) degradation of the subjacent adventitia of the substrate ductus.

An advantage with both stays and miniballs is the complete avoidance of any presence within the lumen—stays even during placement and miniballs following placement. Endoluminal, or intraluminal, arterial stents may eventually become incorporated into the arterial wall, but intraluminal placement can affect the luminal diameter to limit the caliber of a substrate artery. The smallest arteries if obstructed will usually generate the development of collateral circulation, but those slightly larger may not have the redundancy to remain obstructed without ischemic consequence while at the same time being too small to allow the placement of an intraluminal stent.

Stays are inserted into the wall of the ductus from outside and can consist of or include medication, an irradiating seed, and/or ferromagnetic material for the radially outward retraction of the ductus wall by a tractive perivascular collar, or stent-jacket. Since neither stays nor the placement of stays require entry into the lumen, stays are preferable when contact with the interior surface of the wall surrounding the lumen would best be avoided. Significantly, this includes elimination of the need to transcatherically pass through the lumen despite the presence of small radius of curvature bends and tortuous stretches which pose the risk of injury by abrasion, incision, or perforation with the consequent development of scar tissue. Conventional endoluminal stents may become overgrown, or 'skinned over,' by the endothelium, but if projecting into the lumen might still prompt the formation of thrombus.

The use of stays thus avoids penetration through the intima, leaves no internal abrasions or injury as might prompt thrombosis or become irritated much less infected, opening the possibility, albeit highly improbable with miniballs, for these subintimal implants to escape into the lumen. Extravascular, stays do not interfere with transcatheteric passage to perform an angioplasty or for any other purpose. Exclusively extraluminal stenting with tractive stays, especially of secretory ducts such as the gastroduodenal or bile duct, is less likely to result in clogging than either intraluminal stenting with a conventional stent, or extraluminal stenting where the insertion of miniballs is transcatheteric.

When in order to maintain luminal patency or expansion, a magnetized perivascular collar, or stent-jacket, or remote magnets are to be used for extraluminal stenting, that is, for outward traction without preliminary luminal therapy, angioplasty, or atherectomy, the use of stays eliminates the need for endoluminal access.

When intravascular ultrasound, for example, reveals that remodeling has reduced the media so that even with the use of a tumefacient, the wall remains too thin to implant aeroballistically with miniballs, stays may still be able to undercut the adventitia and allow the placement of an extraluminal stent. Stays may be better suited to stenting without a preliminary angioplasty, atherectomy, or ablation of the lumen lining and therewith, complete avoidance of a need to enter the lumen.

For example, stays can be used where the removal of less significantly protrusive calcified plaque considered nonvulnerable might rupture if disrupted or broken during a conventional angioplasty. Significantly, extraluminal stenting eliminates the need for stent replacement such as along the urinary tract where the accretion of crystal along the internal surfaces of the wall surrounding the lumen can result in clogging repeatedly, a problem that a clot or crystal solvent drip periodically released into the lumen by a fully implanted microcontroller chip as copending application Ser. No. 15/932,172, entitled Integrated System for the Infixion and Retrieval of Implants and Ser. No. 17/689,880, entitled Prosthetic Disorder Response Systems, address in in detail.

In a deep location where to encircle the ductus from a remote location would be difficult, a magnetized perivascular collar is used rather than more remote magnets positioned subcutaneously, fastened to the surface of skeletal muscle. Furthermore, since stays are inserted subadventitially from outside a vessel as to avoid the lumen, the use of a platelet blockade or thrombolytic as would be indicated when working inside the lumen, risking abrasions or incisions that would likely prove thrombogenic if not thromboembologenic can be eliminated, or at least the serum concentration thereof reduced, and therewith, the possibility of problem bleeding.

Where access to insert stays is difficult, miniballs which incorporate thrombus counteractive medication can be used. Stays are preferable when the luminal contents tend to persist as infectious or septic so that the tiny perforations produced during ballistic implantation would expedite the spread of infection. While either stays or implants might be used along a single ductus depending upon its segment by segment, or zone by zone, characteristics, the need to use both type implants should provide infrequent.

For retentive tissue infiltration as well as increased uptake and retention of any coating such as antimicrobial or adhesive, stays may be given a textured surface. Introduced from outside the surface of an artery, stays are usually inserted on the systoles, the insertion tool remaining in contact with the surface of the substrate vessel. The placement of stays into a peristaltic ductus is usually analogous, that is, the operator inserts successive stays as the apices of the traveling wave pass beneath the insertion tool. The aeroballistic implantation of miniballs is usually on the diastoles or just after the successive waves pass.

The provision of two different kinds of intramural implants, either of which can consist of or include medication, numerous other therapeutic substances, or radiation as well as complement a stent jacket makes possible the choice of one or the other for responding to different anatomical and medical conditions. The incorporation of magnetically susceptible matter in implants such as stays allows the implants not only to attracted to a magnet, but when placed in a radiofrequency alternated magnetic field, allows the implants to be heated. Heating thus has been used as a means of ablation.

To support the retractive capability of the stay inserter, few stays omit magnetically susceptible soft iron-silicon content concentrated at the end of the stay to which the tip of the magnetized ejection blade will touch. The risk of a stay entering the circulation is quite low, a powerful tractive magnet kept at the ready where such an eventuality might occur. The placement of stays into a ductus likely to move away from the insertion tool such as the roof of a collapsed trachea in a small dog may necessitate supporting the insertion side with the aid of an endoscope, for example, during insertion.

OBJECTS OF THE INVENTION

To dispel the difficulty in properly positioning a number of stays to the extent that the use thereof would be discouraged despite the fact that the medical utility of stays is considerable.

To provide a surgical hand tool that will facilitate the insertion of a train of small medicinal, radiation-emitting, magnetically susceptible, or magnetized implants beneath the adventitia or outer tunic of a tubular anatomical structure or the surface of an organ, gland, or other tissue thereby to make possible the application of a retracting force or stenting in cooperation with subcutaneously positioned magnets or a surrounding magnetized collar.

To make possible the release of medication or radiation into the wall surrounding the lumen of a ductus such as a vessel, the trachea, esophagus, or ureter with or without the application of retractive force or beneath the outer tunic of any organ, gland, or tissue surface without entry into the lumen or deeply into the parenchyma.

To allow the chemotherapeutic and/or brachytherapeutic targeting of a neoplasm situated on or toward the outer surface of an organ, gland, or bodily ductus with a medicinal-releasing and/or radiation-emitting implant.

To allow the release into the wall surrounding a blood vessel of a tissue strengthening agent to dispel the risk of a silent aneurysm and rupture in a patient with a congenital connective tissue disorder, especially in an infant, thus allowing the deferral of a traumatizing surgical correction, or if surgery is to be accomplished without delay, then with tissue more amenable to incision or clamping as necessary.

To allow the treatment of a ductus which malacotic, infected, or otherwise diseased, would likely incur incisions, perforations, or abrasions were treatment transluminal.

To facilitate the insertion of a train of stays wherein the medical purpose or the relative proportion of medicinal, irradiating, or stenting content in each stay is different.

To facilitate the proper placement of stays of any type in any sequence and in so doing, significantly reduce the procedural duration, and when necessary, the amount of time the patient must be subjected to general anesthesia.

To allow access to deeper tissue for the purpose of inserting stays therein through a small, or 'keyhole' incision, eliminating the need for more extensive incision at the body surface, much less the imposition of a need to create an open surgical field.

To allow the coating of each stay with medication and/or an adhesive as each is ejected.

SUMMARY OF THE INVENTION

The insertion of a stiff arcuate band, or stay, into the wall surrounding a tubular anatomical structure, or ductus, can serve any one or a combination of several purposes. If made of a suitable plastic or metal, its mere insertion might serve to maintain the patency of a substrate ductus. If not, the stay can be made with magnetically susceptible or magnetized content for retraction by a perivascular source of tractive force in the form of an immediately surrounding collar or subcutaneously positioned magnets. If made of one or more medicinal substances, and/or made to emit local radiation such as consisting of electrons depleted over a finite period, the medication and/or radiation is precisely targeted where its release is sought, eliminating the side effects of systemic dispersal. This nonprovisional application addresses the structure and function of surgical hand tools made to allow the quick and properly positioned insertion of stays.

DESCRIPTION OF THE DRAWING FIGURES

FIG. 1 shows a diagrammatic perspective view of a ductus implanted with stays whether ferromagnetic for encirclement by a stent-jacket, medicinal, radiation seeds, some combination thereof, or as structural buttresses, absorbable or nonabsorbable.

FIG. 2 shows a right hand side-view partly in section with a call-out detailed view of the lower or working end of a control syringe-configured depress-to-eject tissue sealant/release-to-insert a stay, insertion passive-type stay insertion tool which allows tissue sealant to be applied to the stays upon ejection and the force of insertion to be set by the restorative force of the plunger or slide return compression spring but also allows force to be reduced or increased manually (front and side mounting spring-clips not shown), the cross section indicated by the notation 'to FIG. 99' at the detailed call out referring to the figure shown in the parent application Ser. No. 15/932,172.

FIG. 3 shows a full face front view of the upper portion of the control syringe-configured stay insertion tool shown in FIG. 2.

FIG. 4 shows a longitudinal section through a pistol-configured pull-type, active, or pull trigger to eject tissue sealant, then inject a stay-type stay insertion tool.

FIG. 5 shows an enlarged view of the working or ejection end of a stay insertion tool whether of the control syringe-configured release to eject type shown in FIG. 2 or the pistol-configured pull-trigger to eject type shown in FIG. 3 at the end of the stay loading phase of the ejection cycle with the stay ejection blade fully retracted.

FIG. 8A shows a full face frontal longitudinal section view of a stay insertion tool auxiliary syringe holder mounting frame and motor for attaching a commercial tissue sealant or medication syringe regardless of the number of syringes or syringe chambers.

FIG. 8B shows a right side view of a stay insertion tool auxiliary syringe holder mounting frame and motor for attaching a commercial tissue sealant or medication syringe regardless of the number of syringes or syringe chambers.

FIG. 9 shows a side view, as in FIG. 2, showing the attachment to a stay insertion tool of an auxiliary syringe holding frame and motor such as that shown in FIGS. 8A and 8B by means of a mounting cable-delivery extension line such as that shown in FIGS. 11 and 12, with the connection socket at the rear shown in FIG. 14.

FIG. 10 shows a left side sectional view of a stay insertion tool auxiliary syringe holding frame and motor such as that shown in FIG. 9, showing at the bottom of the drawing, the attachment of the frame and motor to the mounting cable-delivery extension line.

FIG. 11 shows a detailed longitudinal sectional view of a stay insertion tool auxiliary syringe mounting cable-delivery extension line such as shown in FIGS. 9 and 10.

FIG. 12 shows a cross-section through a stay insertion tool auxiliary syringe holding frame supporting arm and connecting cable shown in FIGS. 9, 10, and 11.

FIG. 13 shows a call-out detailed view of the socket used to connect a auxiliary syringe such as that shown in FIGS. 8 thru 10 to a stay insertion tool showing the break-contact terminals used to initiate the timing of tissue sealant and/or medication delivery by controlling the electrical current to the dual interval delay/on-timing module in slave mode.

FIG. 14 provides right-hand side and full face rear views of the socket used to connect an auxiliary syringe mounting and holding frame shown in FIGS. 8 thru 10 to a stay insertion tool.

DESCRIPTION OF THE PREFERRED EMBODIMENTS

Detailed descriptive matter pertaining to stays appears in the parent application hereto, namely Ser. No. 15/932,172, entitled Integrated System for the Infixion and Retrieval of Implants, readily available online, which includes drawing figures numbered higher than 14. Sections therein pertaining to the composition and types of stays include Section XV1, entitled Medication or Radiation (Nonstent), and Medication-coated Stays, Section XV2, entitled Arcuate Stent-stays (Stent-ribs) for Use with Magnetic Stent-jackets; Section XV3, entitled Structure of Stays; Section XV4, entitled Partially and Completely Absorbed Stays; Section XV5, entitled Circumstances Dissuading or Recommending the Use of Stays; and Section XV6, entitled Stays Coated with a Heat-activated (-melted, -denatured) Tissue Adhesive-Hardener, or Binder-fixative.

Also providing detailed descriptive matter pertaining to stays in the parent application are Section XV7, entitled Stays Coated with a Solid Protein Solder Coating and Cyanoacrylate Cement; Section XV8, entitled Use of Cement and Solder Coated Stays; Section XV9, entitled Specification of Cyanoacrylate Tissue Sealants and Bonding Agents; and Section XV10, entitled Practitioner Preference for Cyanoacrylate Tissue Sealant, as well as numerous references to stays throughout the application. Drawing figures illustrating stays in parent application Ser. No. 15/932,172 include FIGS. 92, 93, and 94. For brevity and to avoid redundancy, this precedential basis for the edification of stays is incorporated by reference without the need for literal reiteration or paraphrase. Detailed information and drawing figures concerning the internal mechanism of stay insertion tools is provided in parent application Ser. No. 15/932,172, entitled Integrated System for the Infixion and Retrieval of Implants.

Figure 1:
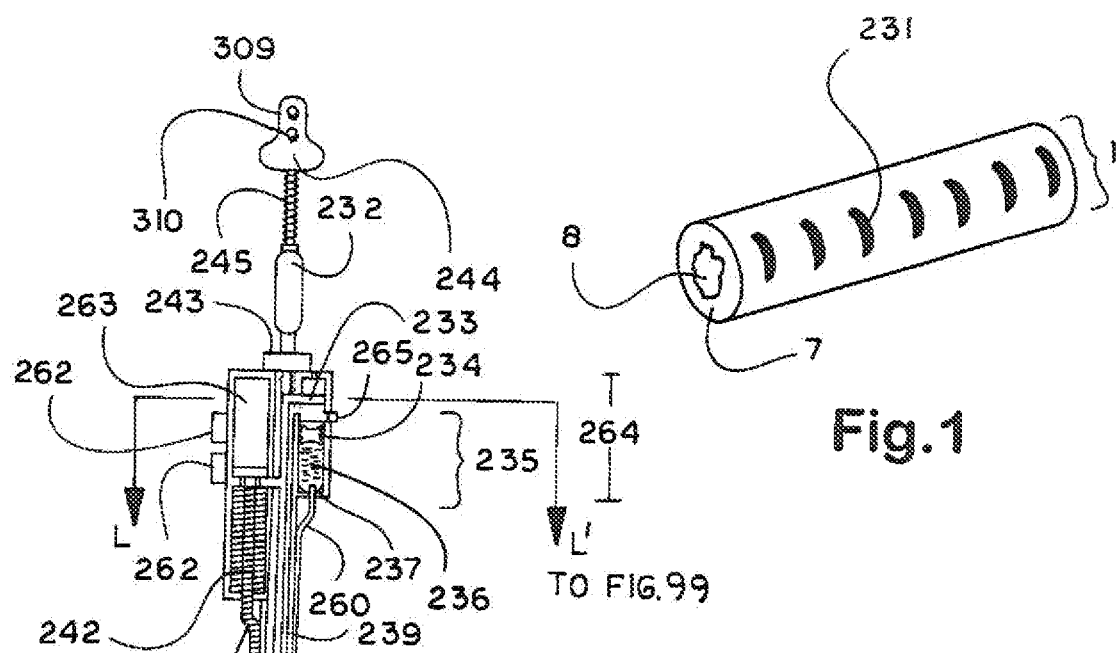

Stay insertion tools are shown in FIGS. 2 thru 6, 7, and 9, with internal workings of a mechanical embodiment shown in greater detail in FIGS. 6, 7, 9, and 10. Figures and textural description describing the internal mechanism of stay insertion tools are provided in the parent application and in FIGS. 93 and 96 thru 99 in addition to the drawing figures specified herein. Stay insertion tools can be produced with different degrees of automation to control the stay ejection cycle. Except for stay retention, retraction, and recovery electromagnet 242, most stay insertion tools are mechanical. In such a substantially mechanical embodiment, stay retention, retraction, and recovery electromagnet 242, remains unenergized from the instant the operator confirms that stay 231 has been properly inserted as shown in FIG. 1.

The operator then releases thumb-ring 244, allowing thumb plunger-rod spring 245 to return thumb plunger-rod 238 to the raised position, completing the ejection stroke or phase of the ejection cycle. Control syringe-configured tools such as shown in FIGS. 2, 3, 5, and 9, apply force to the stay not as imposed by the operator but rather as set by the force of spring return when the thumb is lifted. With any control syringe-configured embodiment, the operator can use the thumb to restrain thumb plunger rod 238 from returning under the unimpeded force of spring 245, or can suddenly remove the thumb, allowing thumb plunger rod 238 to return under the force and speed determined by spring 245.

Accordingly, when the force of stay insertion is considered a significant outcome factor, the restorative force of rod-spring 245 is made adjustable through use of a tool with a calibrated screw thumb-plunger rod 238 return spring 245 tightener-loosener that allows translating test values into equivalent spring forces. Such a screw adjustment typically comprises a knurled knob with threaded center hole that rotates about and at right angles to the threaded thumb plunger-rod 238 in FIGS. 2, 3, 5, and 9. To allow instant access by touch, the knob is usually located between finger rings 232 and 249 and cap 243. To distinguish between surface hardness as indicated by indentation and ductus wall or organ cortex or capsule elasticity requires direct viewability.

This does not, however, equate to a need for high cost imaging but rather use of an attached or incorporated angioscope. With no stays loaded, the calibration measures indentation and applied force against the tip of the stay ejection blade or tongue 247 for direct translation into the return stay insertion spring force to be set. Automatic adjustment of the spring tautness in response to the resistance to penetration found is not incorporated as adding too much expense. When the adventitia is malacotic, a blunt blade tip with projection that friction fits in a hole at the center of the blade fork tip protects against puncture through the ductus. The calibrated scale is etched to encircle an upward extension of transparent plastic tool barrel 239 which is notched to avoid obstruction of thumb-ring 244 when depressed.

In contrast, a pistol-grip configured tool as shown in FIG. 4 inserts stays under the direct intuitive strength of trigger pull force exerted by the operator and is unamenable to the quantifying of this force. The insertion of stays based upon the quantified results of testing therefore requires infixion by means of a control syringe-configured stay insertion tool. Because the placement of stays poses relatively little risk and stay by stay placement responsive to testing would unduly prolong the procedure, most stay insertion tools take the quantified results of in situ tissue testing as addressed below in section XVII of the parent application entitled Testing and Tests and use these as an intuitive guide.

Figure 2:
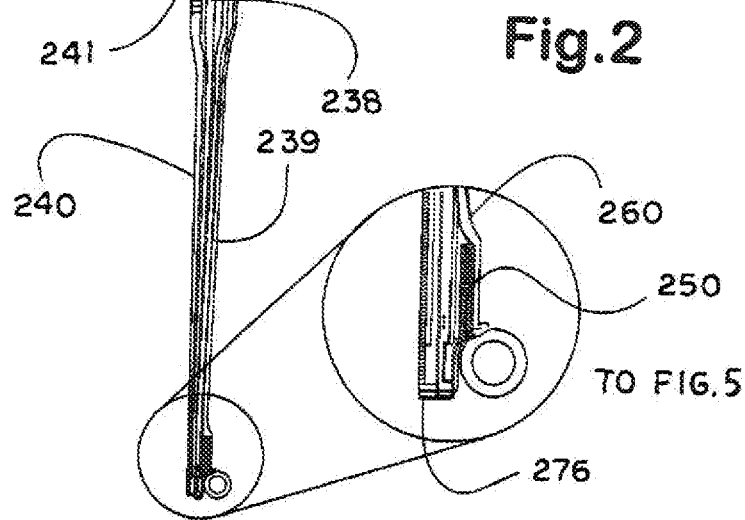

As shown in FIGS. 2 and 5, when thumb-ring 244 is depressed in the control syringe configured embodiment shown in FIG. 2, the thumb plunger-rod 238 retracts stay ejection blade or tongue 247 downward, and except for its tip, down out of ejection slot 248, allowing stay refill strip or clip 250 advancement spring 251 to seat the next stay 231 in the strip, completing the stay loading phase of the cycle. Exactitude in the force of stay insertion rarely critical, the nonquantified or intuitive force of penetration applied by the operator is almost always satisfactory. Elimination of the need for testing when allowable and the added expense of omitting a calibrated return spring screw adjustment from the tool represent advantages of time and cost over alternative methods for infixing ductus-intramural implants.

To gain a clear view of the small field, a cabled lamp, endoscope, or angioscope, not included in the drawing figures, is clipped or lashed alongside the tool, as may an excimer laser or radiofrequency scalpel to expedite dissection or assist in gaining access to the target ductus or tissue. As may be seen in FIG. 5, the lower end of stay advancement spring 251 is capped by stay advancement spring end-cap 277. End-cap 277 is configured to interface with the uppermost stay in refill strip 250 so as to keep the strip aligned. To assure that the uppermost or last stay in the refill strip is advanced flush to the floor of ejection slot 248 even past a moderate angle in a tool with pivot, as addressed below in the section entitled Stay Insertion Tool with Pivoting Base, the face of cap 277 where it apposes or nestles the uppermost stay is elevated.

The bond used to queue the stays into refill strip or clip of stays 231, ordinarily provided by dried sugar, is easily broken with the stays axially rotating at and continuing past the bend to seat firmly against the floor of ejection slot 248 properly for ejection. Due to the difficulty in introducing a flexible joint along thumb plunger-rod 238, a stay insertion tool with a pivotable base, as addressed below in the section of like title, is not controlled mechanically. In such an embodiment, except for control by the operator of the ejection cycle as a whole, the subsidiary functions encompassed within the ejection cycle are not controlled by the operator or mechanically but rather by the battery 263 and damped solenoids under the control of an inmate (embedded) microcontroller.

Figure 6:
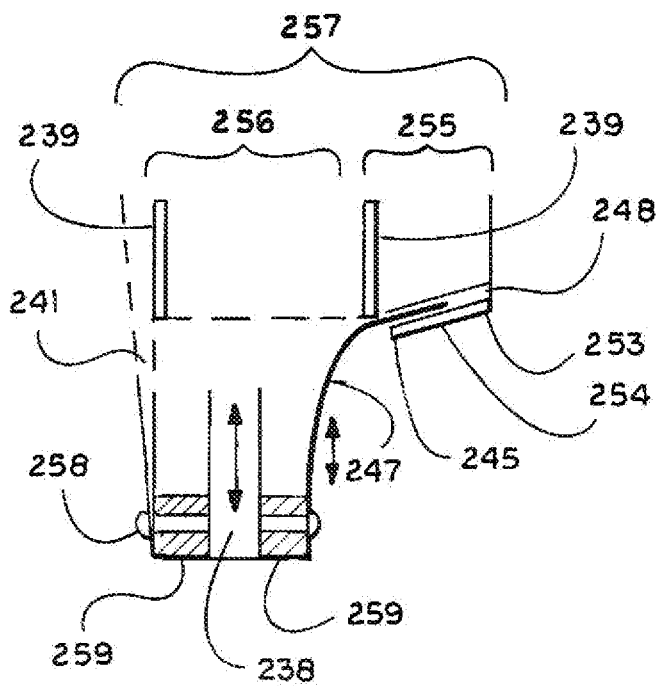
FIG. 6 shows a further enlarged view of the working or ejection end of the stay insertion tool shown in FIG. 5 to allow the parts thereof to be clearly seen.

Suitable microcontrollers are available from Microchip Technology, Atmel, Freescale Semiconductor and Texas Instruments corporations, for example. Instead of up and down reciprocating thumb plunger-rod 238 to operate the stay ejection blade 247, a plunger solenoid in the tool base 257 in FIG. 6 is used to perform this function, and instead of the internal chain pulley and ratchet mechanism shown in FIGS. 96 thru 98 to control the tissue cement air pump 264-piston 233 shown in FIGS. 2, 7 and 9 when the operator rotates thumb-ring 244, a rotary solenoid is used. When the operator releases thumb-ring 244, plunger-rod 238 rises under the restorative force of spring 245, pulling stay ejection blade 247 up through ejection slot 248, ejecting a stay 231, completing the insertion phase of the cycle.

Stay insertion tools are precision instruments made to insert stays of a specific shape and dimensions; the ejection blade and slot lining are not removable to allow use with stays of another shape or size. The ejection overall comprehends not only the stay insertion component but attendant components of electromagnet control and stay coating tissue cement ejection. In a tool with inmate microcontroller, these functions are automatically controlled as well. Once satisfied that the stay 231 has been properly positioned, the operator releases the ejection control knob (switch, button), or the upper of the two shown as 262 in FIGS. 2 and 9.

When pushed in, the upper control knob sends current from the battery 263 to stay retention, retraction, and recovery electromagnet 242. While pushed in, the upper knob is rotated to vary the current and magnetic strength. When pushed in again, the knob returns to its undepressed position whereupon the current is shut off. The lower of the two control knobs works in the same way to control the magnetic circuit with the polarity reversed. So long as the magnetic strength need not be adjusted, operation of the tool is single-handed.

While such an embodiment is the least costly to produce, when the magnetic strength must be adjusted, such a mechanical embodiment poses the drawbacks of requiring two-handed operation and necessitating the coordinated depression and lifting of thumb-ring 244 with the control of the electromagnet. For example, if the field strength is set too high, and/or the operator withdraws the tool from the insertion site prematurely so that the cyanoacrylate cement does not cause the stay to adhere where placed, unless the magnetic force is reduced, the stay could stick to the end of ejection blade 247 and be unintentionally retracted despite having been well placed as shown in FIG. 1.

Depending upon exactly when the magnetic recovery feature is activated, a different function is provided. If an imminent mispositioning is checked early so that enough of the stay remains inside the ejection slot, this will allow its aligned retraction back through the slot if not entirely back into the cue. If later, then upon extraction, the stay will cling to the forward tip of the next stay, allowing the operator to retract the tool and discard the stay. To reposition the stay in ejection slot 148 for rejection requires that the magnetic strength be set high.

An important implementation of this feature is that by energizing the magnet while touching the front of the ejection slot to a stay having already been placed without depressing the thumb ring to eject the next stay, the operator has a built in method for determining whether tunical delamination is risked at the depth to which the stay was placed. A calibrated control potentiometer adjacent to the magnet constitutes a built in pretesting and quantifying means for determining the tractive force at which a delamination would likely occur. For this purpose, the magnetic strength is deliberately turned up until an impending delamination is likely to occur.

Control over the depth of placement obtained by the degree of depressive force on the tool the operator imposes, adjustment to avoid a delamination involves determining the depth to which the stays are to be placed in order to preclude a delamination under the tractive force that would be imposed by the magnetized perivascular collar or subcutaneously positioned magnets specified. However, it is easy to exaggerate the susceptibility of a subadventitially positioned stay; the outer tunic of vessels, glands, and organs are intimately bonded or infiltrated with the subjacent tissue layer in a manner distinct from the loose superficial connective tissue that separates the integument from the underlying skeletal muscle.

The parent application specifies surgical cements and protein—such as collagen and albumen based—solders that can be used to coat stays to further dispel the risk of a delamination. To negate the need for practicing the coordination required and to avert the human error to which the criticality of perfect coordination predisposes, most practical tools incorporate a microchip controller to coordinate the sending of current to stay retention, retraction, and recovery electromagnet 242, with the position of thumb plunger-rod 238 and the ejection blade 247 or the phase in the ejection cycle. The stay ejection blade 247 retracted, the stay refill strip 250 advancement spring 251 forces the next stay 231 in the strip down onto the floor of the ejection slot 248 and in position to be ejected.

In an embodiment that is mechanical in using only an electromagnet to generate the magnetic force and not incorporating an electromechanical actuator in the form of a plunger solenoid, for example, and therefore without the aid of an embedded microcontroller to accomplish the action automatically, the polarity of to stay retention, retraction, and recovery electromagnet 242, is not ordinarily reversed for a moment after being retracted to assure that residual magnetization of the ejection blade 247 does not accumulate in the ejection blade 247 or cause a stay 231 to adhere to its tip. Instead, a polarity reversal control knob, the lower of the two knobs shown as 262 in FIGS. 2 and 9 is provided for periodic demagnetization, confirmable by checking whether the stay ejection blade 247 attracts a loose stay 231 from a table top.

Demagnetization of the ejection blade 247 is usually accomplished by reversing the polarity of stay retention, retraction, and recovery electromagnet 242, the ejection blade 247 representing the terminal component in the magnetic circuit, each stay 231 added at the end thereof once articulated by the during insertion. Control of the battery 263 supplying current to stay retention, retraction, and recovery electromagnet 242 in strength and polarity is ordinarily controlled manually, but as indicated, is more often supported by an embedded microcontroller that automatically adjusts the field strength in coordination with the ejection cycle. In this instance, the polarity is automatically reversed for an instant to assure that no buildup of magnetization takes place.

In a fully electrified embodiment wherein ejection is effected by a damped direct current plunger solenoid, power for the solenoid is taken from the same onboard battery 263, such as lithium ion, that powers stay retention, retraction, and recovery electromagnet 242 under the control of the same microchip as controls the battery component of the ejection cycle. In an embodiment that uses a solenoid without an embedded microcontroller, a plunger-rod 238 connects the solenoid positioned down in the tool base 257 to the inmate stay coating pump piston 233 but not to the plunger-rod thumb-ring 244, which is stationary rather than depressed and raised as is that of a syringe.

With such an embodiment, the field strength set before use, the operator positions the tool on the ductus, pushes the upper triggering control knob, and if satisfied that the stay is properly inserted, pushes the same control knob again to deenergize the electromagnet and leave the stay as positioned. When the ejection cycle is under the control of a microcontroller, the microcontroller adjusts the field strength. FIG. 10 shows a left side sectional view of a stay insertion tool auxiliary syringe holding frame and motor such as shown in FIG. 9, showing at the bottom of the drawing, the attachment of the frame and motor to the mounting cable-delivery extension line.

Because the auxiliary syringe holding frame and motor is more often used on an intermittent, discretionary basis to dispense surgical cement or another fluid therapeutic substance independently of the stay insertion cycle, control over an auxiliary syringe holding frame and motor attachment, as shown in FIGS. 8 thru 10 and addressed in the section of the parent application entitled Stay Insertion-Tool Auxiliary Syringes, is not usually integrated into the ejection cycle as an automatic component thereof. A switch on thumb-ring 244 allows switching control of an auxiliary syringe holding frame and motor between integrated into or independent of the ejection cycle.

The auxiliary syringe holding frame and motor is controlled by depressing buttons mounted about the outside of thumb-ring 244 as shown in FIGS. 2, 3, and 9. By contrast, the inmate (normally long chain cyanoacrylate) cement stay coating air pump 264 comprising piston 233 and cement tissue cement/surgical adhesive-sealant refill cartridge 236 in refill cartridge compartment 235 shown in FIGS. 2, 3, and 9 with inner workings shown in FIGS. 7 and 96 thru 100 in the parent application, is seldom omitted from the stay ejection cycle. The microchip coordinates the ejection cycle with respect to both energization of the electromagnet and the solenoid.

If the operator is dissatisfied with the insertion, the ejection control button is not released, the electromagnet is not turned off, and the spring or solenoid is used to retract the stay. Since to retract the stay entirely into the ejection slot to its starting position against the downward force of the stay refill strip 250 advancement spring 251 as preferred requires considerable magnetic force, such a semiautomatic embodiment is provided with a high capacity battery and a powerful electromagnet. The position of the battery and electromagnet compartments high up on the tool place these well clear of the entry incision, only the small working end of the tool and a portion of the shaft needed to reach down to the ductus introduced intracorporeally.

The size of the battery and electromagnet are thus limited only by the need to avoid blocking the sight lines of the operator, so that these can be made as large as necessary. An aborted and retracted stay is placed sufficiently to a side of the initial incision to minimize trauma to the ductus. The ejection blade can be returned by a spring as in the mechanical embodiment or by reversal of the solenoid in an electrical embodiment whether by a solenoid spring return or reversal of polarity.

Rather than by a direct mechanical connection, a stay insertion tool with pivoting base, as addressed below in the section of like title, uses a direct current plunger solenoid to move the stay ejection blade. Although actuation of the onboard tissue cement (or other therapeutic fluid) pump is by direct mechanical connection to the solenoid that pulls up the stay ejection blade, the level of electrification already incorporated prompts further incorporation of a microchip to coordinate the ejection cycle.

Stay Insertion Tool Structure

Access to the exterior of the ductus wall in order to insert a stay with a pliers-type tool such as a Crile or needle forceps at the correct angle necessitates a needlessly long incision. A special stay insertion tool (stay infixion tool, stay inserter) that allows the wall to be implanted with the tool normal to the outer surface of the ductus makes insertion possible through a keyhole incision. Inserting stays from within the lumen with endoscopic forceps is similar to placing suture with a curved needle held with a needle forceps where the needle can be perpendicular to the tool making rotation of the wrist sufficient to insert the needle laterally.

When access to the ductus is clear so that the surrounding tissue does not come in contact with the tool, as in an open surgical field, the tool will ride up and down with the pulse or intrinsic motility providing the operator with tactile (tactual, haptic) cues to the proper moment for insertion. A stay insertion tool is essentially a stapler-type mechanism arranged vertically, with ancillary means for coating each stay as it is ejected, illuminating the treatment site when necessary, and configured to negotiate a surface that is curved and compliant rather than planar and hard.

Whether the stays are ejected mechanically or electrically, the predominant object in the design of a stay insertion tool is to minimize the size of the entry wound. Rather than modular or interchangeable, stay insertion tools are made for common combinations of stays and cements. Attachment to the stay-insertion tool of an auxiliary syringe mounting frame and motor as addressed in the section of the parent application entitled Stay Insertion-Tool Auxiliary Syringes allows use of the tool as either a stay ejector, syringe, or both without the need to retract the tool once positioned on the substrate ductus.

Either or both the inmate cement or stay refill cartridge chambers can be left empty, or both can be filled and an auxiliary syringe mounting frame and motor attached to deliver stays coated with cement or any liquid or semiliquid therapeutic substance with additional liquid substances delivered from the auxiliary syringe mounting frame and motor in any sequence relative to stay ejection if applicable. Thus, the tool without a stay refill cartridge inserted can function as a syringe able to deliver multiple substances. Most stay insertion tools are mechanical an use an onboard battery to power electrical components, such as the stay recovery and retraction electromagnet and a fiberoptic lamp or other electrically powered cabled device clipped alongside the tool.

However, mechanical embodiments unable to flex without introducing costly joints, an alternative solenoid powered embodiment is described below in the section entitled Stay Insertion Tool with Pivoting Base. It is considered obvious that solenoid power need not be reserved for a pivoting model and might be used in any such tool. While demanding skill, spatial clearance is afforded without making it necessary to lengthen an incision to more acutely angle the proximal end of the tool, so that this lateral approach is more readily accomplished than if the tip of the tool had to remain substantially normal to the ductus. FIGS. 2 and 3 show a control syringe-configured, while FIG. 4 shows a pistol-configured stay insertion tool.

The stay insertion tool ideally has a weight such that when rested upon the ductus, the tool rides up and down in compliance with the ductus intrinsic motility without compressing the ductus, exerting the downward bearing force adequate for implantation. The variability among ductus especially when diseased and the difficulty of effecting implantation without the addition of downward force make this ideal elusive. While both inmate stay and cement ejection functions might be accomplished electrically, a mechanical embodiment allows the tool to be provided at less cost.

By contrast, unless positioned off to a side, a supplementary, or auxiliary, syringe, as addressed below in the section entitled Stay Insertion Tool Auxiliary Syringes, attached to the tool, such as one containing a two-component tissue sealant, would interfere with a clear view of the treatment site, which separation at a distance makes the electrical operation of attached syringes advantageous. When a cement or medication cartridge is inserted into the air pump 264 chamber, a push type, or control syringe configured embodiment stay insertion tool such as that shown in FIG. 2 can be set to eject a cyanoacrylate cement or a tissue sealant, for example, upon depression of the thumb-ring 244 and inject the stay 231 when thumb-ring 244 is released.

Except that the ejection mechanisms of the push or syringe and the pistol configured stay insertion tools work in reverse, the internal structure and attachment of auxiliary syringes are equivalent if not identical. Whereas the inmate stay ejection and surgical cement or other fluid or semifluid therapeutic substance delivery mechanisms are locked together so that use for one or the other required leaving one of the refill cartridge chambers empty, attachment of an auxiliary syringe or syringes not only allows additional therapeutic substances to be delivered to the treatment site without the need to retract the tool once positioned on the substrate ductus, but isolates syringe from ejection function.

The control syringe configuration of the tool makes it possible for the operator to extend the interval over which either or both of these actions last. Additionally, as addressed in the section below entitled Mechanism for Adjustment in Stay Insertion Tool Ejection Cycle Inmate Cement Delivery Interval, the moments of onset, duration, and cutoff of adhesive delivery are adjustable In cement-ahead operation, the cement is ejected onto the adventitia first and the stay is passes through the cement as it enters the wall of the ductus. Even though most of the cement is wasted or 'squeegeed' away as the stay penetrates, the use of cement or medication containing a thickener and stays having a deeply textured surface allows a significant pickup of the cement or medication.

A deeply textured surface also assists to conduct heat through the stay, which expedites bonding with the application of heat. Tool barrel 239 in which thumb rod 238 is centered and moves up and down is the stationary body of the tool and runs from just beneath top cap 243 to toe 253 of foot 255. The tool with adhesive cartridge 236, air pump piston-plunger 233, tissue cement or therapeutic fluid delivery line 260 oriented as shown in FIG. 2 is configured to allow coating the upper surface of each stay.

As shown in FIGS. 2, 3, 5, 9, 13 and 14, with the exception of tissue sealant (tissue adhesive-strengthener, binder-fixative, or hardener) air pump 264 piston-plunger 233, which is connected to and moves with thumb rod (thumb plunger-rod, plunger-rod, shaft) 238, the parts of the stay insertion tool seen to the right of thumb plunger-rod or shaft 238 remain stationary, whereas the parts of the tool seen to the left ride along the outside of the tool barrel or shank 239 down when the operator depresses, then up when the operator ceases to apply downward force with his thumb against thumb plunger-rod or shaft 238. The portion of the tool between the ejection control syringe-type or trigger control at the proximal end or top and the distal or working end is shank 240, which includes soft iron magnetic conductor and probe 241.

To minimize the dimensions of the portion of the tool for insertion intracorporeally, tool barrel or shank 239 is drawn down to as low a cross-section as does not impede thumb plunger-rod or shaft 238. To use the stay insertion tool, the ductus is accessed through a small incision, which can be held open by retractors, such as a miniature version of an omni-bearing retractor or a cannula. The size of the insertion tool necessarily gauged to the diameter of the ductus to be treated, the distal end of the insertion tool is typically 5 millimeters wide and 8 millimeters from front to back. In FIG. 2, cap 243 is not bonded to the components to the left-hand side of thumb plunger-rod or shaft 238 but is bonded to those on the right-hand side.

Referring now to FIGS. 5 and 6, parts of the stay insertion tool beneath cap 243 shown to the left side in FIG. 2 move down when the operator depresses thumb-ring 244 and return upwards by plunger-rod 238 return spring 245 when thumb-ring 244 is released. Thus, distal tip of soft iron magnetic conductor and probe 241 moves up and down with stay retention, retraction, and recovery electromagnet 242 and heel 246 of stay ejection blade or tongue 247 as one. In FIGS. 2, 4, and 5, the ductus is 1, its wall 7, and lumen 8 consistent with FIGS. 2 thru 5 Alternatively, the distal end of the soft iron magnetic conductor and probe 241 could be slid against an upright contact strip at the back of stay ejection blade 247, thereby to conduct the magnetic force used to retain the stay.

Then the parts of the tool to the left would remain stationary allowing better depth clearance for the butt portion behind the foot of the insertion tool base. Devising the mechanism to present reciprocal movement externally makes it possible to mount a sliding contact used to control the delivery of a tissue sealant from an attached dual-chamber syringe. In an embodiment in which the parts shown to the left are stationary, the sliding contact is placed along thumb plunger-rod or shaft 238 with the stationary contact mounted to the internal surface of the tool barrel or shank 239. Such an internal sliding contact can be positioned anywhere along thumb plunger-rod or shaft 238. However, internal location makes the sliding contact inaccessible without disassembly of the tool.

While another such internal contact could be used to control the motorized expulsion of the inmate (internal) surgical cement syringe that would simplify the reversal of cement delivery between cement-ahead (of stay ejection) and cement-follow modes of operation, a relatively simple mechanical system makes it possible to provide the tool at less expense. When thumb plunger-rod or shaft 238 is fully depressed, the front end of the ejection tongue must remain intromitting or threaded within a portion of stay ejection slot 248 far enough to the rear as not to interfere with the seating of the next stay to be ejected, and when the thumb plunger is released, the front end of the ejection tongue must extend past the front edge of stay ejection slot 248 by the distance that the trailing tip of the stay is to be countersunk within the wall of the ductus.

Thumb plunger-rod or shaft 238, made of a nonmagnetic stainless steel, such as one of those specified below in the section entitled Subcutaneous, Suprapleural, and Other Organ-attachable Clasp- or Patch-magnets, must have reciprocating travel sufficient to fully retract plunger-blade or stay 231 ejection blade or ejection tongue 247, and when returned by thumb plunger-rod compression spring 245, drive stay 231 through stay ejection slot 248 and into ductus 1 wall 7. Since the operator is able to control the return of thumb plunger-rod 238 under the restorative force of thumb plunger-rod 238 compression coil spring 245, this spring is chosen for just enough force to allow stay ejection blade or tongue 247 to penetrate the most resistant diseased ductus.

While stays 231 do not extend to the lumen, calcification of layers through which a stay 231 must pass disallow the use of stays (or miniballs) and call for resection and anastomosis of the segment affected thus. Thumb plunger-rod 238 is centered within tool barrel 239 by attachment to the finger rings above and ejection blade or tongue 247 below. Shown in FIGS. 2 and 5, Stay refill clip compartment 250 consists of stay advancement compression spring 251 which bears down on the clip of stays 231 loaded into stay refill clip compartment 251. The spring circular, and the stays torpedo in cross section, the spring matches the stays 231 in length and has a lower end-cap with a circular top and bottom configured to complement the upper surface of stays 231.

In a control syringe-configured push-type stay insertion tool such as shown in FIGS. 2 and 3, which does not allow switching between cement-ahead and cement-follower operation, the thumb, index, and middle finger rings all freely rotate about a vertical axis, a rotary joint (not shown) on level with the bottom of cap 243 for thumb plunger-rod 238 allowing the upper portion of thumb plunger-rod 238 to rotate without affecting the lower portion. This allows maximum comfort and the least fatigue over the course of longer procedures with minimal displacement of the distal or working end of the tool for either a right- or left-handed operator when the operator must switch hands or is forced by the anatomy to adopt an awkward angle.

Index finger ring 232 and middle finger ring 249 are journaled about vertical pins that allow these to be rotated. In an embodiment of like configuration that does allow switching between cement-ahead and cement-follower operation, thumb-ring 244 similarly rotates freely through an arc of about 45 degrees to either side of center without effecting the rotational angle of thumb plunger-rod 238. Referring now to FIGS. 96, 97, and 98 in parent application Ser. No. Ser. No. 15/932,172, entitled Integrated System for the Infixion and Retrieval of Implants, in such a switching embodiment, exceeding this arc at either end causes thumb-ring 244 to rotate thumb plunger-rod or shaft 238 causing rod 238 to click into engagement with the detent just past each end of the arc.

This corresponds to the rotation of thumb plunger-rod 238 such that the pin used to switch between sides of sprocket chain 252 is engaged in the sprocket link to one or the other side, which side determining whether air pump 264 piston-plunger 233 is driven downward with the thumb plunger-rod in cement-ahead operation or when thumb plunger-rod 238 is released to return to the top position under the force of thumb plunger-rod compression spring 245. Matching the strokes of thumb plunger-rod or shaft 238 and cement or medication air pump 264 piston-plunger 233 eliminates the need for an additional mechanism for limiting the portion of thumb rod stroke used to move air pump 264 piston-plunger 233.

The length of thumb plunger-rod 238 which passes through cap 243 when depressed has a shallow longitudinal groove (running concavity) or spline-cut that can be rotated between groove complementary protrusions or elevations on the inside of cap 243. A r rotary joint above the level of stay ejection blade or tongue 247 allows the lower portion of thumb plunger-rod 238 to remain at a fixed rotational angle despite first free rotation of thumb-ring 244, then rotation with the thumb ring of thumb plunger-rod or shaft 238 above the level of the rotary joint.

To allow the sliding and rotation of a thumb switch or switches mounted to thumb-ring 244 to any position along thumb-ring 244 for the immediate control of any auxiliary devices in use, which is addressed in the section below entitled Connection of the Holding Frame to the Stay Insertion Tool, such as an outrigger syringe holding frame, laser, or suction line, thumb-ring 244 is uniform in cross section. Small depressions and its complementary elevations on the internal circumference of cap 243 (not shown) serve as detents that allow thumb plunger-rod or shaft 238 to be positively engaged at the rotational angle of one or the other of the two ridges; however, the depth of engagement between the elevations and depressions, or detents, allow rotation to and detention at either rotational angle with relative ease.

The free rotation about its longitudinal axis of thumb-ring 244 between these detent protrusions (along with the free rotatability of the index and middle finger rings 232 and 249) as addressed below in the section entitled Mechanism for Switching from Cement-ahead to Cement-follower Operation produces no rotation of thumb plunger-rod 238. The rear outer surface of stay refill-strip compartment 250 is concave to complement the front surface of tool barrel 239 for a flush fit, these two surfaces bonded together by means of an adhesive such as a cyanoacrylate cement. The bottom or floor end of stay refill-strip compartment 250 is curved upward from back to front, and the underside of the stay ejection slot 248 floor is the tool foot, which is deep textured to resist slippage when set in complementary relation to the outside of the ductus to be implanted.

The front tip of stay ejection blade or tongue 247 is indented to engage the rear end of stay 231 and extends into the rear of stay ejection slot 248 but not into the chamber within as would obstruct the descent of each stay in the refill strip or clip of stays 231 in turn down against the floor under the downward force of stay advancement compression spring 251. When the wall of tool barrel 239 is too thin to assure that the front tip of stay ejection blade or tongue 247 will be retained in the correct position to push through each stay 231, a rearward extension in the form of a lip surrounding stay ejection slot 248 rear is applied by gluing tiny strips of a plastic to form a framing rearward extension to stay ejection slot 248 opening.

FIG. 10 shows a left side sectional view of a stay insertion tool auxiliary syringe holding frame and motor such as shown in FIG. 9, showing at the bottom of the drawing, the attachment of the frame and motor to the mounting cable-delivery extension line.

Each stay in turn is thus constrained to the correct seating and exit path under the downward force of spring 245 and the sides of stay refill clip compartment 250. In FIGS. 5 and 6, the entrance for the stay ejection blade 247 into the stay ejection slot 248 extends just below the lower edge of the front wall of tool barrel 239, which is level with the upper surface of the stay against the lower surface or floor of stay ejection slot 248. Releasing thumb-ring 244 thus causes the front tip of stay ejection blade 247 to engage the rear tip of the stay pressed down against the lower surface or floor of stay ejection slot 248 driving stay 231 through the front opening of ejection slot 248 and into the outer tunic of ductus wall 7 or adventitia 1 shown in FIGS. 2 thru 5 of the parent application as number 2.

The downward force exerted by stay advancement compression spring 251 and complementary contours of the stay body and floor of stay ejection slot 248 prevent the front stay-engaging end of stay ejection tongue 247 from applying an ejection slot-deviating or nonaligned upward angular vector against the rear of stay 231 as would angle the stay to one side, resulting in resistance to ejection and nonperpendicular entry into ductus wall 7. Still referring to FIGS. 5 and 6, in both the push or control injection syringe-configured embodiment shown in FIGS. 2 and 3 and the pull or pistol-configured embodiment shown in FIG. 4, magnetic conductor and probe 241, lower end of thumb plunger-rod or shaft 238, and lower end of ejection tongue 247 are fastened together by magnetically conductive rivet 258 and spaced apart from one another along the barrel of rivet 258 by spacing tubes, washers, or ferrules 259.

Fastened together thus, magnetic conductor and probe 241 slides up and down against the rear outside wall of stationary tool barrel 239, the lower end of thumb plunger-rod 238 moves down and up within and extends below the lower end of tool barrel 239, and the lower end of ejection tongue 247 extends below the front wall of the bottom end of tool barrel 239 and stay refill-strip compartment 250. As best seen in the detail of the tool bottom in FIG. 6, the bottom portions of these reciprocating parts are punched or drilled to pass through and joined together by magnetically conductive rivet 258 with stay ejection tongue 247 at the front, thumb rod thumb rod 238 at the center, and magnetic probe 241 at the rear, these three parts separated by spacing tubes, washers, or ferrules 259 and comprising the rear reciprocating butt portion 256 of the stay insertion tool.

Magnetically conductive rivet 258 binds together rear butt portion 256 of the tool by passing through these parts and through spacing tubes, washers, or ferrules 259 used to space these parts apart. Rivet 258 thus includes magnet conductor and probe 241, spacing tubes, washers, or ferrules 259, and stay ejection tongue 247. Upon depression of thumb rod 238, butt 256 moves up and down or reciprocally past the stationary bottom or distal margin of tool barrel 239 and stationary barrel 239 with foot 255 fastened to its front. In FIGS. 2, 4, and 5, the bottom of the reciprocating butt portion 256 of base 257 is additionally covered by a protective pad of surfactant and other tissue irritating material free neoprene or similar cushioning material.

If and only if a slitting edge attached beneath a permanent bottom protective cushion 276 presents no sharp edges, a separate stay extraction slitting edge as addressed below in the section entitled Butt-pad with Retractable Slitting Edge may be fitted flush therebeneath. In a mechanical embodiment, butt 256 reciprocates up and down by the small distance equal to that of stay ejection blade 247 past the lower border of stationary barrel 239. Use of a vertically reciprocating mechanism allows a smaller tool diameter and thus entry wound than do rotatory mechanisms that use a miniature electrical motor and a crank or cam shaft to convert the rotary to horizontal reciprocation of the ejection blade.

The latter allow a rotating vertical shaft with the motion converting mechanism at the lower or distal end to eject stays at a very high rate; however, high speed whether fully or semiautomatic is specifically rejected as militating against the considered placement of each stay as essential for medical reasons. The electrically operated tool addressed below in the section entitled Stay Insertion Tool with Pivoting Base substitutes a plunger solenoid actuated by a control button on thumb-ring 244 for vertical reciprocation by depression of thumb-rod 238; however, the small reciprocal movement of ejection blade 247 remains vertical. Provided it does not increase the diameter of the tool untenably, an ejection blade directly connected to a plunger solenoid can avoid vertical reciprocation.

However, for stability during and more accurate insertion, some extension by a butt placed against the proximal circumference of the target ductus is still provided, although the 'butt' extension is then shorter.

To minimize the risk of injury to adjacent tissue, tool butt 256 is kept as short as practicable whether reciprocal action is accomplished with or without an electromechanical actuator. In the mechanical embodiment shown in FIGS. 2, 5, 6, and 9, foot 255 is rested on the ductus to be implanted with a stay or stays. Depression of butt 256 retracts stay ejection blade or tongue 247 to the position just before the entrance to stay ejection slot 248. The reciprocal action serves to insert the successive stays.

This semiautomatic operation whereby each stay is seated for ejection upon ejection of the stay preceding it reduces procedural time without the need to withdraw and reinsert the tool increasing the chances for infection. Except for tools that incorporate a laterally pivoting foot joint as addressed below in the section of like title, the orientation of ejection slot 248 is fixed (nonadjustable). Within the degree of flexion allowed by stay ejection tongue or blade 247 introducing suitable rotatory joints would allow stay ejection slot 248 and stay refill strip or clip compartment 250 to be canted (inclined, angled) from back to front or side to side; however, this is discounted as needlessly expensive compared to standardized models.

Except for its front end portion, forcing thumb-ring 244 downward retracts stay ejection blade 247 from ejection slot 248, and releasing syringe thumb-ring 244 allows thumb plunger-rod 238 compression spring 245 to retract the lower ends of magnetic conductor and probe 241, thumb plunger-rod or shaft 238, and ejection blade or tongue 247, fastened together beneath the lower end of tool-barrel 239 until these are stopped by the lower end of tool barrel 239 or slightly short of that height when stay ejection blade or tongue 247 resists bending or its exact position prevents the top of the butt from flush relation with the lower end of tool barrel 239.

Pushing down on thumb-ring and thus thumb-plunger-rod 238 thus pulls down to withdraw ejection blade or tongue 247 from stay ejection slot 248, the front end of ejection blade or tongue 247, as indicated above, always remaining engaged and aligned within stay ejection slot 248 even when withdrawn to the extent allowed. The insertion tool must minimally interfere with imaging equipment needed to confirm satisfactory concentricity of insertion. In the push-type embodiment described first, the adhesive delivery mechanism is in line with the stay magazine and the stay retention, retraction, and recovery electromagnet 242 is situated behind the tool. Placing both beneath the wrist of the operator resulting in minimal obstruction to vision and manipulation.

Provided insertion results in substantial concentricity, even a suddenness and amplitude of pulse or peristaltic action that exerts considerable outward compressive force upon a lumen wall reduced in elasticity by disease will not cause the stay to incise toward the lumen. The insertion tool must therefore introduce the stays to be concentric to the ductus. While a growing resistance posed by adhesive buildup will become apparent tactually, and the application of adhesive to each stay and proper sealing of each adventitia entry incision can be seen with the binocular telescopes and head-lamp when the tool is lifted aside from each stay insertion site, an endoscope allows proper operation of the tool to be confirmed without the need for removal.

The material must also be strong enough that at typically 5 millimeter wide and 8 millimeter from front to back with sides 1.5 millimeter thick, the working end will not fracture or fall inside the body. In addition to providing transparency, the nonferromagnetic plastic body serves to prevent interference with the onboard stay retraction or recovery device to be described. For these reasons, the tool is typically made 18 centimeters or more in length of transparent polyethylene terephthalate, polystyrene, high-density polyethylene, or acrylonitrile butadiene styrene. Methyl methacrylate (acrylic) is too brittle to preclude fracture at the small working or distal end. Transparent parts tend to interfere less with views of the work area from different angles.

Two embodiments are provided, one, shown in FIG. 2, a control syringe-configured push-type or passive inserter with thumb and finger holes that allows the force of insertion to be set by the restorative force of the plunger or plunger-slide return spring with force added by the operator if necessary, and a pistol-configured pull type or active inserter shown in FIG. 4, which allows the operator to control the force of insertion. In FIG. 3, thumb 244, index 232, and third or middle finger 249 rings allows thumb-ring plunger-rod 238 in the push-type to be pulled up as well as depressed, this representing a key object of control-type or finger-ring configured syringes.

Since the stay magazine must queue the stays for contact with the ductus at the same time that clearance must be allowed for the ductus itself, a reversed arrangement of the parts as would give better access to the bottom of the far side of the ductus is ruled out. Using the embodiments shown, reorientation of the insertion tool is limited by the dimensions of the incision normal to the ductus and the attachment of the ductus along its deeper or far side. In the detail of the tool base shown in FIG. 6, the stay insertion tool is applied to the ductus at bottom ribbed arcuate sole 254, which ending in the back at heel 246 and the front at toe 253 must be matched in diameter to the ductus.

Toe 253, sole 254, and heel 246 comprise the front portion or foot 255 of tool base 257 situated to front of barrel 239, while the portion to the rear thereof is butt 256 consisting of tool barrel 239 and recovery and retraction magnet conductor 241. Foot 255 thus rests as substantially stationary upon ductus 1, while butt 256 reciprocates between the downward stroke that retracts stay ejection tongue 247 allowing stay refill strip 250 advancement spring 251 to force down the next stay 231 into stay ejection slot 248, and the upstroke that causes stay 231 to be ejected under the restorative force of thumb rod spring 245.

The surface of insertion tool sole 254 is indented, ribbed, grooved or covered with small dentate or round pillbox projections from toe to heel to stabilize the ductus by nonslidably engaging the stay insertion tool against the surface of ductus 2. Fully circumferential access requires that the ductus be detachable over a sufficient segment and sufficiently torsional or twistable without injury to allow otherwise inaccessible arcs to be implanted. However, attachment at the far side may serve to retract the rear wall of the lumen with only the proximate side requiring retraction by means of a partial stent jacket. If not and far-side implantation is necessary, the far side will usually be implantable endoluminally by means of a barrel-assembly.

Referring now to FIG. 3, for maximum comfort and minimal disruption at the working end of the tool during use in any embodiment of the control syringe push-type whether switchable between cement-ahead and cement-follower operation, thumb, index, and middle finger rings of the push-type insertion tool are mounted for free rotation such that all three rings can, for example, be rotated by up to 45 degrees clockwise by a right-handed operator or counter-clockwise by a left-handed operator. For minimal interference with viewability, stay retention, recovery, and retraction electromagnet 242 with probe extension 241 are placed at the side that faces away from the ductus or back of the tool.

Allowing sufficient tool length beneath stay retention, recovery, and retraction electromagnet 242 and surgical cement, fluid therapeutic, medication, tissue strengthener, hardener, or fixative tissue cement/surgical adhesive-sealant refill cartridge 236 in refill cartridge compartment 235 tends to keep the tool extracorporeal, reducing the need for a longer incision to achieve entry to the necessary depth without encroachment upon the edges of the entry wound. FIG. 6 shows butt 256 and foot 255 portions of tool base 257.

Placing the index and middle fingers under finger holes 232 and 249 using the thumb to depress thumb-ring 244 and thumb-ring rod 238 causes compression spring-returned thumb plunger-rod or shaft 238, which slides through plunger sleeve or tool barrel 239 as in a hypodermic syringe, to retract plunger-blade or tongue 247 from ejection slot 248 to a point behind the queue to clear the way for the compression spring to seat the next stay from the queue but with the forward edge of stay ejection tongue or blade 247 remaining inserted within the rearward extension of stay ejection slot 248, which extends the roof sides, and floor of stay ejection slot 248 to the rear.

Stay ejection tongue or blade 247 and stays 231, are ordinarily inflexible, adjustment in the angle of ejection requiring the tool as a whole to be tilted or the use of a tool with a tiltable foot, as addressed below in the section entitled Stay Insertion Tool with Pivoting Base. Stay ejection tongue or blade 247 is made of magnetically conductive (ferromagnetic) spring steel, a polyester coated with flexible ferromagnetic metal, or a polyester interleaved with ferromagnetic bands or laminations of flexible ferromagnetic metal. This allows stay ejection tongue 247 to conduct the magnetic force originating in stay retention, retraction, and recovery electromagnet 242 and passed through magnetic conductor 241 thence stay ejection tongue 247 to ferrous such as soft iron-silicon core 230 or alternative internal distribution of ferrous content embedded within stay seen in FIG. 93 of the parent application as part number 231.

This allows the use of polarity and current controls 262 mounted at the side of battery compartment 263 shown in FIGS. 2 and 9 to regulate the magnetic force exerted upon stay 231. By adjusting magnet controls 262 mounted to the outside of battery compartment 263, the operator can cause stay ejection tongue or blade 247 to retain, release, or repel stay 231. This allows the operator to confirm that stay 231 has been properly inserted within wall 7 of ductus 1 before proceeding to the next insertion if any. Thus, a stay that is dropped can be recovered and one that enters other than true or normal to ductus 1 can be retracted. The polarity reversing control can be used, for example, to prevent residual magnetism from holding a stay wished released.

The stay recovery magnetic circuit as shown in FIGS. 2, 5, and 6 thus comprehends stay retention, retraction, and recovery electromagnet 242, energizing power source (battery) in battery compartment 263, controls 262, magnetic conductor 241, rivet 258, and stay ejection tongue 247. Stay ejection tongue 247 is fastened at its lower or distal rear end by magnetically conductive (ferromagnetic) rivet 258 to magnetic conductor or probe 241, these parts comprising butt 256. Heel 246 is bonded to the front at the bottom of stationary tool barrel 239, and fixes the ejection path of stay insertion tongue 247. Thumb rod 238 is fastened to and moves or reciprocates battery in battery compartment 263, stay retention, retraction, and recovery electromagnet 242, and magnetic conductor or probe 241 up and down in relation to heel 246 to the fore.

To prevent undesired incisions as could result from involuntary deflection of the tool sideways during insertion, the front corners of plunger-blade or tongue 247 are blunted or rounded. So that the front edge of the plunger-blade (addressed below) engages rather than just abuts upon the back edge of the stay so that separation of the two would leave the stay mispositioned or loose, the plunger-blade is thicker than the stays and v-notched along its front edge to span and encompass the stays. To accommodate this distinction in thickness, the stays are coated with freeze-dried sugar that is absorbed and metabolized shortly after implantation, which process is not significantly impeded by the cement used to seal the entry incision.

This retention within the rear portion of the ejection slot when plunger-blade or tongue 247 is retracted prevents the plunger-blade from becoming disengaged and misdirected from ejection slot 248. The front, back, and sides along the path followed by the stays through the magazine and ejection slot fit flush to the sides of the stays. In order to countersink the near edge of the stay once implanted so that it will come to lie beyond the entry incision through the surface of the ductus sufficient to prevent backup through the same path and allow placement concentric as possible, plunger-blade or tongue 247 extends sufficiently down the side of the ductus and beyond the slight extension of ejection slot 248.

A plunger-blade or tongue 247 shield or guard encloses the exposed portion of plunger-blade or tongue 247 from and thus prevents displacement or pinching of the ductus 1. The plunger-blade or tongue 247 shield or guard is continuous with the floor of ejection slot 248, which is fastened at the bottom to the sides of stay cartridge by ethyl cyanoacrylate, 2-octylcyanoacrylate, n-butyl cyanoacrylate, or a DYMAX Corporation 200-CTH-series cement and thus remains stationary as plunger-blade or tongue 247 moves up and down behind it. Withdrawing plunger-blade or tongue 247 allows stay advancement compression spring 245 to expand inserting the next stay from the magazine load queue to be seated on the floor of the ejection slot lining.

Releasing thumb plunger-rod 238 then causes compression spring 245 to retract plunger-blade or tongue 247 back up through ejection slot 248 ejecting stay 231 out the front end of ejection slot 248. At the forward or exit end, ejection slot 248 beyond the outer surface of the strip or clip of stays 231 omits the floor of the ejection slot but preserves the sides and roof. The side walls and roof of the forward extension of ejection slot lining angle downwards to remain flush to the surface of the ductus. The honed leading edge of the stay thus emerges from the lining in contact with the surface of the ductus, and the stay is prevented from veering aside or upwards before the honed front edge of the stay penetrates ductus 1.

The pistol or pistol grip-configured pull-type insertion tool shown in FIG. 4 has the same stay ejection mechanism as does the control syringe-configured tool shown in FIGS. 5 and 6, but reverses the action of the insertion tool shown in FIG. 2 by using plunger-rod compression spring 245 to return trigger 261 to its forward position, which pulls plunger-blade or tongue 247 up into ejection slot 248 to eject stay 231. Since it would interfere with the descent of the next higher stay in the clip from being advanced (depressed) flush to the bottom of ejection slot 248, plunger-slide (thumb plunger-rod) 238 cannot be slidably engaged against the floor of ejection slot 248 by means of a guideway consisting of either positive or negative side tracks or rails.

Pulling back trigger 261 then draws plunger-blade or tongue 247 past the entry extension of the walls lining ejection slot 248, forcing the next stay 231 in the strip or clip of stays out the front end of stay ejection slot 248. Except for placement of battery 263 in the pistol grip portion and stay retention, retraction, and recovery electromagnet 242, of which the tip of magnetic conductor or probe 241 of stay retention, retraction and recovery electromagnet 242 must remain in contact with butt 256 rivet 258 during movement, the stay insertion mechanism—to include ejection slot 248 entry and exit extensions, stay tissue cement or other therapeutic fluid applicator air pump 264 tissue cement or other therapeutic fluid supply line (cement feed line, outflow line, applicator tube) 260, and end tip—is the same as that described for the control syringe-configured or push-type insertion tool shown in FIGS. 2, 3, and 9.

Stay Insertion Tool Inmate Stay Recall (Retraction) and Recovery Electromagnet

Because the insertion tool is devised to securely hold and move the stay during the ejection process, mispositioning will more often be due to operator error in choosing the insertion site than to malfunctioning of the tool. To allow a mispositioning stay to be recovered or if suitably positioned as level to it, returned into ejection slot 248 at any point during insertion prior to withdrawal or the insertion tool, the insertion tool is provided with inmate stay retention, retraction, and recovery electromagnet 242. A similar but larger (6 7/16 inches in length) and less specialized battery-powered electromagnetic probe 241 was described by Crawford, W. A. 1976. "Hand-held Electromagnet-probe," *American Mineralogist* 61(1-2):173, available at http://www.minsocam.org/ammin/AM61/AM61_173.pdf.

Depending upon the length of the tool, any outward bowing of the soft iron magnet probe 241 is prevented by restraint to its interface with the tool by means of a longitudinal rail-configured groove running along its back side which in assembly is slid over one or two complementary undercut projections, essentially railway track in cross-section, on the probe-facing side of tool barrel 239. Any sticking or excessive friction is prevented by coating these parts with polytetrafluoroethylene or nylon. Stay recovery and retraction probe 241 is not held to the side of tool barrel 239 by strapping it about to avoid an accumulation of debris or the creation of an opportunity for abrasive injury to the margin of the entry wound or other tissue adjacent to such a strap or straps.

Stay insertion tool stay retention, retraction, and recovery electromagnet 242 can be used in either of two ways: a. Normally on, and b. Normally off: Normally on operation consists of applying a steady magnetic field, generally of medium strength, throughout the stay ejection and insertion process. This maintains contact with the stay at every moment leading up to its acceptable placement at which time the current from the battery can be turned off. Maintaining the field up to that point prevents the loss of a stay in the body cavity and the need to locate it, and also makes possible its immediate retraction if it should incise or penetrate the ductus in any manner other than that desired.

At maximum field strength, it is possible to extract the stay even when fully implanted; however, the decision to retract is best made while still in contact with the stay so that it need not be relocated. Since increasing the field strength is accomplished in an instant, maintaining the field strength at extraction level needlessly drains battery 263. Normally off operation consists of energizing stay retention, retraction, and recovery electromagnet 242 as needed to the field strength appropriate, so that a moderate current is used to prevent a stay from dropping and high current used to retrieve a dropped stay or extract a stay that has already been mispositioned.

Battery 263, stay retention, retraction, and recovery electromagnet 242, and soft iron stay retention, retraction, and recovery electromagnet 242 conductor or core and probe 241 are connected to and move with thumb plunger-rod or shaft 238. Except in small sized tools, which use silver wire to generate the same magnetic field force in less space, stay retention, retraction, and recovery electromagnet 242 is wound with copper magnet wire. The armature or core of stay retention, retraction, and recovery electromagnet 242 extends downward (distad) as magnetic conductor or probe 241, connected by ferromagnetic (magnetoconductive) rivet 258 that runs through distal working end or base 257 to connect at its front end to plunger-blade or tongue 247.

As shown in FIG. 6 and FIG. 92 in the parent application, adhesion of stay 231 within the notch in the tip of stay ejection blade 247 and the recovery of a dropped stay or extraction of a stay not properly inserted as shown in FIG. 1 is obtained by manual adjustment of upper control knob 262 shown in FIGS. 2 and 9, which adjusts the current supplied by battery 263 through a variable resistor, and therewith, the magnetomotive force generated, to the field strength required. In an embodiment that uses an embedded microcontroller to adjust the magnetic strength at each phase of the ejection cycle, control of magnetic strength is automated, use of upper knob 262 only required to override the automatic setting as when a stay must be retrieved.

Stay retention, retraction, and recovery electromagnet 242 and battery 263 generate sufficient field strength for recovery without the need for a power supply and socket for connection of the same as an alternative power source. When rotated, upper knob 262 adjusts a miniature follower arm potentiometer of a kind obtainable from Placid Industries, Lake Placid, New York that controls the current drawn from battery 263. For control simplicity and to reduce the risk of inadvertent actuation or inactivation of stay recovery and retraction electromagnet 242, rotation of control knob 262 counterclockwise reduces the current down to zero. When not in use battery 263 is simply removed from its socket within the battery 263 compartment.

The instantaneous need to increase the field strength unpredictable, control of stay retention, retraction, and recovery electromagnet 242 is never relegated to automatic operation such as would, for example, shut down the current when stay ejection blade or tongue 247 begins to withdraw back into its slot. To demagnetize the probe, the variable resistor current control is turned all the way down and the polarity momentarily reversed. The stay insertion tool can be used as a hand-held tractive electromagnet to retrieve or portative electromagnet to move any small ferromagnetic object in or out of the body.

Once implantation is complete, even if the insertion tool has not yet been removed, extraction is least injurious by incision and closure with a suitable adhesive, such as butyl 2-cyanoacrylate or, which consists of a single component or Bioglue® Surgical Adhesive (CryoLife, Incorporated, Kennesaw, Georgia), which consists of two components and must therefore be delivered through an auxiliary two—the use of an harmonic scalpel avoided as thrombogenic. Further to allow plunger-blade or tongue 247 to be incorporated into a magnetic circuit that allows stays which have not inserted concentrically (misinserted, mispositioned) to be withdrawn, the parts about the plunger-blade or tongue 247 are formed of nonferromagnetic material, such as the plastic resins specified above.

Stay Insertion Tool Inmate Tissue Sealant and/or Medication Delivery Line

The stay insertion tool has a built in exit-coating (inmate tissue sealant and/or medication delivery line (ductus insertion incision and/or ductus-intramural adhesive-sealant delivery mechanism, inmate slit-sealer; inmate adhesive applicator) feature which is usually used to coat surgical cement onto the stays on exiting but can also be used to coat the stays with any kind of medication that can be prepared in a semiliquid or paste-like consistency. As addressed above in the section entitled Stay Insertion Tools, subsection Structure of Stay Insertion Tools, FIG. 2 shows a stay insertion tool with a built in (integral, inmate) adhesive (tissue cement, surgical cement), delivery line. This line can be used to deliver medication or medication mixed into the tissue cement.

Such medication includes antibiotics, antispasmodics, platelet blockers, anticoagulants, anti-inflammatory drugs, and so on. Medication for dispensing upon stay insertion may require the addition of a thickening or gelling agent, such as polysorbate 80 or monoglycerides of saturated or unsaturated higher carbon atom (12 to 20) fatty acids, such as stearic acid, palmitic acid, or oleic acid. Any use of the inmate tissue cement and/or medication delivery line can be coordinated with the dispensing of medication or a sealant from an auxiliary syringe or syringes as introduced above in the section entitled Administration of Target and Target-adjacent Implantation Preparatory Substances and addressed below in the section entitled Powered Stay Insertion Tool Holder for the Attachment of Medication or Tissue Sealant Syringes Whether Single, Dual, or Multi-chambered as Supplied, for Tool Slave-follower or Independent Use, in the parent application.

As described below in the section entitled Mechanism for Switching from Cement-ahead to Cement-follower Operation, the inmate delivery line can be used to coat both or only the upper surface of each stay with cement or medication. As described below in the section below entitled Mechanism for Adjustment in Stay Insertion Tool Ejection Cycle Inmate Cement Delivery Interval, when set to cement-follower operation, the onset of cement or medication discharge can be varied to coat the entire upper surface or only a portion of the trailing end of each stay.

As addressed in the section of the parent application entitled Arcuate Stent-stays (Stays, Stent-ribs, Ribs) or Stays for Use with Stent-jackets, stays for such use are usually given a deep surface texture to reduce the amount of adhesive that is wiped or squeegeed away when the stay penetrates the outer surface and moves through the ductus wall. The ability to carry forward a sufficient coating of adhesive ductus-intramurally can make it possible to apply an extraluminal stent even when the pre-test described below in the section entitled In Situ Test upon Endoluminal Approach for Intra- or Inter-laminar Separation (Delamination) reveals a lack of cohesion among the layers of the wall that would otherwise result in separation failure.

For this reason, cement or medication refill cartridge plunger-plug 234 (not to be confused with inmate cement or medication delivery line air pump 264 piston-plunger 233), is of the multiple elastomeric flange kind used in syringes. Piston-plunger 233 is intermittently driven forward under air pressure developed through the reciprocal action of the stay insertion tool, which as explained below, is adapted to provide integral air pump 264 shown in FIGS. 7 and 9. To reduce off-axis deflection and jamming of piston-plunger 233 in its channel, the upper surface of piston-plunger 233 is dished or hollowed out to concentrate the air pressure at the center.

The cartridges are individually sealed in sterile envelope packages and discarded following use. To allow the removal and insertion of adhesive and solvent flush cartridges, tool cap 243 is removable from the upper end of the tool and has an elastomer surround to compression airtight fit. The distal end of tissue cement/surgical adhesive-sealant refill cartridge 236 in refill cartridge compartment 235 is pressed onto and punctured by hollow puncture pin 237, and thumb-ring 244 is depressed until adhesive is brought to the tip of transparent adhesive delivery line 260, which filled is referred to as primed or charged.

Referring now to FIGS. 2, 5, 7, and 9, an inmate sealant (adhesive) application mechanism for sealing the incision through the adventitia produced by insertion of the stay eliminates the need for the alternate insertion and removal of a separate device through the access incision or cannula. With an inmate gluing mechanism, the seal can be accomplished as part of the insertion cycle without the need to relocate each incision. To this end, the reciprocating configuration of these tools lends themselves to the operation of air pump 264, which allows the elimination of numerous mechanical parts.

The ductus entry incision sealing mechanism consists of surgical cement, fluid therapeutic, medication, tissue strengthener or hardener, or binder-fixative tissue cement/surgical adhesive-sealant refill cartridge 236 in refill cartridge compartment 235, which accepts disposable surgical adhesive-sealant refill cartridges 236 in refill cartridge compartment 235. To allow air pump 266 to draw air without vacuuming cement back up through line 260, reciprocating air pump 266, seen as the upper portion of inmate tissue cement refill cartridge compartment 264 incorporates one-way or unidirectional air valve 265.

Air pump 266 comprises piston-plunger 233, connected to thumb plunger-rod 238 by tissue cement air pump piston arm or handle 267 that passes through a longitudinal slot in the side of the tool barrel 239, and adhesive delivery line or tube 260, which extends from cartridge puncture pin 237 to a forward extension overlying ejection slot 248. Sealing of the incision is completed by lightly pressing down on the insertion tool to tamp down the incision. Since the stays are significantly countersunk by the plunger-blade or tongue 247, which is longer, this may require cocking or inclining the tool forward or axially rotating it full circle to the opposite side of the ductus.

To function as a bellows-type air pump 266 without an air bladder, the longitudinal slot must be airtight. This is accomplished by molding air pump piston arm or handle 267 as integral with, and centered in as to appear to pass transversely through, a sliding cover 268, which extends up and down by half the length of the slot when air pump piston arm or handle 267 is positioned half way up or down the slot, and which is convex to the side facing pump 266 to flush fit against the inside of tube barrel 239. Since the sliding cover is twice as long as the slot, it will obturate all of the slot whether the arm is all the way up or down.

Figure 7:
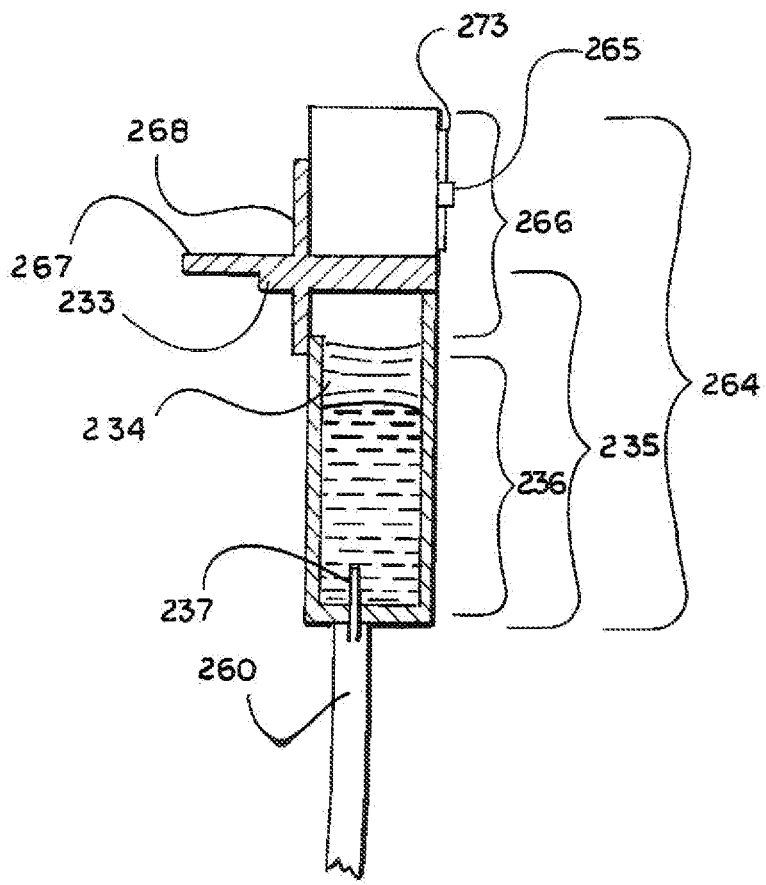
FIG. 7 shows a detailed section view of the sliding hole pressure relief mechanism used to reverse the direction of the starting height at which the cement or medication chamber pressurization piston in a stay insertion tool exerts air pressure on the column of cement or medication in the cement refill cartridge, thus initiating ejection of the cement or medication.

More specifically, as seen in FIG. 7, to prevent air from escaping through the slot along which tool cement chamber air pump 264 piston arm or handle 267 moves up and down, air pump piston arm or handle 267 has shorter airtight extensions at either side, an upward extension that is long enough to cover the upper portion of the slot when the piston is at its lowest position along the slot, and a downward extension that is long enough to cover the lower portion of the slot when air pump 264 piston-plunger 233 is at its highest position along the slot. Air pump piston arm or handle 267 passes through or is molded as integral with slot cover 268. These extension thus constitute a sliding slot cover with integral piston handle.

For low friction and strength, sliding cover and air pump piston arm or handle 267 is molded in one piece of nylon or a polymer especially formulated to make bearings, such as Iglide® or Drylin® polymer (not to be confused with the antibiotic of the same name) obtainable from Igus® Incorporated, East Providence, Rhode Island Sliding cover 268 is maintained in a straight up and down path and held flush to the internal wall of tool barrel 239 so that air is prevented from moving through the underlying slot by a strong and low friction nylon or Iglide® polymer frame that overfolds the edges of sliding cover 268 and serves as a slide-way.

The extension upward and downward from plunger-rod 239 to cement air pump piston 233 arm or handle 267, which is vertically centered on the outer surface (surface flush to the internal surface of tool barrel 239) of sliding cover 268 also serves to prevent air pump piston arm or handle 267 from deflecting or yielding to moment loads that would take piston arm out of perpendicularity with the central axis of the tool either vertically or horizontally. In a stay insertion tool capable only of cement-ahead operation, air pump piston arm or handle 267 is directly connected to thumb plunger-rod 238.

In embodiments that are capable of switching from cement-ahead to cement-follower operation, connection of the communicating arm with the thumb plunger-rod 238 is not direct but mediated through sprocket chain 252 that allows the direction up or down of the inmate cement air pump 264 piston-plunger 233 to be reversed according to which side of the sprocket chain 252 that pins extending from the plunger-rod 238 are made to engage. Then cement air pump 264 piston arm or handle 267 is connected through tool barrel 239 to sprocket chain 252 used to move air pump piston-plunger 233 up and down. The operator determines which side by twisting thumb-ring 244 one way or the other.

As described below in the section entitled Mechanism for Adjustment in Stay Insertion Tool Ejection Cycle Inmate Cement Delivery Interval, to set the height at which air can no longer escape from inmate cement air pump 266 upper portion of cement refill cartridge compartment 264, stay insertion tools capable of cement-follower operation are also equipped with a second slot and sliding cover. As an adjustable pressure relief valve, this second slot is airtight only when air pump 264 piston-plunger 233 approaches within the distance from the top of tissue cement/surgical adhesive-sealant refill cartridge 236 in refill cartridge compartment 235 at which the upper edge of the sliding cover has been set to cut off the escape of air thereby initiating pressurization against the refill cartridge refill plug plunger.

The substantially constant temperature and humidity in the catheter laboratory obviate the need for compensation in the air pump 264 mechanism. One-way air valve 265 admits a volume of air into air pump 266 upper portion of cement refill cartridge compartment 264, the pressure pushing down against air pump 264 piston-plunger 233, forcing refill cartridge 236 plunger-plug 234 downward incrementally with each additional incremental volume of air. This causes adhesive-sealant or medication refill cartridge air pump 264 piston-plunger 233 to expel adhesive-sealant within refill cartridge 236 down delivery tube 260 to the point of emission poised or positioned just above ejection slot forward extension 269 in FIG. 5, causing each stay 231 to be coated with adhesive upon ejection.

One-way air valve 265 not only serves to keep the pump airtight during the downstroke but allows piston 233 to freely return under the force of plunger-rod spring 245 to its elevated starting position without resistance due to a vacuum created by the occlusion of tissue cement supply line by cement. Purging of line 260 by means of flushing by connection to a syringe or cleaning cartridge containing a solvent is addressed in the section in the parent application entitled Stays Coated with a Heat-activated (-melted, -denatured) Tissue Adhesive-Hardener, or Binder-Fixative and that below entitled Use of Stay Insertion Tool.

Provided its dimensions allow, attachment alongside the stay insertion tool of an electrical cautery or harmonic scalpel by attachment with the clips addressed below in the section entitled Binding of Lines and Cables Alongside the Stay Insertion Tool is practicable, as is the attachment of a laser, lamp, or endoscope, the number of auxiliary cabled devices limited by the size of the entry portal. Unnecessary complexity is eliminated by allowing the direction of the air pump 264 piston-plunger 233 to move integrally with thumb plunger-rod 238 rather than to be reversed by alternative means such as gears, rack, ratchet, or levers, much less an electromechanical actuator.

With cement-ahead operation, the tissue cement or other fluid therapeutic substance within refill cartridge 236 is thus caused to discharge during the loading phase of the ejection cycle when the next stay 231 is seated in ejection slot 248 rather than during the ejection phase of the tool reciprocating action cycle. Any excess adhesive applied to the stays is then skimmed or squeegeed away by the upper lip of the ductus entry incision where it is easily wiped away if thought consequential or otherwise desired. Backward displacement of air pump 264 piston-plunger 233 during the stay insertion portion of the cycle exhausts air behind air pump 264 piston-plunger 233 through pressure equalization or exhaust one-way valve 235 while drawing air through one-way air valve 265.

As shown in FIGS. 2 and 7, the insertion tool inmate adhesive delivery mechanism consists of integral air pump 264, chamber for the insertion of adhesive cartridges as described, and a path for the delivery to the stays upon implantation of adhesive. As shown in FIG. 5, tissue cement within refill cartridge 236 passes through puncture pin 237 and down cement delivery (supply, feed) line or tube 260 to its distal terminus 269, overhanging the outlet of ejection slot 248.

Fastened along the front of the tool by means of an adhesive, cement delivery (supply, feed) line or tube 260 is made of any suitable polymer tubing and continues from adhesive puncture pin 237 over the top of stay refill strip compartment 250, down past the front of stay advancement compression spring 251 thence down the front of stay refill strip compartment 250, where it reaches down to overhang stay ejection slot 248 as overhang extension shown as 269 in FIG. 5. Shown in detail in FIG. 2 in the enlarged inset at the bottom and FIG. 5, which provides a further enlarged view, the distal tip or adhesive emitting end of adhesive delivery tube 260 is aligned to and overhangs ejection slot 248 front extension and in position to coat the upper surface of each stay with adhesive as each is ejected.

Forward displacement of air pump 264 piston-plunger 233 in the stay seating portion of the cycle then forces the air trapped in air-tight refill cartridge compartment 264 in FIG. 7 between the front of air pump 264 piston-plunger 233 and the surface of adhesive cement or medication refill cartridge 236 plunger-plug 234 against tissue cement air pump plunger-piston 233 driving tissue cement refill cartridge plunger-plug 234 farther down into surgical cement, fluid therapeutic, medication, tissue strengthener or hardener, or binder-fixative refill cartridge compartment 235 causing the equivalent volume of tissue cement in refill cartridge 236 through adhesive delivery line 260 and through ejection slot 248 overhanging outlet tip 269.

Each time air pump 264 piston 233 is retracted, an additional volume amount of air is introduced through one-way air valve 265 into air pump 266 upper portion of inmate tissue cement compartment 264. Thus, air pump 264 piston-plunger 233 is incrementally driven forward by an equivalent distance for each volume of air added to the air column trapped in air pump 264. Access to the battery 263, adhesive-sealant cartridge, and stay refill chambers, of which the interiors are contoured to conform to and thus secure the refills, is through side entry snap covers of the kind used to cover the compartment used to contain the replaceable battery in the back of a pocket calculator, that for the adhesive cartridge (not shown) requiring to be airtight.

Sealing of Stay Insertion Incisions

Studies of the efficacy of cyanoacrylate cements for tissue-tissue and tissue-implant bonding can disagree, such studies mostly limited to a specific application of a specific cyanoacrylate cement, with none related to the repair contemplated herein (see, for example, Halli, R., Joshi, A., Kini, Y., Kharkar, V., and Hebbale, M. 2012. "Retrospective Analysis of Sutureless Skin Closure in Cleft Lip Repair," *Journal of Craniofacial Surgery* 23(1):e40-44; Fortelny, R. H., Petter-Puchner, A. H., Walder, N., Mittermayr, R., Ohlinger, W., Heinze, A., and Redl, H. 2007. "Cyanoacrylate Tissue Sealant Impairs Tissue Integration of Macroporous Mesh in Experimental Hernia Repair," *Surgical Endoscopy* 21(10):1781-1785; Paajanen, H., Kössi, J., Silvasti, S., Hulmi, T., and Hakala, T. 2011. "Randomized Clinical Trial of Tissue Glue Versus Absorbable Sutures for Mesh Fixation in Local Anaesthetic Lichtenstein Hernia Repair," *British Journal of Surgery* 98(9):1245-1251; Testini, M., Lissidini, G., Poli, E., Gurrado, A., Lardo, D., and Piccinni, G. 2010. "A Single-surgeon Randomized Trial Comparing Sutures, N-butyl-2-cyanoacrylate and Human Fibrin Glue for Mesh Fixation during Primary Inguinal Hernia Repair," *Canadian Journal of Surgery* 53(3):155-160; Dilege, E., Deveci, U., Erbil, Y., Dinççağ, A., Seven, R., Ozarmagan, S., Mercan, S., and Barbaros, U. 2010. "N-butyl Cyanoacrylate Versus Conventional Suturing for Fixation of Meshes in an Incisional Hernia Model," *Journal of Investigative Surgery* 23(5):262-266). Accordingly, reference to the sealing of stay incisions with a cyanoacrylate cement rather than a fibrin tissue adhesive, for example, is exemplary.

Reviews of the different type adhesives are, however available (see, for example, Duarte, A. P., Coelho, J. F., Bordado, J. C., Cidade, M. T., and Gil, M. H. 2011. "Surgical Adhesives: Systematic Review of the Main Types and Development Forecast," *Progress in Polymer Science* Published online by Elsevier, December 2011; Peng, H. T. and Pang, N. S. 2010. "Novel Wound Sealants: Biomaterials and Applications," Expert Reviews 7 5): 639-659; Ryou, M. and Thompson, C. C. 2006. "Tissue Adhesives: A Review," *Techniques in Gastrointestinal Endoscopy* 8(1):33-37).

When a tissue adhesive strengthener or binder-hardener—essentially, a surgical adhesive that remains pliant once cured—refill cartridge is inserted into the bottom of inmate cement air pump 264, in FIGS. 7 and 9 the stay insertion tool applies a fluid adhesive, such as Ethicon Omnex™ cyanoacrylate surgical sealant, in cement-ahead operation, to the outer surface of the ductus before each stay is ejected, or in cement-follower operation, to a variable length along the upper surface of each stay as it exits the insertion tool ejection slot. The means for varying the moment of onset for cement or medication discharge when the tool is set to cement-follower operation is described below in the section entitled Mechanism for Adjustment in Stay Insertion Tool Ejection Cycle Inmate Cement Delivery Interval.

The adhesive is used to a. Quickly seal the incision made by the stay as it passes through the outer surface of and into the ductus, or the stay insertion incision, and in conjunction with an encapsulating solid collagen and/or albumin solder adhesive-tissue strengthener, binder-fixative, or hardener that jackets about stays configured thus and remains solid at room temperature but flows (melts, denatures) when heated, b. Securely bond the stay between the layers embedding it within the lumen wall and thus reduce the possibility for 1. Intra- or inter-laminar separation within the wall of the ductus as would draw the stay and layers radially outward to the stay toward the bar magnets about the stent-jacket leaving the lumen unaffected, or in a nonferromagnetic stay that is not kept under outward radial tractive force, such as a medication stay, 2. Gradual migration through penetration adaxially (toward the long axis lumen, inward) as could eventually lead to intimal perforation if not the entry of a stay into the lumen before the stay became completely absorbed.

The risk for a stay to penetrate into the lumen as the result of an accidental blow (rather than the intrinsic motility in the wall of the ductus) varies inversely as the quantity of tissue intervening between the stays and the exterior. The solid protein solder is formulated as a cool melt to flow at a temperature lower than would injure the surrounding tissue. For consistency with and familiarity to the prior art, the solder can be applied to pores within a thin membranous coating of an absorbable polymer about the stay that can release medication as it is absorbed, for example. Applied as indicated, the exothermy of polymerization and vapor of cyanoacrylate cement are considered insignificant.

Cement-Before Insertion (Cement-Ahead Operation)

Cement-ahead operation is the coating of the ductus to be stayed with cement just before the stay is ejected through the cement into the wall of the ductus. To reduce run-away, cements and medication for such use should be thicker or incrassated and viscid. The stay thus carries forward cement into the ductus. The apparatus to be described incorporates mechanical means for applying cement or any other fluid substance such as medication via the inmate tissue cement delivery line. Cement-ahead operation with an attached or auxiliary syringe is achieved by adjusting the timing of auxiliary syringe discharge relative to the stay ejection cycle of the tool.

The wiping away or squeegee effect of the top and bottom surfaces of the stay as it sweeps past the edges of its adventitial incision or stay insertion incision as it enters the ductus can be lessened by using implants that have indentations, ribs, or grooves and a textured surface that retains and carry forward adhesive. This is especially advantageous in cement-ahead or cement-before insertion operation whereby surgical cement is expelled onto the surface of the ductus just prior to passing the stay through the adventitia to carry some of the cement forward into the ductus wall thus reducing the risk of laminar separation under the tractive force exerted by a magnetic stent-jacket.

Preliminary tests for quantifying a ductus-intramural propensity for laminar separation are described below for both endoluminal (miniball, ballistic) and extraluminal (stay) approach. Such surfacing also allows increased uptake of adhesive and the quicker transmission of heat, which is used, for example, to denature or melt a coating of solid solder adhesive strengthener, binder-fixative, or hardener used when the wall of the ductus is found by one of the test to be described as internally weakened. The preparation of anticoagulants in lyophilized (freeze-dried) form, to include heparin salts such as heparin lithium, the lithium salt of heparinic acid prepared using ion-exchange technology from heparin sodium, has long been practiced for preserving blood (see, for example, Shimizu, A. and Ichikawa, T. 1986. "Blood Collector," U.S. Pat. No. 4,595,021).

Lyophilized warfarin sodium is sold as a powder for intravenous injection following reconstitution. Whether the more proximate placement of miniballs obtained using machine controlled discharge imparts a weakening of the intima and media as disposes toward aneurysmal failure requires study; if so, then the stent jacket should be placed in position prior to initiating discharge, just as it should when aneurysm looms for any reason. Because the stent jacket is compliant and the distance slight, that the magnets act in a bistable way as to abruptly seize or 'yank' a ferromagnetic object when the field strength meets a certain value does not mean that an extraluminal stent interferes with the normal motility intrinsic in the ductus wall.

Essentially, the lumen wall is drawn little, or if previously occlusive tissue has been ablated, no farther outward than in normal function and under less and less rapidly changing force, so that the risks of the media if not the adventitia in which the miniballs have been implanted intra- or interlaminarly separating (delaminating) and of stretching injury are slight. To be certain that the normal relaxed or quiescent diameter of the ductus plus any additional diameter that may be needed to achieve luminal patency over the affected segment is not significantly exceeded by the internal diameter of the stent jacket to be applied, the ductus should be measured with a caliper and the reading matched to the internal diameter specified on the stent jacket package.

Slightly additional retraction to a larger diameter of the ductus may sometimes be necessary, but if not kept to the minimum, will begin to undo the advantage over a nonendoluminal stent of avoiding interference with the normal function of the smooth muscle. If the ductus is only temporarily swollen, a stent jacket with an expansion insert is used, as described in the section of the parent application entitled Expansion Inserts for Time-discrete Decremental Contraction of Stent-jackets, Comminutable and Meltable. Nevertheless, in basic contrast with endoluminal stents, the extraluminal stent will be more compliant with the intrinsic motility or involuntary smooth muscle action passing through the wall of the substrate ductus.

Even when a stenotic condition necessitates retraction to a wider diameter, a magnetic stent jacket will yield, albeit with increased circumferential resistance, to the further expansion of the ductus, that is, even when owing to the greater magnetic field strength required, compliance must be somewhat reduced. Circumferential compliance will be somewhat reduced when the use of a stent jacket with expansion insert has incorporated more powerful magnets. Unless the internal surface of the stent jacket presents much friction or the magnets used are strong, the circumferential mobility of the diffuse outer adventitia and the lesser resistance of a magnetic field to sidewise deflection should afford some compliance.

Absent extenuating circumstances, such as the presence of a tacky exudate, extravasated blood, or the like, a non-magnetic stent-jacket, especially when the internal surface of the base-tube is low in friction and without a lining as would resist circumferential displacement or a sliding relation between the adventitia and internal surface of the base-tube at their interface can usually move with the walls of the lumen. From the moment of insertion, the extraluminal stent is immediately and instantly compliant in a way that a slowly and limitedly shape adaptive Nitinol stent cannot approach.

Between its longitudinal bars of neodymium lanthanoid, or lanthanide, of which each can be magnetized parallel to their thickness to provide more than one pole directed radially towards the central axis of the lumen, the base tubing of an extraluminal stent-jacket can be slit, perforated, or slotted to enhance compliance with smooth muscle action, and perforation or slotting will also serve to expose the outer surface of the ductus to its normal chemical environment. Small, delimited, and distantly spaced punctures of the internal elastic lamina do not represent injury equivalent to the running dissection of a vessel as the result of balloon overinflation which can lead to shrinkage, intimal hyperplasia, and restenosis, and is certainly not equivalent to rupture. Stress relief afforded by an extraluminal stent (see Berry, et al. 2002, cited above) is not approachable by an intraluminal stent.

In contrast to this least initial trauma of endoluminal stents, the extraluminal stenting to be described requires not only transluminal access to place an intraductal component subadventitially, but extraductal entry through a separate incision or entry wound to allow permural access for placement of an extraductal component, or stent-jacket. The intraductal component consists of miniature ferromagnetic balls that implanted ballistically, produce some tearing and bruising that can result in inflammation, which is, however, medically manageable and short lived. The detailed responses of the lumen wall to ballistic implantation of internal origin are distinct from the form of injury, edematous swelling, and ensuing inflammation that are seen following injury to tissue exposed to the environment where dermal and muscle cells are crushed in depth and many tiny vessels torn.

Except where percutaneous access is unavoidable using conventional means as in the ureters, this situates extraluminal stenting on the trauma scale as intermediate between intraluminal stenting and open surgery. Essentially, conventional or intraluminal stenting trades initial placement with relatively little trauma but the probability of complications that will increase in severity over time for short-term inflammation as the result of some cell-crushing, tearing and bruising, edematous swelling, in larger vessels, some vasa vasorum bleeding, and the need for an arteriotomy to place the stent-jacket, but thereafter, as with high-quality dental restorations, relative freedom from long-term complications.

In fact, just as might the methods described herein, conventional methods occasionally result in unpredictable injury and adverse sequelae, no procedure known being capable of avoiding this prospect. Since medical surveillance is close while the patient is still in the hospital and immediately following discharge, the earlier unavoidable sequelae appear, the more will there be the opportunity for successful management. In addition to the administration of a systemic platelet blocker or anticoagulant, miniballs may have to be wetted or coated with such medication; however, continued irritation from an endoluminal stent will not follow, so that such medication can soon be discontinued.

Introduced from outside the vessel, stays avoid the lumen entirely, making platelet blockade or an anticoagulant unnecessary. In blood vessels, the introduction of multiple punctures into the media is more thrombogenic than are an angioplasty and the insertion of an endoluminal stent. The apparatus and methods described herein are applicable to ductus other than vascular, but the risk of thrombogenesis pertains to blood vessels. Nevertheless, when access to the outer surface of an artery would necessitate much dissection or the extension of disease does not permit using the slower process of inserting stays, miniballs are implanted quickly with a barrel-assembly.

This applies whether the implants are to remain permanently or temporarily; it is necessary to distinguish between the extraction and the complete removal from the body of implants. As noted above, the apparatus allows the use of radioactive implants on a temporary basis. These must not merely be extracted from the implantation site but removed from the body entirely. The same may apply to erroneously placed medication miniballs.

Sealant Cartridges and Sealants (Adhesives)

This section will address adhesive or sealant cartridges for insertion into stay insertion tools. An auxiliary adapter for attaching an additional commercial dual or other multichamber (multicompartmental) syringe alongside the tool is described below in the section entitled Powered Stay Insertion Tool Holder for the Attachment of Medication or Tissue Sealant Syringes Whether Single, Dual, or Multi-chambered as Supplied for Tool Slave follower or Independent Use. As shown in FIG. 2, the disposable refill cartridges or capsules 236 combine features of disposable hypodermic syringes, refill tubes used in caulking and greasing guns, and airgun $CO_2$ canisters (cartridges, 'pistolets,' 'powerlets').

Cement refill cartridges 236 are essentially shortened and miniaturized caulk tubes that are punctured at the outflow end by means of hollow hypodermic type needle type puncture pin or needle 237 fixed in position at the bottom or distal end of the adhesive refill chamber. FIG. 2 shows a single glue column for a single-component adhesive, which pending the availability of fully absorbed cyanoacrylate-based cements, is preferably octyl-cyanoacrylate or N-butyl-2-cyanoacrylate cement, if not a longer chain acrylate cement. Long-chain cyanoacrylate cements have the advantages of consisting of a single component, which makes the use of the single puncture needle 237 possible and providing significantly greater bond strength than any other type of adhesive.

Mechanism for Adjustment in Stay Insertion Tool Ejection Cycle Inmate Cement Delivery Interval The initiation and duration or interval in the stay ejection cycle during which the adhesive is ejected can be adjusted to coat only the trailing end of each stay, so that only the incision through which the stay entered the ductus will receive glue, or to coat the entire upper (convex) surface of each stay as it is ejected from the insertion tool. The latter is used when it will serve the better to bond the stay and the layers embedding it together or when the heat to denature a solid protein solder would best be avoided, except that owing to a propensity toward separation among the layers in the ductus wall, additional cyanoacrylate cement is essential to compensate for this omission.

In connection with adjustment in the interval and timing of sealant ejection relative to magnetic stent stay ejection and cement-follower operation, the fact that the adhesive has not set when the stent jacket is later placed is inconsequential. Adhesives that set before the stent-jacket can be placed should not be permitted to present a protrusive contour, however. For this reason, quick-setting adhesives should routinely be smoothed flush to the adventitial surface while still fluid. The same applies to the use of any adhesive, such as one applied with the aid of an auxiliary syringe as is described below. Turning now to FIG. 7, one-way or check air intake valve 265 will allow air to move only into adhesive air pump 266 in the upper portion of cement refill cartridge compartment 264 when cement or medication air pump piston-plunger 233 ascends.

Unless it is preferred to use air pump 266 piston 233 as a one-way intake valve that allows blow-by about its periphery upon ascending analogous to the unidirectional compression seen in a bicycle tire air pump piston, the fit within adhesive air pump cylinder constituting the portion of compartment 266 beneath cement piston plunger 233 of cement or medication air pump piston-plunger 233 is airtight. When the operator pushes down on thumb-ring 244, air pump piston-plunger 233 is pushed down, causing the pressure built up in adhesive air pump cylinder constituting compartment 266 beneath cement piston plunger 233 to be channeled through cement refill cartridge puncture pin 237 forcing adhesive or other fluid 236 down tissue cement or therapeutic fluid delivery line 260 and out at its lower end overhang 269 just above stay ejection slot 248.

Thus, to coat a stay over its upper surface, one-way air intake valve 265 is closed throughout the pressurized downstroke of the stay loading phase or stroke of the ejection cycle and open on the spring-return of air pump piston-plunger 233 during the upstroke or ejection phase of the cycle. Still referring to FIG. 7, the excursion (stroke, displacement) of pump piston 233 fixed as part of the ejection mechanism, the cement delivery interval is made adjustable by placing the aperture of one-way air intake valve 265 at the center of A vertically oriented sliding panel or slot cover 273. To prevent air from leaking out of the pump 266 compartment while the volume is adjusted, sliding panel or slot cover 273 has upward and downward extensions that cover over portions of the slot that would otherwise be open to the outside.

Sliding slot cover 273 is mounted on the outside of the upper portion of tissue cement refill cartridge compartment 264 air pump 266 so as to slide up and down along a vertical way. Sliding extensions 268 of pump piston 233 and one-way air intake valve 265 function independently and cannot be combined, a valve positioned thus inaccessible to the operator or outside air. One-way air intake valve 265 hole-slide 273 moves over a vertical slot in the side wall of adhesive air pump cylinder 266 and thus prevents any buildup of pressure against the top of surgical cement, fluid therapeutic, medication, tissue strengthener, binder-fixative, or hardener, or fixative cement plunger plug 234 until air pump piston-plunger 233 has descended alongside the hole to cover it over, at which level the air within the cylinder begins to be compressed as piston-plunger 233 and tissue cement refill cartridge plunger-plug 234 continues to travel downwards.

The moment of onset and duration within the insertion tool cycle that pressure is applied to surgical cement, fluid therapeutic, medication, tissue strengthener, binder-fixative, or hardener, or fixative refill cartridge compartment 235 piston-plug 234 and adhesive continues to be ejected can thus be varied according to how high up the side wall of inmate cement air pump cylinder or compartment 266 side hole 265 is slid. As other sliding controls herein to include that incorporated into the valve body of airguns, one-way air valve 265 in vertically oriented sliding panel or slot cover 273 is calibrated or graduated to allow precisely repeatable settings.

An isolated hole for the purpose of coating only the trailing end of each stay as it ejected through ejection slot 248 would require inordinate precision increasing the cost to provide the tool, whereas incorporating a slidable cover over a much elongated hole or slot contributes not only 'trimmer' adjustability for such use but equally important, allows the extent of the upper surface of each stay to receive adhesive to be varied. Accordingly, slidable slot cover 273 is similar in conformation to that incorporated into the valve body of the airgun for adjusting the exit velocity seen in FIG. 47 of the parent application but smaller.

The airtight sliding slot cover is oriented so that the slot is progressively covered (obturated) moving upwards, in which case only the rear tip of each stay will receive cement. By continuing to move air valve 265 in vertically oriented sliding panel or slot cover 273 upwards, the length of piston stroke downward through cement air pump or air pressure cylinder 266 until the piston covers the side opening to prevent the escape of air is reduced, thus initiating the imposition of pressure on puncture pin 237 earlier in the insertion tool ejection cycle.

The cement is thus caused to cover each stay as it is ejected beginning at a distance along the stay that is at or more closely toward its forward (leading, incisive) end. Pushing down the sliding slot cover reduces the adhesive ejection portion of the stoke. When pushed all the way down, the ejection of adhesive is limited to the trailing tip of each stay. To avoid the use of an adhesive entirely, the adhesive cartridge is not inserted into the tool or is removed at the point in the procedure where the use of adhesive is no longer desired.

Control Over the Quantity of Fluid Discharged

The mechanism described above for adjusting the length of the stroke from the bottom up to the point along the chamber where the sliding hole one way intake and exhaust air valve 265 is placed to initiate pressurization and the discharge of contents from the chamber when the piston descends past this point not only satisfies the requirement for a volume or quantity control, but effects discharge with the timing preferred. Specifically, in cement-ahead operation, during which the cement or medication is emitted during the downstroke of thumb plunger-rod 238, to make the quantity of substance emitted dependent upon the height of the closing segment of the stroke results in the less than full stroke amount of cement or medication being delivered toward the end of the stroke minimizing run-away.

In cement-follower operation, during which the cement or medication is emitted during the return of thumb plunger-rod 238 to its undepressed or starting position, setting the initiation of pressurization closer and closer to the end of the stroke results in the deposition of cement or medication in correspondingly smaller and smaller amounts and closer and closer to the trailing tip of the stay. Set to the lowest point, the least cement or medication will be deposited to seal the insertion incision made by the stay upon entering the ductus. Since the trailing tip will be the primary if not the only target for the deposition of cement, that in cement-ahead operation the mechanism cannot deposit cement farther ahead onto the upper surface of the stay while omitting cement at the trailing tip is not disadvantageous. There would appear never to be a reason for coating only portions of the stay ahead of the trailing tip.

Mechanism for Switching from Cement-Ahead to Cement-Follower Operation

This divisional application going to the medical utility of stays and stay insertion tools and not the detailed internal mechanism of stay insertion tools, references to drawing figures showing detailed structure of the internal mechanism appear in the parent application hereto, namely Ser. No. 15/932,172, entitled Integrated System for the Infixion and Retrieval of Implants, readily available online. However, to the extent that the detailed mechanism of a stay insertion tool bears upon its medical utility, reference thereto is made in this section.

Referring now to FIGS. 97 thru 99 of the parent application, in a stay insertion tool embodiment that is capable only of cement-ahead or cement-follower operation but not switchable between the two, air pump piston arm or handle 267 of stay insertion tool inmate sealant or medication delivery system air pump piston-plunger 233 is directly connected to thumb plunger-rod 238 with the piston starting position at the top of the cylinder (cement chamber) so that cement is emitted on the downstrokes before stay ejection or on the spring returned upstrokes during ejection respectively. In an embodiment that allows switching between these two modes of operation, the piston starting position is midway along the stroke.

Still referring to FIGS. 97 thru 99 of the parent application, the ability to switch between cement-ahead and cement-follower operation is obtained through the interposition between thumb plunger-rod 238 and air pump piston-plunger 233 of a direction-reversing rope ladder-configured sprocket chain 252 made of a tough and inflexible bearing polymer, such as polyoxymethylene homo (DuPont Delrin®) or copolymer (Korea Engineering Plastics Company Kepital®, Celanese Corporation Celcon® and Hostaform®, or Mitsubishi Engineering-Plastics Lupital®, engineering grade polyacetal resins available from many firms under many tradenames) which determines whether depressing thumb plunger-rod 238 will drive air pump piston-plunger 233 upwards or downwards.

Inmate tissue cement air pump 266 piston 233, shown in detail in FIG. 7 and in situ in FIGS. 2 and 9, is permanently fastened to one run of sprocket chain 252 by air pump piston arm or handle 267. Connection of sprocket chain 252 to thumb plunger-rod 238 is by sprocket chain engagement arm 272, such that rotating thumb-ring 244 with thumb plunger-rod 238 and sprocket chain engagement arm 272 through 360 degrees rotates sprocket engagement arm 272 to engage the opposite run of sprocket chain 252, so that inmate tissue cement air pump piston 233 is raised or lowered accordingly, whereas rotating thumb-ring 244 180 degrees to the center position disengages thumb plunger-rod 238 from sprocket chain 252, disabling inmate tissue cement air pump 264. Sprocket chain or belt engagement arm 272 is permanently fastened to, and therefore rises, descends, and rotates with thumb-ring 244 and thumb plunger-rod 238.

Shown in FIGS. 96 and 97 of the parent application, sprocket chain engagement arm 272 engages sprocket chain 252 at either end of a tee or perpendicular cross-piece at its distal end, or that end facing sprocket chain 252, only when thumb-ring 244 and thumb plunger-rod 238 are fully rotated either clockwise or counterclockwise, the pointed ends of the cross-piece then fitting into spaces separating consecutive rungs in sprocket chain 252. Unless engaged by rotation of thumb-ring 244 and thumb plunger-rod 238, sprocket to air pump piston 233 arm or handle 267 and sprocket chain 252 remain motionless, inmate stay tissue cement coating air pump then disconnected from thumb plunger-rod 238 and therefore disabled.

Sprocket chain engagement arm 272 with distal tee cross-piece is preferably machined, cast, or die-cut in one piece. Alternatively, the end tee cross-piece can be a hard fine rod or wire passed through or fastened toward or at the distal end of arm 272. Rotating thumb-ring 244 and thumb-rod 238 clockwise or counterclockwise through 360 degrees thus rotates sprocket chain engagement arm 272 so that it engages switches engagement of arm 272 between the oppositely directed runs of sprocket chain 252, thus driving sprocket chain 252 either up or down and reversing the direction of inmate tissue cement air pump piston 233.

Thus, the operator determines whether the direction of air pump piston-plunger 233 will be upwards or downwards by rotating thumb-ring 244 beyond its freely rotated arc to either side (clockwise or counterclockwise), and in so doing, determines which side of sprocket chain 252 will be engaged and driven downward by thumb plunger-rod 238, by intromission into the right or left sprocket run of either the right or left tip of the upper cross-piece of tee-configured sprocket belt engagement arm 272 that extends from thumb plunger-rod 238. To this end, air pump piston 233 arm or handle 267 is permanently fastened to one side of sprocket chain 252, this junction being inflexible and the run of sprocket chain 252 used centered on air pump piston 233 arm or handle 267.

Unless the tool is unusually long, thumb plunger-rod 238 remains centered within tool barrel 239 by its connections above and below. If necessary, intervening spacing washers or ferrules bonded about their circumference to the internal surface of tool barrel 239 are used to center thumb plunger-rod 238. Upper sprocket wheel 270 and lower sprocket wheel 271 are made of a strong and low friction polymer used to make bearings, such as Iglide® or Drylin,® obtainable from Igus® Incorporated, East Providence, Rhode Island or nylon. Sliding air valve 265 sliding panel or slot cover 273 as such is identical to that used in an embodiment which is incapable of switching between cement-ahead and cement follower operation.

However, air pump piston arm or handle 267 is not attached directly to thumb plunger-rod 238 but instead fastened to sprocket chain 252, which can be engaged by thumb plunger-rod 238 on its run at either side. Relating this action to switching between cement or following operation, the rotational angles of the two detent ridges beyond the ends of the free rotation of thumb-ring 244 are the same as the angles at which either side-looking point facing out from the end of sprocket chain communicating arm 272 engages the run of sprocket chain 252 to either side.

As indicated, rotating thumb-ring 244 clockwise as seen from above thus rotates thumb plunger-rod 238 and air pump piston arm or handle 267 causing the right-hand extension of piston arm 267 to engage the right-hand run of sprocket chain 252, which moving in the same direction as thumb plunger-rod 238 causes cement air pump piston-plunger 233 to descend in cement-ahead mode. Rotating thumb-ring 244 in the opposite direction causes air pump piston arm 267 to engage the rising run of sprocket chain 252 so that thumb plunger-rod 238 and air pump piston-plunger 233 move in opposite directions in cement-follow mode.

That is, when the side or run of sprocket chain 252, to which piston arm 267 is permanently fastened, is engaged by either side-looking point facing out from the end of sprocket chain communicating arm 272, which is permanently fastened to thumb plunger-rod 238, downstroke of thumb plunger-rod 238 moves air pump piston-plunger 233 downwards, resulting in cement-ahead operation. When either side-looking point facing out from the end of sprocket chain communicating arm 272 engages the sprocket chain 252 at the other side, downstroke of thumb plunger-rod 238 moves air pump piston-plunger 233 upwards, so that it the air in cement air pump 264 is pressurized when the operator releases downward force on thumb plunger-rod 238, which then returns to its raised position under the restorative force of thumb rod return compression spring 245.

As shown in FIGS. 97, 98, and 99 of the parent application, upper sprocket wheel 270 and lower sprocket wheel 271 are securely anchored to the inner wall of tool barrel 239, one above the upper reach of the upward extension of one-way air valve sliding slot cover 273 and the other below the lower reach of the downward extension. During ejection of refill cartridge 235, air pump piston 233 is resisted by the friction posed by cement refill cartridge plug-piston 234, the resistance to outflow imposed by the small aperture of puncture pin 237, and the small diameter of cement feed or supply line 260. To resist moment loads that would lever and break off or jam air pump piston 233 under this resistance, air pump piston arm 267 is kept short and the attachments of arm 267 to sprocket chain 252 and air pump piston arm 267 made strong and rigid.

The permanent connection between cement air pump air pump piston-plunger 233 and its side of sprocket chain 252 must be rigid to minimize nonperpendicular movement of air pump piston-plunger 233 as could result in seizing against the sides of cement compartment 264. Upper sprocket wheel 270 and lower sprocket wheel 271 are accordingly offset to the same side. Rather than using a separate ferrule spacer, upper sprocket wheel 270 and lower sprocket wheel 271 have integral hubs that axially extend from the rear of each sprocket wheel 270 and 271 to the inner wall of tool barrel 239. The spacing afforded by these hubs prevent the teeth of sprocket wheels 270 and 271 from coming into contact with the internal surface of tool barrel 239.

Sprocket wheels 270 and 271 are fastened to tool barrel 239 by means of nonmagnetic stainless steel wide-head rivets 274 and 275 shown in FIG. 96 of the parent application that serve as axles. Made of a metal or plastic, tool barrel 239 must be sufficiently thick and tough to secure rivets 274 and 275, which can be countersunk flush to the outer surface of tool barrel 239. Which side of sprocket chain 252 moves up and which down is arbitrary, but for uniformity, that to the left can be chosen for downward movement along with thumb plunger-rod 238 and thus cement-ahead operation. The counterclockwise detent reached by twisting thumb-ring 244 to engage the left hand run of sprocket chain 252 is indicated by engraving or embossing cap 243 with a tick-mark labeled "C-A" for cement-ahead operation.

For smooth movement as well as airtightness, cement or medication air pump piston-plunger 233 has a surrounding elastomeric annulus. To minimize tool girth and therewith the length of the incisions required to insert an insertion tool of given length to its maximum intracorporeal depth as well as to stabilize and reduce play in the sprocket belt 252 and the parts that engage sprocket chain 252, tool barrel 239 is the smallest diameter that allows sprocket chain 252 free movement. Below the upper segment that accommodates the foregoing mechanism, the diameter of tool barrel 239 is reduced to serve as a sleeve for the reciprocal movement of thumb plunger-rod 238.

The mechanism for adjusting the moment of cement ejection onset and duration is described above in the section entitled Mechanism for Adjustment in Stay Insertion Tool Ejection Cycle Inmate Cement Delivery Interval. Accordingly, by rotating thumb-ring 244 from one rotatory detent position to the other, the direction as up or down of cement air pump piston-plunger (cement piston, cement pressurization piston) 233 upon depression of thumb-ring 244 and thumb plunger-rod 238 is reversed allowing immediate conversion from cement-ahead to cement-follower operation, which is addressed above in the section entitled Cement-before Insertion or Cement-ahead Operation.

Upon the release of downward force by the operator of thumb-ring 244, compression spring 245 returns thumb rod or shaft 238 to the top stop position. If the restorative force encounters a condition of adventitial sclerosis, the operator forcibly pulls up his thumb against the superjacent (upper, overlying) arc of thumb-ring 244. So that a stay may continue to be recalled (retrieved, retracted, recovered) at any moment preceding its satisfactory placement, stay retention, retraction, and recovery electromagnet 242 conductor or probe 241 must remain in contact with heel 246 of stay ejection blade or tongue 247.

Thus, whereas the top of battery and magnet in stay retention, retraction, and recovery electromagnet 242 compartment to the left moves down and up in relation to cap 243 at the top of its run, the top of adhesive compartment 235 is affixed to cap 243. It does this by releasing cement onto the ductus when stay ejection blade or tongue 247, viewable in FIGS. 5 and 6, is drawn out from ejection slot 248 just before thumb rod or thumb plunger-rod 238 is released, allowing stay refill strip advancement compression spring 245 to draw stay ejection blade 247 up through ejection slot 248, thereby driving the next stay in stay refill strip or clip 250 into ductus 1.

By setting cement ejection to a slight interval before each stay is ejected, some is deposited on the adventitia so that the stay is coated on its underside. When the cement delivery system is configured thus, the adhesive interval adjustment described below in the section entitled Mechanism for Adjustment in Stay Insertion Tool Ejection Cycle Inmate Cement Delivery Interval is used to adjust the amount of cement applied to the outer surface of the ductus. By contrast, the configuration, hence, operation of the inverted cement delivery system incorporated in the embodiment of FIG. 4 is the reverse of that shown in FIGS. 5; 6, 7, and 9, in that cement is ejected when thumb plunger-rod 238 is returned to the raised position, retracting rather than advancing ejection blade 247 through ejection slot 248.

Cement delivery by the cement air pump mechanism in a pistol-configured embodiment may accordingly be characterized as a cement-ahead system, whereas that provided by the control syringe-configured embodiment shown in FIGS. 2, 5, 7, and 9 is a cement-follower system. Accordingly, unless the adhesive interval adjustment described above is used to forestall the initiation of cement outflow, cement will eject in synchrony with the ejection of stay 231, that is, throughout the interval that stay 231 continues to eject. The adhesive interval adjustment described below thus allows the detention of cement delivery onto a rearward extent of the upper surface of each stay 231, which extent is variable. Reversed operation expels cement only during stay ejection.

The mechanism described below in the section entitled Mechanism for Adjustment in Stay Insertion Tool Ejection Cycle Inmate Cement Delivery Interval is intended to allow adjustment in the moment in the tool operational cycle for the start and duration of cement delivery. With cement-ahead operation, stay 231 is inserted subadventitially into ductus 1 by pointed incision through the previously deposited cement or tissue adhesive strengthener, binder-fixative, or hardener. Much of the cement is squeegeed away, but a thin coating is carried forward into the ductus. For an airtight fit within adhesive air pump 264, adhesive air pump piston-plunger 233 has an elastomeric surrounding annulus. While the use of a one-way air valve is specified below, this annulus could itself serve as a one-way air valve in the manner of that used in a bicycle tire air pump.

Stay Insertion Tool with Pivoting Base

Except in an exposed field opened for a primary purpose, the entry or access incision for insertion of the tool is made as small and parallel to the ductus to be treated as practicable. The initial breach of the integument represents the substantive systemic immune stimulant, extension of the incision or the addition of incisions imparting additional trauma. To assure true concentricity or normal alignment of stay insertion subadventitially or medially, stay insertion tools are made with parts rigidly assembled. To alter the angle of insertion, a tool without a joint or pivot such as a gimbal or lateral hinge or folding joint must be tilted to a side, or forward, or backward, and/or rotated, as a whole. A pivoting base and adequate length of the insertion tool make it possible to reach and properly insert stays at points farther away from a small entry incision However, a ductus may veer, deviate, or plunge at an angle that exceeds the degree to which the tool can be tilted to achieve normal (perpendicular, rectilinear) access. However, if the tool incorporates a point of flexion or joint, expansion of the entry incision to properly dispose the tool in relation to the ductus can often be avoided. That is, when the rectilinear apposition required to allow circumferential insertion cannot be achieved without lengthening the access incision and to do so would best if not necessarily be avoided, a special stay insertion tool with pivoting base is provided. Referring now to FIG. 6, the downward extension of tool butt 256 below the level of tool barrel 239 and ejection slot 248 affords adequate leverage moments to flex or abduct the tip by nudging it to a side.

The insertion of a probe alongside any insertion tool should not be necessary, all parts of butt 257 that come into contact with neighboring tissue rounded and smooth. When the tool incorporates an end-pivot as may necessitate pushing the distal end or working end against neighboring tissue to adjust the angle, use in especially vulnerable sites, such as a vascular bed, is with the butt additionally padded. Ordinarily unnecessary, a protective pad seen as 276 in the inset to FIG. 2 and in FIGS. 4 and 5 may be attached to the bottom of butt by pressing it onto the bottom of the tool. The pad is permanent, however, when a separate slitting edge to assist in extracting temporary stays such as higher dose-rate seeds is mounted flush beneath pad 276, as addressed in the section that follows.

Use of a tool with pivot is justified when speed and avoiding frequent withdrawal, exchanging of tools, and reinsertion are central. The parts immediately associated with stay ejection below the level of stay refill strip 250 advancement spring 251 mechanical, these must remain in fixed relation throughout the range of angular adjustment. Therefore, were ejection achieved by direct mechanical connection as in the fixed embodiment made to the foregoing description, the incorporation of a joint or pivot, depending upon the degrees of freedom, would have to allow the coordinated flexion of all of the parts that must vertically continue through the joint. Such would cost as much if not more than several tools made to different angles.

To allow the distal portion of the tool to pivot without a loss in stiffness among the parts at reasonable cost, ejection by means of direct mechanical connection to thumb-ring 244 is dispensed with, and an electrical fly by wire approach used to effect ejection regardless of the angle at the joint. While not specifically shown in the drawings, the structure of a stay insertion tool with pivot is easily understood in relation to the mechanical embodiment shown. This involves substituting for vertically reciprocating thumb plunger-rod 238, one that is stationary and fastened at its lower end to the ball of a ball joint. The ball joint thus separates the upper fixed (nonreciprocating, stationary) portion of the tool from the lower pivotable or tiltable base seen as 257 in FIG. 6, the parts thereof rigidly fastened together to move as one.

In an omnidirectionally pivoting tool with ball joint, joint tightness is set by the tightness of fit of the ball in the socket as manufactured; alternatively, a small screw in the socket accessible through a hole in the body of the tool is used to adjust the joint in tightness as necessary. The joint in the magnetic probe 241 at the level of the ball joint in rod 238 is woven of soft iron wire, and must be loose enough to offer little resistance to ominidirectional movement. The body of the tool mimics the joint with an upper segment that overlaps the lower where interface at complementary curved rims. The latter is seldom necessary, a ball joint with proper internal lining and properly pressed in manufacture affording smooth action of moderate tightness for years.

An electrical wire running alongside or wound around the rod connects a control button on the outside of the thumb-ring 244 in FIGS. 2, 3, and 9 to battery 263 and direct current-powered plunger (reciprocating armature or slug, punching, push-type) solenoid. The solenoid is fastened to the ball above by connection to the socket of the ball joint and rivet 258 below. To prevent abrupt snapping action that would pose the risk of injury to the ductus and surrounding tissue, the solenoid is viscous, or dashpot, damped. When energized, the solenoid pulls up rivet 258, causing ejection tongue 247 to push the next stay in the strip through ejection slot 248.

To minimize the need to tilt the upper portion of the tool as would necessitate enlargement of the entry wound (access incision), the ball joint and solenoid are placed as far down in tool base 257 in FIG. 6 as possible. To place the joint as far down on the tool as possible, stay 231 compartment 250, to include stay refill strip 250 advancement spring 251 and the stay strip or clip are generally shorter than in a mechanical embodiment. So that it will bend in any direction, flexion of magnetic conductor 241 is achieved by interposition of a segment of soft iron wire woven cable. The distal tiltable portion of the tool is adjusted in angle with the aid of a separate probe.

Power for stay retention, retraction, and recovery electromagnet 242, a fiberoptic lamp, for example, if clipped to the tool, and in any embodiment, whether or not incorporating a base that pivots, a solenoid to eject stays 231, is preferably obtained from an onboard battery as untethered by a power cord to afford the operator freedom of movement. So that it will remain extracorporeal, the battery compartment is positioned high up on the tool, allowing it to be as large as necessary. Unless the power is metered or modulated in a manner that makes disconnection from the control console impracticable, original equipment that uses a power supply is best powered instead by battery 263, which high up on the tool, remains extracorporeal.

Whether incorporating an omnidirectional pivot ball or a hinge joint, soft iron recovery and retraction electromagnet probe 241 is flexibly jointed by introducing a short segment of soft iron wire woven to allow bending with no more than moderate force and minimal loss in magnetic strength across the joint. Thumb plunger-rod 238 is then jointed by a rounded expansion preceding its lower margin or lip and complementary receiving expansion at the top of the lower or distal segment, these serving to impart omnidirectional flexibility as an integral ball joint. In an embodiment with only laterally pivoting butt 256, thumb plunger-rod 238 contains a hinge joint below the lower edge of the shortened tool barrel 239 and just above the level of ejection slot 248.

The component joints in otherwise rigid vertically disposed parts to include those internal and the tool body are at the same vertical level and include stay refill clip compartment 250 at or slightly above stay 231 seated against the floor of ejection slot 248. Only the hinge joint at the outside of the tool body need be adjustable in tightness; internal joints in thumb plunger-rod 238 and above ejection slot 248 can flex freely. To allow the tightness of the joint at the outside of the body of a tool with lateral hinge or folding joint pivot to be adjusted, the axle uses a pin with end caps that screw-on over wave washers.

Resistance to flexion set by the force with which the end-caps compress the articulating ends of the upper and lower segments of the tool body or barrel 239 together, the end-threaded axle pin with end-caps slotted allows this resistance to be adjusted with a small screwdriver. Only the outer (external, tool barrel) hinge joint need be adjustable, those internal necessitating a hole in barrel 239 to allow access with a screwdriver. The internal lateral hinge joints of the internal vertical members usually consist of one sided pressure sensitive tape. Adjustability in the internal hinge joints is not preferred, each necessitating a hole through tool barrel 239 just above its lower margin aligned to it to allow access for adjustment with a small screwdriver. The tool is not disassembled.

Butt-Pad with Retractable Slitting Edge

Stays for later recovery contain ferrous metal, either as a core or as dispersed, to allow magnetic retrieval. While necessitating reentry at a later date, stays can be extracted with the same tool that is used to place these with or without stays loaded. To retrieve the stay or stays necessitates reentry and must be justified by the severity of the pathology, but allows any kind of nonabsorbable stay, such as an irradiating seed stay of high dose-rate, to remain in place over a prescribed period. More tenaciously ingrown stays, such as irradiating seed stays for nonpermanent implantation, as addressed in the section of the parent application entitled Arcuate Stent-stays (Stays, Stent-ribs, Ribs) or Stays for Use with Stent jackets), may necessitate slight incision before the tool magnet will be able to extract these.

A nonabsorbable stay intended for temporary use is not given a deep outer texture, wetted to encourage tissue ingrowth, or coated with a strong cement for retention pending extraction. When the magnetic strength generated by stay retention, retraction, and recovery electromagnet 242 is insufficient to extract the stay, rechargeable battery 263 can be removed and the connector to an external power supply inserted. Extraction can also be expedited through the use of a retractable cutting edge at the bottom of the tool to incise the tissue blocking the extraction path. To avoid the needless tearing of tissue, extraction is along the same path as was insertion.

The simplest way to provide a slitting or cutting edge to assist in clearing the way to a previously implanted stay is to hone and slightly extend the upper edge of the ejection blade 247 notch or groove at its distal tip seen in FIG. 93 of the parent application. Use of the upper edge reduces the risk of inadvertent incisions into the adventitia. The indentation at the distal tip of ejection blade 247 can be a straight line groove or multisided depression formed to complement, receive, and stabilize the proximal tip of stay 231. A shallow ridge or nub along thumb plunger-rod 238 and depression receiving it serve to signal the operator that the ejection stroke has been completed and further depressing thumb-ring 244 will cause ejection blade 247 to continue out ejection slot 248 so that it can be used incisively.

Stay extraction can also be accomplished by means of a separate slitting edge or knife attached flush beneath tool butt 256 or for retraction into a slot midway in a protective pad of neoprene or similar cushioning material. A blade with slitting edge and release-retraction button located in a recess at the side of the tool butt so that a probe must be inserted alongside the tool to depress the button is not preferred. A small swing-out knife with semilunar or crescent-shaped cutting edge as in a chavetas (cigar maker's knife) attached flush beneath butt 256 as shown in FIG. 6 can be deployed to slash, or predeployed for controlled incision by rotating the tool.

The knife is rotated into and out of the deployed or cutting position by a microminiature rotary solenoid actuated by depressing an electrical button switch on thumb-ring 244. The solenoid is mounted within and wired through the vertical space separating thumb-ring plunger-rod 238 and magnetic conductor probe 241. To extract a stay, the cutting edge is used to slit the obstructive overlying tissue, the insertion tool retractive electromagnet is used to withdraw the stay, and inmate cement line 260 used to seal the slit. Such a slitting edge mechanism is equally applicable to any stay insertion tool, including one with an end-pivot, as addressed in the preceding section Stay Insertion Tool-Inserts and Extension Devices The distal girth of the tool sets the practical working depth for an entry wound of given length. That is, the access incision is kept smaller the longer the lower narrow portion of the tool is. To admit the portions up to the upper margin of the electromagnet triples the length of the incision. Unless the tool can be used in an open field rather than through an incision, increasing the distance between cap 243 and finger rings 232 and 249 of a control syringe-configured stay insertion tool such as shown in FIGS. 2, 3, and 9 only lengthens the extracorporeal length of the tool and does not contribute to the intracorporeal reach or working depth, set by the lower ends of stay retention, retraction, and recovery electromagnet 242 and then air pump 264. Producing tools in different lengths is preferred to extension devices in different lengths for insertion between the magnet and air pump compartments above and the working end below.

The latter can be made but are needlessly complicated and expensive. This is because the inmate cement delivery line and any other lines attached alongside the tool for irrigation, aspiration, a laser to flow solder on stays, and so on, would have to be disconnected and reconnected, and to do this would be more disruptive and potentially aggravating for the entry wound than simply to withdraw one tool and insert another of different configuration. Interchangeable distal segments for changing the stay size or type using the same upper portions of the tool would not be usable midprocedurally. All such inserts and adapters are discounted as unusable midprocedurally as well as offering at best little economic advantage.

Use of Multiple Component Adhesives with a Stay Insertion Tool

This section pertains to the attachment to the stay insertion tool of a commercial syringe or plural syringes. These syringes may dispense medication or a sealant cement used as a hemostat and/or to bond stays ductus-intramurally, for example. Delivery from auxiliary syringes is distinct from the inmate cyanoacrylate delivery line described above. However, internal and attached delivery lines can and usually will be used in coordination. The primary purpose in a syringe holder attachment for the insertion tool is to provide a tissue sealant other than that delivered through the inmate line, which will almost always be a cyanoacrylate cement. Tissue sealants are provided in syringes that differ in configuration, and rather than to modify the syringes or contents, a means is provided for mounting any syringe to the insertion tool.

While addressed in terms of supplementary tissue sealants, the attachment may be used to deliver any kind of medication that can be delivered by syringe. As commonly seen in epoxy injectors (applicators, dispensers) several types of surgical adhesives available for use as hemostat sealants and/or to seal ductus stay insertion incisions consist of two-components, such as gelatin-dialdehyde (Geister Gluetiss®) or hydrogels, the syringe applicator being dual-chambered, with one chamber for each component. Until single component fibrin sealants and other tissue glues that provide significant bond strength and not just hemostasis become available, this form of fibrin sealant is likely to remain preferable.

For the present application, a one-component adhesive such as Ethicon OMNEX is preferred; however, two component fibrin biomatrix sealants supplied in four separate vials, even when requiring temperature or other different preparation for each of the four constituents, such as with Baxter Tisseel VH® S/D (see Lowe, J., Luber, J., Levitsky, S., Hantak, E., Montgomery, J., Schiestl, N., Schofield, N., and Marra, S. 2007. "Evaluation of the Topical Hemostatic Efficacy and Safety of TISSEEL VH S/D Fibrin Sealant Compared with Currently Licensed TISSEEL VH in Patients Undergoing Cardiac Surgery: A Phase 3, Randomized, Double-blind Clinical Study," *Journal of Cardiovascular Surgery* (Turin, Italy) 48(3):323-331), can be used by attaching the commercial dual-chamber syringe to the insertion tool by means of a holder described below in the sections entitled Powered Stay Insertion Tool Holder for the Attachment of Medication or Tissue Sealant Syringes Whether Single, Dual, or Multi-chambered as Supplied for Tool Slave follower or Independent Use and Binding of Lines and Cables Alongside the Stay Insertion Tool.

To use the inmate cyanoacrylate delivery line to seal the incisions made by the stay when inserted through the adventitia (stay insertion incisions) at the same time that an attached commercial dual-chamber syringe is used as a body entry-incision hemostat sealant is foreseeable and requires that these be independently controllable. When the commercial dual-chamber syringe is used in lieu of the inmate cyanoacrylate delivery line to seal the stay insertion incisions, its function must be integrated into the stay insertion function of the tool. When attached for immediacy as a body entry-incision hemostat, the commercial dual-chamber syringe must function independently of the stay insertion function of the tool.

When the attached syringe is to be freely usable for either or both purposes, its operation must be instantly switchable from coordinated to independent use, and such alternate operation is indeed accounted for in its control as described in the section below and in parent application entitled Powered Stay Insertion Tool Holder for the Attachment of Medication or Tissue Sealant Syringes Whether Single, Dual, or Multi-chambered as Supplied for Tool Slave follower or Independent Use. When unnecessary for either purpose and increasing the intracorporeally intromitted girth of the tool necessitating longer incisions to insert its distal working end into the body, a dual-chamber syringe is not attached.

Attaching a dual-chamber syringe as a backup hemostat or safeguard in general is justified when the extension provided by the maker does not contribute objectionable girth, or when warming thins out the adhesive long enough for conduction through a delivery line of smaller diameter and the girth added by combining this narrower delivery line with a temperature-changing ('cooling') catheter is less than that of the usual delivery extension alone. If inconsistency in heating is not objectionable, an assistant can use a hot air gun or similar electrical heating device to warm the attached adhesive delivery line and a cooling catheter dispensed with. A given stay insertion tool is made for ductus within a small range of sizes that use the same size stays.

Extension inserts as addressed in the section of the parent application entitled Stay Insertion Tool Extension Inserts presenting limitations, tools to insert stays of a given size are generally also made in shorter and longer tool barrel lengths to facilitate working at superficial or at various depths within the body. In overall configuration, however, the tool is standardized, to include a single lumen adhesive delivery line that ejects the adhesive over the stay ejection slot at the front of the tool. To allow the use of adhesives that require the combining of two or more components to initiate curing (setting, polymerization), the marketed dispenser or applicator, typically dual chambered, is attached alongside the tool for actuation by the same thumb-ring.

However, if to do so interferes with viewability, then the holder is clamped to a ring stand in a remote location, and the contents driven through an extension line, actuation necessitating the addition of an electrical switch to detect depression of the thumb-ring. The dual component adhesive product is preferably used with no deviation from the instructions provided by the maker. Thus, ordinarily, whether the syringe holder is directly attached alongside the insertion tool or is remote, the extension is connected to the outlet of the syringe applicator, the components having already been combined. To retard setting a cooling catheter with side-holes can be lashed alongside the delivery extension line.

The commercial syringe holder and the rest of the mounting additionally allows for aligning a 'cooling' catheter with side holes aligned to the syringes and/or an end-hole for warming or chilling the components or the adhesive as mixed prior to, upon, or following application. Attached outside the tool, the line can be significantly larger in diameter than could an internal line and thus deliver an adhesive that is higher in viscosity. Furthermore, the use of attachments allows reducing the basic tool to models that differ only in the width of the stays used and in the length of the tool required to reach down to different working depths. Using dual-chambered syringes with little if any modification as purchased, such as to snip off part of a long outlet tube, makes it possible to significantly reduce the complexity and expense of manufacture.

Dual chamber syringe adhesives provided by the maker in dispensers attached to the tool using the device described in the section shortly below entitled Powered Stay Insertion Tool Holder for the Attachment of Medication or Tissue Sealant Syringes Whether Single, Dual, or Multi-chambered as Supplied for Tool Slave follower or Independent Use include Baxter CoSeal® (Angiodevice International/Baxter Biosurgery Division, Baxter Healthcare Corporation, Deerfield, Illinois), which consists of two polyethylene glycols and dilute solutions of hydrogen chloride and sodium phosphate with sodium carbonate, and BioGlue® (CryoLife, Incorporated, Kennesaw, Georgia), which consists of solutions of purified bovine serum albumin (BSA) and glutaraldehyde.

As can other kinds of delivery, irrigation, and aspiration lines, dual-chambered syringe adhesive dispensers are attached to the tool with the aid of clips, as described below in the sections entitled Binding of Lines and Cables Alongside the Stay Insertion Tool and Use of Stay Insertion Tool Mounting Clips to Fasten an Adhesive Delivery Line. While the stay insertion tool must be used in substantially normal relation to the ductus so that extensive conditions will necessitate numerous incisions, attachments are devised to least contribute additional tool girth as would necessitate longer incisions. Suction and temperature-changing ('cooling' catheter) lines attached alongside the tool affect the diameter only slightly.

Powered stay insertion tool holder for the attachment of medication or tissue sealant syringes whether single, dual, or multi-chambered as supplied, for tool slave-follower or independent use Use of Commercial Syringes and Extension Tubes For inmate cement delivery line control, both switching between cement-ahead and cement-follower or cement-during operation and the timing within this cyclical relation of cement ejection are controlled mechanically. The first of these is accomplished by the engagement of thumb plunger-rod 238 to sprocket belt connecting arm 272 by rotation of thumb plunger-rod 238 into the adjacent opening on one or the other side in the sprocket chain 252 shown in FIGS. 96 and 97 of the parent application, the other through adjustment in the height of slidable air pressure relief one-way valve shown as 265 in FIG. 7 mounted in the side of air pump 264. Contained within the tool, no need to control a remote function is present.

This differs from the control of the auxiliary syringe holding frame, which to control at the remote device (with controls mounted on the holder) would necessitate glancing away from the treatment site. Observation of the treatment site almost always accomplished with the aid of an endoscope mounted to the side of the insertion tool, a need to adjust any controls that had been mounted to the auxiliary syringe holding frame would necessitate momentary diverting of the eyes and the removal of one hand from the tool. While the tool will almost always be stabilized by the edges of the small entry wound made to admit it, and the operator would ordinarily maintain the working end of the tool in the correct position, the need to glance sideways and remove one hand can result in jerks and displacement.

Accordingly, timing control of the auxiliary syringe holder is accomplished electrically through controls mounted on the tool itself and not on the auxiliary syringe holder. This operation consists of adjusting an initial delay and ensuing on-time interval as described below in the section entitled Control of Auxiliary Syringe Ejection Time. As addressed below in the section entitled Binding of Lines and Cables Alongside the Stay Insertion Tool, for control by touch alone as does not detract from maintaining the tool in a stable position, attachments to the insertion tool such as a small liquid nitrogen ($LN_2$), nitrous oxide, or $CO_2$ can or a cartridge with spring loaded trigger to release chilled air into a side- and/or end-hole cooling catheter attached with clips alongside the tool can be clipped at the side or front of the gown or attached to a waistband.

Dependent upon gauge, connection of a cryotherapeutic liquid nitrogen spray can to the cooling catheter clipped alongside the insertion tool is by means of conventional intravenous or other medical tube connectors. The ability to manipulate controls by touch alone as when attached thus is less likely to affect tool stability. The chilling effect of devices for attachment to barrel-assemblies and stay insertion tools can be moderated in temperature and reduced in exit rate by means of numerous existing kinds of cryosurgical and cryotherapeutic apparatus, to include the use of a thermal barrier (see, for example, Holland, T. D., Joye, J., Williams, R., and Williams, R. 2004. "Safety Cryotherapy Catheter," U.S. Pat. No. 6,811,550.

When the operator has determined that the stays can each be inserted with an action that is consistent in time from one to the next, the dual interval (interval off or delay followed by an interval on) timer is adjusted to effect a change from cement-before to cement-during operation. However, unless medication of inordinate cost is being delivered, the consequence of unanticipatable hesitation or discovery amounts to no more than an inappropriately timed release. If necessary, the substance released, whether medication, tissue adhesive, or both is swabbed away. If consistency appears improbable, a tool that incorporates break contacts at the top and bottom of the thumb rod stroke is used to establish the start of cycle times for release before or release after the downstroke operation, thus reducing the incidence of inappropriate discharge.

The substitution of electrical for mechanical control over the inmate cement delivery line to switch from cement-ahead to cement-during operation would allow dispensing with the twist-right twist-left sprocket and air pump sliding pressure relief aperture elements but necessitate incorporating a dual adjustable interval relay module into the tool. Furthermore, the sprocket mechanism cannot be misadjusted to misassign action to release-ahead to release-after action. Furthermore, at least as of the time of filing, the state of the art relay module measures 2 inches on a side with corners projecting on both sides of the tool, which circumstance was felt best avoided. Two or more component adhesives are not applied with one component delivered through the inmate line and the other component delivered through a line or lines attached to the side or front of the tool.

Similarly, to coordinate the application of adhesives so that the single lumen line built into the stay insertion tool is used to apply a coating of cyanoacrylate cement to the trailing end of the upper surface of each stay for sealing the ductus entry incision, while a commercial tissue sealant, typically dispensed from a dual-chambered syringe, is used to apply a two-component adhesive strengthener, binder-fixative, or hardener to the front and middle portions of the upper surface of each stay is considered to be justified only with the advent of cements that from the standpoint of promoting the recovery of integrity within the ductus wall are superior to any currently available.

If the extension provided by the maker is rigid and not conformant to the tool, it is replaced with flexible tubing.

Two-component tissue sealants that demand pressing together of the surfaces to be bonded for two minutes or longer are too slow to serve as stay insertion incision adhesives, much less ductus—intraparietal stay and laminar bonding agents. The preferability of cyanoacrylate cement to these is clear. The attached line for delivering tissue sealant can be used independently of the stay insertion function for use as a hemostat or in direct support in and timed to stay insertion. Whereas the inmate line for the delivery of a bonding agent or tissue sealant, usually cyanoacrylate cement, cannot be used independently of stay insertion, a separate syringe of cyanoacrylate can be added using the commercial tissue sealant holder described below.

Numerous modifications of the holder to be described are considered obvious. Increasing the width of the holder and using a more powerful motor or separate motors and leadscrews to either side of the syringes, or using an increased gear reduction ratio with one or two motors makes it possible to load a syringe or combination of syringes that require greater force to depress the plunger or plungers. Such can be used to control multiple single or dual-chambered syringes in adjacent relation in one holder where the delivery line is shared, each syringe supplying a different substance to the treatment site. A dual-chambered syringe can be used to mix and dispense components of one end-substance, such as a two-component tissue cement, or to provide different substances whether these consist of medication or tissue sealants, provided these can be passed down a common delivery line.

Very thick (viscous, viscid, heavy) fluent substances may be unsuited to integration into the stay insertion sequence and while dispensable using an auxiliary syringe equipped with motors of adequate power, may have to be separately controlled. The additional force essential to expel less viscous substances from the syringe may necessitate separate motors and lead screws to either side of the syringe. The use of multiple syringes with any one insertion tool must therefore consider the efficacy of the contents of each syringe when mixed and fed through a common delivery line. Compatible contents can be merged from a separate input line from each syringe or dual-chambered syringe. Unless operator errors would be inconsequential, a second plural auxiliary syringe holder for use independently of the other is inserted into a second socket mounted to the opposite side of the tool inmate cement chamber (cement air pump and cartridge housing).

The use to one side of more than one auxiliary syringe holder when one of these can be attached at the opposite side is discouraged as conducive to operator error and depending upon the additional weight to the one side, manual fatigue. Procedures should seldom last long enough that the weight of even two relatively powerful small gearbox motors on the holder to one side without a counterbalancing weight on the other side should result in manual fatigue. Switchable operation from stay insertion tool slave-follower or tool stay ejection synchronous to independent mode is unaffected by the number or kind of syringes loaded. Holders can be attached to either side of the tool to provide right and left-handed models with the thumb-ring switches for the holders either attached to the thumb-ring for slidable rotation to the opposite side, as preferred, or the switches duplicated at either side of the thumb-ring.

The conductors for the thumb-ring switches must have sufficient slack to allow the thumb-ring to be rotated. For medication or cement to be introduced intraincisionally, that is, carried forward on the surface of the stay into the incision as the stay enters into the wall of the ductus, the terminus of any auxiliary syringe delivery line must be positioned directly above the stay ejection slot, which must therefore be interchangeable in position with that of the inmate cement delivery line. Additional auxiliary syringes attached by means of a holding frame must terminate at points adjacent or nearby that over the ejection slot. With this understanding, holders can be attached to both sides of the tool inmate cement housing, with one or both of these sides used in slave-follower or independent mode.

Placement of the outlet ends or the termination of auxiliary syringe delivery lines at the sides of the tool foot allow the application of medication, such as anti-inflammatory, anti-infective, or analgesic, just before or after stay insertion. The simultaneous use and evacuation into a common delivery line of plural syringes assumes that the contents of each syringe is compatible with that of the other syringes as not to require segregation in separate delivery lines or in separate lumens of multilumenal tubing, and that no degradation in the efficacy of any ingredient will result from the fact that the entire delivery line from syringe to the distal line terminus is charged with this mixture.

As medication applied to a. Both the upper and lower surfaces of the stay in cement-ahead operation and b. An adjustable extent of the upper surface in cement-during operation is largely removed by squeegeeing, that is, swept away by brushing against the sides of the incision as the stay penetrates into the ductus wall, the addition to the medication of a thick and adherent substance will sometimes assist in introducing more of the medication into the wall of the ductus. Provided withdrawal is unobjectionable or avoidable through the use of a probe, delivery line termini can be bound for interchangeable positioning directly above the stay ejection slot by means of a small tissue compatible elastic band.

In a tool wherein the retention and recovery electromagnet reciprocates down and up along with the thumb-ring, this will add some resistance to movement and likely require occasional withdrawal in order to adjust the elastic band. Even though it would allow more flexibility in the use of auxiliary syringes without the need for withdrawal, the incorporation of a turret mechanism for rotating different syringe and delivery lines or for aligning separate syringe outputs to different tube extensions for rotation into position above the stay ejection slot is discouraged as distracting and conducive to human error as well as introducing a unjustified complexity and expense.

Auxiliary syringe holders on opposite sides of the tool can share a dual interval relay as well as the break contact terminals as addressed below in the section entitled Control of Auxiliary Syringes when inset into only one side of the cement air pump and cartridge housing. However, this will cause the holder motors to either side to conform to the same cycle even though the deposition to one side of an anti-infective, for example, must be deposited just before the deposition of a sealant, for example. By contrast, incorporating a timing relay into each holding frame as an integral component allows each auxiliary syringe to be synchronized to the tool stay ejection cycle with different timing, for which the increased cost is considered justified on the basis of uniformity and the independent usability of the holders, as well as the additional flexibility imparted.

If the action overall is slightly acyclical or aperiodic so that the relation between the subcycles to either side progressively changes or desynchronizes, the control on one of the dual interval timing modules must be adjusted midprocedurally. Furthermore, to duplicate the contacts on both sides is no more costly than to provide incorporate conductors for a holder on the opposite side. For clear distinction in use, tissue sealant can be segregated in the holder attached to one side of the tool, while medication is provided by the holder attached to the other side. Either or both holders can be set for slave-follower or stay ejection cycle independent, that is, operator discretionary direct, control.

The specific types of substances and timing control between the sides that are possible represent a large number of combinations and permutations. Provided an unused delivery line is clipped in position for nonintraincisional application, the proximal end of the delivery line previously in use can be disconnected at the bottom of the socket and the unused line connected. Usually the connection point will be far enough above the entry wound to allow this without the need to withdraw the tool. In this way, an assistant can connect or replace syringes containing certain substances with others as the procedure progresses. Otherwise, changing delivery lines requires withdrawal of the tool and replacement of the line or lines.

Rather than to manipulate different delivery lines providing substances intended for intraincisional application midprocedurally (ordinarily the inmate cement and an auxiliary syringe line), it will usually be preferable to withdraw one tool and exchange it for another that has been configured for continuation of the procedure as desired. With an assistant to configure the tool as necessary, rotating two tools will allow any response within the operational limits of such tools. One object of the invention being to accomplish an improved form of stenting with the least trauma, stay insertion tools are long and narrow to allow deep access through small incisions.

Hence, auxiliary delivery lines and clips as described in the section of the parent application entitled Stay Insertion Tool Mounting Spring-clips for attaching these are mounted to sides of the tool only as required for the specific procedure. Whether operated as a. A passive (slave, follower, dependent, tool cycle synchronized) function tied to tool function for providing a discharge of a tissue sealant coordinated with stay insertion for sealing stay insertion incisions, b. Independently (tool cycle nonsynchronized) to stay insertion as a hemostat sealant, anti-infective, anti-inflammatory, or other medication, or c. As switchable between either kind of operation, a two-component or dual-chambered syringe must be mounted off to a side, or it will interfere with direct viewability of the site to be treated.

An attached endoscope can be used to view the toe of the tool foot but not portions of the tool at higher levels. As described above in the section entitled Powered Stay Insertion Tool Holder for the Attachment of Medication or Tissue Sealant Syringes Whether Single, Dual, or Multi-chambered as Supplied for Tool Slave follower or Independent Use, since dual-chambered syringe applicators or dispensers provided with dual-component adhesives, for example, may interfere with viewability of the treatment site when attached to the insertion tool in adjacent relation, these are raised and set off to a side of the tool at an angle. Making the dual syringe holder of transparent material having optical clarity can contribute some viewability, but since the holder can be rotated, transparency is unnecessary. The amount of adhesive remaining is easily seen.

Avoidance of Remote Syringe Placement and Long Adhesive Delivery Lines

To keep the components of a two-component tissue cement separated would necessitate modification of the double chamber syringe, the attachment to each chamber of an extension line, and filling each line with a component. Insufficient cement likely to fill longer extension lines and much cement likely to remain following the procedure, avoiding waste would necessitate attaching the extension lines and then introducing an inert filler material at the top of the chambers to drive the components down line to a distal segment of column length somewhat longer than that to be used. Compared to cyanoacrylate cements, two-component adhesives are slow to achieve initial set.

Thus, under normal circumstances, even when the parts have already been mixed, the additional transit time to move over the increased distance from the syringe outlet to the treatment site is noncritical in that it does not significantly reduce the open time available to promote clogging of the delivery line. Rather than to enhance flowability, the use of a 'cooling' catheter to warm the line will more likely accelerate setting (polymerization), which is, however, useful to accelerate curing once the sealant has been applied. Whether chilling the line to retard polymerization will allow the use of a narrower line depends upon the concurrent effect on viscosity, which is likely to be the increase thereof.

Ordinarily, an auxiliary holder syringe-contributed two-component sealant is used as a hemostat under independent or tool stay insertion cycle nonsynchronous operation and as a stay insertion incision sealer and ductus intraparietal stay binder when switched to synchronous operation. Thus, the time following mixing of the components and initiation of polymerization that the cement is left to linger before use is shorter with the mix kept moving. However, if used only to seal stay insertion incisions, the rate of consumption, even without an added length of tubing, invites incrassating or congealing, the slower delivery prompting clogging. The quantity of adhesive to fill long lines is wasteful.

For these reasons, a position for a dual-chamber syringe that is more remote from the insertion tool, such as one pumped from an adjacent stand through a relatively long extension line rather than attached to the tool and offset at an angle as will be described is discounted. This mounting satisfies the requirement to position the holder proximate to, without visually obstructing, the point of application and surrounding treatment site. To avoid the cost and complexity of actually integrating the delivery of two or more component adhesives into the mechanism of the insertion tool as has been done to include a single-component adhesive strengthener, binder-fixative, or hardener delivery line, marketed applicators are made usable without the need to modify or repackage these beyond snipping off a portion of an extension tip or "applicator" when too long.

Attachment to a stay insertion tool of a commercial surgical adhesive dispensing device such as a dual-chambered syringe will be described in relation to the control, or thumb and finger ring-type syringes shown in FIGS. 2 and 3, the auxiliary syringe attachment shown in FIGS. 8 thru 10. Two-component adhesives such as CoSeal® (Angiodevice International/Baxter Biosurgery) and BioGlue® (CryoLife), are sold with dispensers or applicators that have been configured for the specific ingredients that each uses. The dispensers are therefore different in dimensions, conformation, amount of adhesive expelled per unit distance of plunger depression, and so on.

Nevertheless, a single holder must allow any given syringe to be attached to the stay insertion tool. The use with minimal if any modification to off the shelf adhesives and applicators eliminates complexity, as does controlling the attached syringe electrically rather than through a complicated mechanical linkage. As addressed in the sections of the parent application entitled Multiple Component Adhesives and Use of Commercial Syringes and Extension Tubes, auxiliary syringes, typically dual-chambered, or conventional syringes containing medication or a commercial tissue sealant, are attached to a stay insertion tool by means of a holding frame, or holder.

Stay Insertion Tool Auxiliary Syringes

Control of Auxiliary Syringes

Unlike the cement delivery line built into the tool, commercial syringes for attachment to a stay insertion tool must be positioned off to a side of the tool. This in itself makes the control of the syringe by mechanical means complicated. Since commercial syringes are self-contained devices that do not conform to prescribed dimensions, any one holding frame must accept syringes over a range of shapes and sizes. Commercial syringe chambers and tips differ in internal diameter and the contents in viscosity, so that the amount of adhesive expelled for a given downward movement of the plunger or plungers is different for each.

An auxiliary syringe holder is a battery powered syringe driver or syringe pump for attachment to a stay insertion tool. It can be used to dispense a two or more part adhesive, therapeutic solution, fluid medication, or component syringes can be divided to deliver cement and a medicinal substance simultaneously in the relative proportion desired. At the same time, the stroke of the stay insertion tool plunger-rod 238 and the timing of its detrusion (depression) is dictated by its stay feeding and ejection function, which is tied to the length of the stays the tool is meant to insert, and to this extent is the same regardless of the overall length of the tool.

Nevertheless, differences in stroke and the variability required in the timing and quantity of syringe expulsion relative to tool plunger-rod 238 depression with various commercial syringe plungers militates against a mechanical linkage of the syringe to the tool; no simple, unobtrusive, dependable, and easily maintained mechanical linkage or cabling would allow even one auxiliary commercial syringe to be connected and controlled with the variability in timing and the amount of discharge required when the tool plunger-rod 238 is depressed. By contrast, to coordinate the action of a commercial dual-chambered syringe to that of the insertion tool by electrical means is relatively straightforward and inexpensive.

In place of the intricacies of applying adjustments with a mechanical system, timing relations are applied empirically by adjustment to the dual interval timing relay or relays during testing before use. Such timing control makes it possible to initiate the onset of adhesive outflow onto the surface of the ductus just prior to the ejection of a deep surface-textured stay which then carries the adhesive forward into the ductus wall on both its upper and lower surfaces, or cement-ahead operation. If initiated during stay ejection, then the onset and duration of adhesive outflow is timed to vary the extent of the upper surface of the stay that is coated, which is referred to as cement-follower operation.

Emptying of the syringe or syringes in a given holder must be variably synchronizable to the stay ejection cycle, as well as switchable to independent operation whenever the operator wishes to apply medication or sealant in a discretionary manner. In some instances, as when the deposition of a local anesthetic or anti-infective must precede the deposition of a sealant, collateral synchronization as to sequence and the amount of substance expelled between the syringes attached to either side of the tool will matter. While the operator may choose to use auxiliary syringes in an exclusively discretionary manner for an entire procedure, for greater applicability and to cover numerous contingencies, the apparatus must be capable of switching from independent function to the variable and differential synchronizing to the stay insertion cycle of two attached holders.

For a syringe chamber, outlet, and extension or delivery line of given internal diameter used to dispense a fluid of given viscosity, the amount of the fluid expelled (discharged) is determined by the distance of syringe plunger downward travel or excursion (distance depressed). This is determined by the speed of the frame motor, the time that the motor is on, and the pitch of the lead screw thread. Of these, only the interval over which the frame motor is on is normally varied, this by adjusting the settings on the dual-interval relay. Otherwise, the operator can switch to direct control independent of the stay ejection cycle at which time the motor will draw current directly from the battery, the relay then shunted (bypassed).

Substances not sold in syringes afford some choice of syringe and extension or delivery line, but once the syringes and delivery lines to be used have been chosen, to mix the contents of syringes attached to either side of the tool in a certain proportion will require adjusting the side-to-side related onsets, durations, and terminations that each holding frame motor is on. More reliably as well as more flexibly, the holder is driven by a lead screw which is rotated by a miniature direct current spur gear head motor of the type manufactured, for example, by Lynxmotion, Inc., Pekin, Illinois The motor is actuated upon separation of the break contact terminals mounted at the junction between the stationary cement and the reciprocating battery-electromagnet housings.

The motor or motors are used at constant speed, control over the quantity of material discharged by the syringe or syringes being determined by the interval over which the plunger is depressed. Using motor speed to compensate for variation in the speed with which the operator depresses the thumb-ring is considered an unnecessary complication and expense. The occasional misdeposition of medication or cement due to hesitation or distraction may require swabbing or the use of an attached suction line (aspirator) but poses no risk. For general hemostatic use, a simple momentary contact push button switch is used. Switching from direct operator (independent, discretionary) to slave control introduces break contacts and a double interval timing module into the circuit such that separating the contacts by depressing the tool thumb-ring sends current to the timing module which controls the motor on the holding frame.

In this way, the timing module is used to coordinate the ejection of adhesive or tissue sealant by the auxiliary syringe or syringes in the holder to the mechanical stay insertion tool ejection cycle. Otherwise, recovering excess adhesive by means of an attached aspirator line dispenses with the need to insert a swab through the small entry wound. To coordinate the release of adhesive to stay ejection, the break contact terminals on the tool and an interval timing module are used to eject a settable amount of adhesive only when the thumb-ring and central spring shaft of the insertion tool move either up or down. The amount of adhesive and segment of the tool operational cycle over which the ejection of the adhesive occurs is variable according to the interval settings applied to the module.

Tissue Sealant Syringe Holder (Holding Frame) and Attachment

When attached to the stay insertion tool, a commercial tissue sealant syringe must be usable both for hemostasis independently of the stay insertion function of the tool, as well as in direct and closely coordinated support of stay insertion. Control over the small electrical motor used to depress the syringe plunger must therefore be switchable between independent and tool-driven (locked, tied, follower) use. The viscosity at the end opening (nozzle, spout, outlet, ejection tip) will usually allow use in the small amounts required for coordination with stay ejection; if not, an end-opening adapter to reduce the diameter (reducer) is used.

Excessive internal cohesion or surface tension (Plateau-Rayleigh instability) that results in the formation at the end-opening of adherent beads (globules, drops) of sealant which interfere with the smooth flow essential for fine use may necessitate the addition of a diluent to either or both components or the need to periodically withdraw and dip if not agitate the end of the tool in a diluent or solvent. Differing in configuration and dimensions, some syringes or combinations of syringes may require a special holding frame. Making the distance between upper and lower compressive plates in the frame large enough to accommodate most commercial syringe products and using the onboard motor to bring the plates used together to clamp the specific syringe between the two plates will, however, accommodate almost every commonly sold syringe, the majority about 3½ inches long with "needle" or "tip" removed or trimmed.

Commercial syringes may be dual-chambered to separate two components that when mixed together initiate curing within the syringe before reaching the end opening. Extensions are usually available from the syringe producer, and the syringes contain a sufficient amount of each component to fill the extension and last the procedure. The extension provided by the maker can usually be used as the fluid channel that passes through the outer bendable metal jacket of the support arm and connecting cable described below. If this is too short, ordinary catheter tubing can be used.

Although the components are mixed initiating curing (polymerization) within the syringe mixing chamber or mixing nozzle, the setting time of commonly available such products is not so fast as to require that the length of the extension needed to mount the syringe to the stay insertion tool be kept to a minimum. The delivery line can thus be allowed sufficient length to position the holding frame unobtrusively off to a side. While the syringe is always mounted prior to the procedure, the setting time will determine whether the extension tube is filled with the mixed components before the procedure is underway or the need therefor arises.

Although the sealant is not likely to reach initial set, in order to not detain the procedure, the small motor used to drive the plunger must be capable of short-term continuous-duty torque output sufficient to fill the line quickly. To allow the use of either the inmate or attached sealant for ductus-intramural stay bonding, an elastomeric ring is used as the most distad attachment of the two lines at the front of the tool, and a probe is used to shift the tip of either line into position directly above the stay ejection slot. When the attached syringe is used as a hemostat, the tip of the inmate cement line is left in position above the ejection slot.

Structure of Tissue Sealant Syringe Holder
Stay Insertion Tool Auxiliary Syringe Holding Frame Attachment Since only the syringe and enough of its outlet 'needle' or 'tip' to engage the socket described below are used, a holding frame or holder of reasonably standardized size can be provided that will allow adjustment to accommodate almost any one single or dual chambered syringe. BioGlue®, Tisseel®, and CoSeal®, for example, are dispensed from dual-chambered syringes that mix the components internally, whereas Gluetiss® is dispensed from two separate syringes, one larger for the gelatin-resorcinol solution component, the other smaller for the aqueous glutaraldehyde and glyoxal hardening solution component.

Holders configured for these and future tissue sealant syringes are made out of any suitable plastic by molding, or fabricated out of half-inch wide plastic or nonferrous metal flat strip stock, for example. Gluetiss® is mixed on the treatment tissue, with a 20:1 to 10:1 ratio of glue to strengthener, binder-fixative, or hardener. While the syringe that contains the strengthener, binder-fixative, or hardener is smaller in diameter and length, it is not designed to deliver its component in the appropriate proportion when the plungers are depressed alongside one another to the same depth as would allow the holder mechanism to be made in a relatively simple form as preferred.

More specifically, the correspondingly disproportionate rates of depression between the two syringe plungers required to expel the components in the correct proportion would necessitate adding a reduction gearbox in addition to a mixing nozzle. Excessive open time precluding the immediate sealing of incisions, surgical adhesives other than cyanoacrylate cement may require the addition of an accelerator to reduce the interval prior to initial set. With the appearance of dual syringe tissue sealants that set more quickly and release the contents of the syringes in the prescribed proportion for a given downstroke of the syringe pistons (piston plungers, plungers), the holder is made as is one for a single (usually dual-chambered) syringe.

Turning now to FIGS. 8 thru 10, this is in the form of a miniature press or vertically disposed vise having an upper plate or 'jaw' that drives the syringe piston plungers down by means of a lead screw, so that even when not united as shown in FIGS. 8 thru 10, the syringe pistons are driven down together. The shaft of motor 286 is connected to gear reduction box 288 by means of an unseen full coupling union consisting of an ordinary starter joint-shaped joint-encircling metal sheath having a keyed internal cross section complementary to that of the motor shaft. Gear reduction box 288 is in turn connected to lead screw 278 by full coupling union 287.

Auxiliary syringe holding frame 284 accommodates dual-chambered commercial syringes such as that sold under the BioGlue® label, with internal mixing nozzle 292 and single or unified bottom-opening exit-hole 279. Auxiliary syringe holding frame 284 incorporates no onboard controls, allowing its reversal for connection to the line entry socket on the opposite side of the tool without impeding use by a nonambidextrous operator or assistant. Dual chambered commercial syringes 280 and 281 are made to mix the components of the tissue sealant in the correct proportion automatically when the single thumb rest depresses both plungers.

The upper halves of holding frame 284 sides 282 and 283 are slotted down the center from near to the top to half way down to serve as guideways to complementary projections at the sides of screw 278 follower crosspiece 285. To allow the syringe to be replaced midprocedurally, side pieces 282 and 283 of auxiliary syringe holding frame 284 are not folded inward. Small extensions from follower strip or lead screw 278 follower crosspiece 285 insert through the slots cut down the center of each side of auxiliary syringe holding frame 284. Follower crosspiece 285 thus rides up and down the side slots as guideways when small direct current gear head motor 286 rotates lead screw 278 driving lead screw follower block 285, which is resistance welded to the bottom of carriage plunger depressing follower crosspiece 285.

As shown in FIG. 8, lead screw 278 extends down through upper frame crosspiece 285 and press-down crosspiece strip with integral lead screw follower block 289 with integral lead screw follower block having end projections that fit into and ride down the slot guideways in sides 282 and 283. Upper frame crosspiece 285 spans across the top of auxiliary syringe holding frame 284 from side 282 to side 283, is folded over, and resistance welded to sides 282 and 283 of frame 284. The thread of lead screw or bolt 278 extends down enough to allow the syringe to be fully emptied.

Bottom crosspiece 291 has a hole at the center to admit dual syringe mixing nozzle 292 and thus support dual syringe including barrels 280 and 281 from beneath when dual syringe thumb rest 294 is forced downward by press-down crosspiece strip with integral lead screw follower block 289. Auxiliary syringe holding frame 284 lower crosspiece 291 supports and passes through the bottom dual syringe unified outlet 279 in which the components from either barrel are mixed, some portion of the exit nozzle 292 distal thereto retained for insertion and friction fit into the upper end of cable connecting delivery extension line or auxiliary syringe holding frame 284 supporting arm and connecting cable 290.

A mixing nozzle such as seen in the CryoLife BioGlue syringe has the spreading tip removed but is otherwise left intact. Since during a procedure, press-down crosspiece strip with integral lead screw follower block 289 is moved upwards only to replace a spent with a full syringe, the syringe is secured in position. Just as the frame bottom crosspiece 291, the ends of frame top crosspiece 285 are folded down over as to be vertically flush, and resistance welded to the upper ends toward the tops of frame sides 282 and 283. To insert a new syringe into the holder, motor 286 is used to drive press-down crosspiece strip with integral lead screw follower block 289 upward enough to allow the spent syringe to be removed and the new syringe inserted.

Dual syringe mixing nozzle 292 through the center hole, motor 286 is reversed to clamp the syringe between bottom crosspiece 291 and press-down crosspiece strip with integral lead screw follower block 289. Further depression of press-down crosspiece strip with integral lead screw follower block 289 and dual syringe thumb-rest 294 causes dual syringe barrels 280 and 281 to expel their contents. The parts must be sufficiently robust that off-axis lead screw or bolt 278, hence eccentric (moment arm, lever arm) application of compressive force, will not achieve a magnitude sufficient to jam the end protrusions of press-down crosspiece strip with integral lead screw follower block 289 in its side guideways.

Connection of the Holding Frame to the Stay Insertion Tool

As shown in FIG. 9, attachment of auxiliary syringe holding frame 284 to the stay insertion tool is by means of auxiliary syringe holding frame supporting arm and connecting cable 290 shown in FIG. 12 with upper end engaged by dual syringe exit mixing nozzle 292 and lower end engaged in stay insertion tool auxiliary syringe holding frame supporting arm and connecting cable socket 296 shown in FIGS. 13 and 14. Auxiliary syringe holding frame supporting arm and connecting cable socket 296 is mounted within auxiliary syringe socket block 297 to the side of vertically stationary cement air pump and refill cartridge housing 264, with delivery of the mixed cement, drug, or other therapeutic substance passing down to the work site through polymer auxiliary syringe delivery line 298.

As shown in FIG. 12, auxiliary syringe holding frame supporting arm and connecting cable 290 consists of outer bendable preferably hexagonal structural casing or sheath 299, containing polymer syringe extension tube or cement and therapeutic substance delivery channel 300 and electrical conductors 301 thru 306 leading to and from auxiliary syringe holding frame motor 286 and dual interval timing relay 293 to stay insertion tool inmate battery 263. Auxiliary syringe holding frame supporting arm and connecting cable socket 296 includes electrical contacts at its bottom for connection to electrical conductors 301 thru 306. 102. Power to drive a miniature electrical motor to depress one or more auxiliary syringes as described below is drawn through these conductors.

FIGS. 13 an 14 show the position of auxiliary syringe holding frame supporting arm and connecting cable 290 socket 296 when attached to the right hand side as shown in FIGS. 11, 13, and 14. Dual interval timing relay 293 substantially eliminates the need for a microcontroller onboard the auxiliary syringe holding frame to coordinate the timing of stay insertion and auxiliary syringe discharge when not separately controlled by the operator. If auxiliary syringe ejection is synchronized with or at an interval in relation to inmate tissue cement pump 264 so that delivery line 298 shown in FIG. 9 should discharge as close to ejection slot forward extension 269 of inmate tissue cement pump at the front of the tool as shown as 264 in FIG. 9, then line 298 is rotated from its ordinary position in separate or unsynchronized use whereby it courses down the side of the tool.

The clips or nonallergenic elastic bands used to secure delivery line 298 to the side of the tool make moving the delivery line 298 ejection opening around into adjacent relation to ejection slot forward extension 269 quick and simple. Small ring rubber bands allow the two delivery lines from two auxiliary syringes to be quickly rotated around the tool to any position desired, allow either line to be crossed over the other, and since the delivery lines can branch, the area coated can be increased with the branches rotated to any peripheral position surrounding the tool.

In a stay insertion tool with a second socket for attachment of an auxiliary syringe holding frame on the left hand side, a second auxiliary syringe holding frame supporting arm and connecting cable socket 296 is mounted on the opposite side of inmate tissue cement air pump 264 as shown in FIGS. 13 AND 14. In FIGS. 13 and 14, the structures surrounding thumb plunger-rod 238 and auxiliary syringe delivery line 298 such as the tool barrel 239 seen in FIG. 9 have been omitted for simplicity. Auxiliary syringe holding frame supporting arm and connecting cable 290 thus serves both for structural support and electrical connection to the insertion tool auxiliary syringe holding frame 284 components, with electrical current drawn from battery 263 in the upper compartment of battery and stay retention, retraction, and recovery electromagnet 242 compartment.

As a distinct component, auxiliary syringe holding frame supporting arm and connecting cable 290 is thus a miniature combined fluid and electrical conduit. As a structural element, casing or sheath 299 of auxiliary syringe holding frame supporting arm and connecting cable 290 is preferably made of nonferrous metal such as aluminum with sufficient flexibility for its wall thickness, diameter, and as shown in FIG. 11, typically of hexagonal cross-section allows the operator to bend it if necessary in order to obtain both manual clearance and a better view of the working field and syringe or syringes during operation.

Supporting Arm and Connecting Cable

FIG. 102 shows an auxiliary syringe holding frame containing a double syringe 284 with supporting arm and connecting cable 290 positioned for use, while FIG. 11 shows a supporting arm and connecting cable 290 before having been bent by the operator to gain the best line of sight and clearance to the working site. Auxiliary syringe holding frame supporting arm and connecting cable 290 is radially and bilaterally symmetrical. Further to obtain a clear view, a cabled lamp, endoscope, or angioscope, not shown in the drawing figures, is clipped or lashed alongside the tool.

Since the viewing angle may change during the procedure, auxiliary syringe holding frame with double syringe 284, supporting arm and connecting cable 290, and conductors 301 thru 306 are sufficiently pliable to allow frequent bending without fatigue fracture. In FIGS. 11 and 12, auxiliary syringe supporting arm and connecting cable 290 conductors 301 thru 306 have end contact pins secured in position at either end by protrusion through holes in end caps 307 and 308, through which conductors 301 thru 306 protrude with intervening electrical insulation.

FIG. 12 shows an auxiliary syringe supporting arm and connecting cable 290 in cross section or with either end-cap removed. At either end, auxiliary syringe holding frame supporting arm and connecting cable 290 thus resembles the base of a vacuum tube, but with a central opening for polymer syringe extension tube or cement and therapeutic substance delivery channel 300. This configuration allows end caps 307 and 308 to key the engagement of auxiliary syringe holding frame supporting arm and connecting cable 290 in auxiliary syringe holding frame supporting arm and connecting cable socket 296 and stay insertion tool inlet socket 296 mounted to the side of inmate cement pump 264 compartment.

The fluid delivery line within is made either from an extension provided by the syringe maker or a length of catheter polymer tubing. End-caps 307 and 308, which must securely position and insulate the fluid and electrical conductors inside it can be made of any strong plastic or mica, for example, these parts bonded together by means of a commercial adhesive selected for the specific materials used. The engagement of auxiliary syringe supporting arm and connecting cable 290 end-caps 307 and 308 in the upper and lower sockets can be viewed as tenons keyed by the protruding pin contacts, with the fluid channel at the center inserted into sockets considered complementary mortises somewhat similar to the connection of the stem to the shank of a smoking pipe.

To rigidly support auxiliary syringe holding frame 284, the upper or holder end of auxiliary syringe holding frame 284 supporting arm and connecting cable 290 must be firmly bonded by means of a strong adhesive to frame 284 about the syringe outlet which protrudes through holding frame bottom crosspiece 291, and which socket block 297 surrounds. To avoid the need for socket blocks with a different internal conformation at the upper or inlet end for each different kind of syringe, the inlet is funnel-shaped. Conductors 301 thru 306 to double or dual interval relay module 293, thence to motor 286 are bonded along the inside of frame 284 by intermittent application of a hot melt adhesive or small top or side acceptance spring arm clamps bonded to frame 284 with cyanoacrylate or hot melt adhesive depending upon the specific materials used.

In FIGS. 8 and 10, 294 is the dual syringe thumb-rest and 295 the finger stops. In the embodiment depicted in FIGS. 8 thru 12, battery and stay retention, retraction, and recovery electromagnet 242 compartment moves down and up with thumb-ring 244. In this embodiment, auxiliary syringe holding frame 284 supporting arm and connecting cable 290 is attached by insertion of its tool end into a socket that is bonded to the outside of stationary cement cartridge and air pump 264 compartment seen in FIG. 9. As represented in these figures, socket block 297 is mounted the left-hand side of the cement cartridge and air pump 264 compartment.

Due to the levering forces imposed by auxiliary syringe holding frame supporting arm and connecting cable 290 as would break this bond, auxiliary syringe holding frame supporting arm and connecting cable socket 296 is joined to the tool with contacting parts scored or etched and a high bond strength epoxy cement, such as Aeropoxy ES6209. Further to allow optimal viewability and also mounting stability and quick attachment or detachment, auxiliary syringe holding frame supporting arm and connecting cable socket 296 has an internal conformation that is multi-point, generally 6-point or 8-point, in the manner of a wrench socket to also accommodate six conductors.

This configuration allows the tool end of auxiliary syringe holding frame supporting arm and connecting cable 290 to be inserted into auxiliary syringe holding frame supporting arm and connecting cable socket 296 at any of several different angles, redundant wires (six) and/or electrical terminal pin receptacles provided so that electrical connection is made regardless of which rotational orientation is chosen to support this positional flexibility.

The portion of the fluid delivery line from socket 296 to the front of the tool above ejection slot 248 consists of a length of tubing that is attached alongside the tool with the clips described below with its upper end plugged into the bottom of socket 296. When the thickness of the auxiliary cement or other fluid does not necessitate the use of a delivery line of any significant diameter, the portion of the line extension clip mounted alongside the tool can be left in position and sterilized with ethylene oxide gas (epoxyethane, oxirane, dimethylene oxide) along with the tool.

Control of Auxiliary Syringe Eject-Ahead or Eject-after with Determinate Timing

The electrical components mounted to the back of and used to control stay insertion tool auxiliary syringe holding frame 284 as shown in FIGS. 8 thru 10 include surmounting miniature gear head dc motor 286 and adjustable delay/adjustable interval double or dual interval relay module 293, such as the Model TGCL Delayed Interval Relay Timer, Dual Adjustable, made by the Pelco Component Technologies division, Airotronics Timers and Controls, Cazenovia, New York Stay insertion tool auxiliary holding frame 284 might incorporate a separate onboard battery to power dual interval relay module 293 and motor 286; thus reducing the number of conductors shown as 301 thru 306 in FIGS. 11 and 12 used to carry current to and from insertion tool on-board battery 263.

However, a separate battery incorporated into frame 284, while adding little to its size or weight, would not eliminate the need for conductors to carry the holding frame control signal from the break contact terminals shown in the inset to FIGS. 13 and 14 as 313 and 314 on the tool to motor 286 and dual interval relay module 293 on holding frame 284 in any event, as would allow all of conductors 301 thru 306 to be eliminated. When auxiliary syringe holding frame dual delay interval timing relay module 293 break-contacts are separated by depression of thumb-ring 244, module 293 initiates an adjustable delay followed by an adjustable ON-time interval.

Dual delay interval relay module 293 applies the same timing control regardless of whether the tool has be set to cement-ahead (cement-before)- or cement follower (cement-during) operation. Accordingly, adjusting dual delay interval relay module 293 allows control over the timing of cement ejection and thus the extent of the stay that is coated. Dual interval relay module 293 being of the variable external type that is remotely controlled electrically, usually separate potentiometers with control knob 262 mounted on the tool above recovery electromagnet control knob 262 are used to control the delay and on-time intervals.

Alternatively, dual delay interval timing relay 293 is set so that the sum of these intervals corresponds to the average time that thumb plunger-rod 238 travels downward, and, potentiometer control knob located above lower control knob 262, which is used to adjust the field strength of stay retention, retraction, and recovery electromagnet 242, is used to adjust the relative proportion within the sum of these component intervals.

The compound angle and bendability of auxiliary syringe holding frame supporting arm and connecting cable 290 contribute to an adjustability essential to obtain a clear view of the operative field. The conductive pathways from break-contact terminals 313 and 314 to tool end-socket 236 are of the copper etched or printed circuit (printed or etched wiring board) type, laminated onto the non-conductive plastic tool, remaining portions of the circuit completed with wire.

Independent and Subordinated Control of a Stay Insertion Tool Auxiliary Syringe Holding Frame The stay insertion tool is ideally configured to serve as a mounting platform for tissue cement dispensers whether used in conjunction with the infixion of stays or not. Specifically, the configuration allows the operator to access a deep work site through a small incision, and the tool is ordinarily provided with a cabled lamp, fiber optic endoscope, angioscope, and/or excimer laser clipped or lashed alongside. Whereas in dependent or slave-follower use, current flows through dual interval relay module 293 and thence directly to motor 286, the switch then having circuited the current through dual interval relay module 293 and motor 286 in series, in use of auxiliary syringe holding frame 284 to discharge tissue cement or another therapeutic substance independently of the tool to which it is mounted, the circuit bypasses dual delay interval relay module 293, current flowing directly to motor 286.

As shown in FIGS. 2, 3, and 9, switch control buttons, such as slave-follower-to-independent and the reverse function switch are mounted on the outer side of thumb-ring 244. The wires run through thumb plunger rod 238 to hexagonal auxiliary syringe holding frame supporting arm and connecting cable socket 296 shown in FIGS. 13 and 14 with inset enlargement. This switch may be one of several, where each is used to control a different auxiliary device, whether a laser, suction line, or an auxiliary syringe holder. In the slave or passive follower control mode, thumb-switches 309 thru 312 seen in FIGS. 2, 3, and 9 are not used, dual interval relay module 293 locking the operation of the auxiliary syringe holding frame 284 to the stay ejection cycle of the tool in timing function.

Several miniature switch types are suitable, to include bounceless (debounced) toggle, rocker, and slide types; however, those that provide a depressible button are preferred as expeditious. As shown in FIGS. 2, 3, and 9, so that the operator can move button switches 309 thru 312 as desired, the mounting of this and other miniature switches encircle as to be slidable or shiftably clampable along and rotatable around thumb-ring 244. The mounting of thumb-switches 309 thru 312 can be by means of fastening the switch to a miniature clamp ferrule of the screw-tightened kind made, for example, by the Wenzhou Jubang Light Industry Machine Company, Wenzhou, China.

However, for quicker and less distracting repositioning midprocedurally, a spring loaded shaft or spring steel pinch-type clamp ferrule that allows instant release and reattachment is preferred to lever or screw tightened types. The bases of thumb-switches 309 thru 312 are fastened to the outer surface of the slidable clamp ferrules with an adhesive specifically chosen for the metal or polymer materials at the interface to be bonded. Lining the internal surface of the clamp ferrule with an elastomer will take up any space between the external surface of thumb-ring 244 and the facing surface of the slidable clamp ferrule, thus reducing any tendency of the switch to rock save by a completely exacting fit.

The motor or motors wired in series following dual interval relay module 293, independent control shunts the relay to control the motor or motors directly. The switch used should toggle, rock, or slide between independent and slave control positions, and additionally allow moderate thumb pressure placed upon the spring loaded switch while set to independent control to directly, that is, by shunting around dual interval relay module 293, actuate holder motor 286. Unlike a flange or straight handle index and middle finger stops, finger-rings 232 and 249 seen in FIG. 3 make it possible for the operator to remove his thumb from thumb-ring 244 to actuate switches 309 thru 312 by feel.

To this end, each of the switches 309 thru 312 are slid along thumb-ring 244 to the position of most comfort with least movement required to use these. As indicated when more auxiliary functions operated by means of an electrical switch are attached to the tool, each switch is of the same kind, any function being instantly selectable and controllable through a slight movement of the thumb. Holders can be mounted to both sides of the tool. This allows, for example, the application of medication under independent or direct operator control from the syringe or syringes to one side, and the application of tissue sealant from the syringe or syringes to the other side under tool slave-follower control.

Switches for auxiliary syringe holder 284 are mounted to the side of thumb-ring 244 to which the auxiliary syringe holder is attached, those for the side shown in FIG. 9 shown therein as 309 and 310, with those for use with a second auxiliary syringe holder attached to the other side seen in FIGS. 3 as 311 and 312. Several switches can be mounted thus and slid for convenient use by the thumb, one switch each for each auxiliary device, such as an aspirator or laser, attached to the stay insertion tool that is electrically operated. The operator chooses the side and position of the switches for greatest right or left hand comfort and clarity.

For quick connect and quick disconnect capability, the upper end of auxiliary syringe holding frame 284 supporting arm and connecting cable 290 is pressed over the lower end of syringe mixing nozzle 292 shown in FIGS. 9 and 10, and the bottom end inserted into auxiliary syringe holding frame supporting arm and connecting cable socket 296, shown in FIGS. 13 and 14. To allow socket 296 to be found instantly by touch, socket block 297 is mounted so that socket 296 stands proud at an incline from the side of the tool. Socket 296 is preferably molded integrally with, but can be bonded, using a strong and steam autoclave resistant adhesive to the rear side of inmate cement air pump and refill cartridge compartment 264, as shown in FIG. 9, a contralateral socket block if provided, bonded to the back side of the tool as depicted in FIGS. 13 and 14.

A left-hand auxiliary syringe holding frame mounted contralateral to that shown to the right in FIG. 9 also has its own delivery line running down the opposite side of the tool as depicted in FIGS. 13 and 14. Shown in FIGS. 9, auxiliary syringe holding frame 284 is connected at the right-hand side of the stay insertion tool. The stay insertion tool can provide right and left-hand line entry sockets shown as 296 in FIGS. 13 and 14 for attachment of auxiliary syringe frame 284 supporting arm and connecting cable 290 at either or both sides of the tool. Ordinarily, either supporting arm and connecting cable 290 provides a single lumen, the outflow of compatible contents from the syringes inserted into frame 284 at the moment transmitted together.

That is, compatible contents of plural auxiliary syringes can be conveyed together through the ordinarily single lumen shown in FIGS. 9 thru 12 of auxiliary syringe holding frame 284 supporting arm and connecting cable 290 connected at that respective syringe side of the stay insertion tool. Since the syringe contents to a given side of the stay insertion tool would be mixed when entering a common line, keeping these separate necessitates that line entry socket 296 and line 298 continue the luminal exclusivity and that syringes be inserted and removed from frame 284 as necessary.

Outer casing or conduit 299 shown in FIGS. 11 and 12 of auxiliary syringe frame 284 supporting arm and connecting cable 290 is not continued down to ejection slot 248, which is usually reserved for the ejection synchronized outflow of cyanoacrylate cement from pump 264. Instead, small ring nonallergenic elastic bands or small wire ties are used to position the outlet of each line about the distal or working end of the stay insertion tool.

Binding of Lines and Cables Alongside the Stay Insertion Tool

Uses of Stay Insertion Tool Mounting Clips and Bands

Stay cement coating pump 264 in FIG. 7 and line 260 in FIG. 5 to eject or emit just above ejection slot 248 beneath ejection slot-overextended delivery line 260 tip 269 is not by attachment; these are integral parts of the tool. Incorporation whether by primary molding or secondary bonding is permanent. By contrast, the lines leading down to the working end of the tool from auxiliary syringes and the cables of devices such as angioscopes, laser pointers, aspiration lines, plain water or therapeutic solution irrigation lines, excimer ablation lasers, vortex cold air guns, and so on, when necessary, must be freely attachable and detachable from the tool.

When the tool is used for a single or similar procedures, these lines and attachments are more securely attached alongside the shaft of the stay insertion tool by means of clips suitable for long-term or permanent attachment. When any of a number of different lines and cables may need to be interchangeably fastened alongside the tool, small nonallergenic elastic rings or wire ties least add to the diameter of the tool at the working end, and low in cost, can be quickly snipped off and discarded. Except for the distal cinching of the adhesive delivery lines above the stay ejection slot, which can be accomplished simply with an elastic band to allow an auxiliary line to discharge beside or with a small length of bent tubing attached at the distal end, just to the front of the slot when shifted over with the end of a probe, attachment of the delivery lines to the tool is usually by means of clips.

Clips are mounted to the sides of the insertion tool to allow the permanent or semipermanent attachment of a variety of auxiliary devices alongside, that is, in long coaxial relation to the tool shaft. These would typically include rigid borescopes or flexible fiberoptic endoscopes, angioscopes, ablation and light-activated surgical protein solder lasers, a suction (aspiration) and/or irrigation line, or a 'cooling' catheter for delivering hot or cold air from a vortex tube, or cold gas from a compressed and liquefied cold air cylinder. Vortex tube-based 'cold' air guns have onboard (internal) controls. Cabled devices usually have a cable that leads to a control console from which the cable may or may not be disconnectable, or if connectable is so at the console and remote from the tool.

When the cabled device is always needed, as when the tool is used to repeatedly perform the same procedure, the cable can be permanently fastened alongside the tool with non-quick release clips. Otherwise, unless the cable can be quickly detached from the tool or a joint introduced in the cable for connection at the top of the tool, the tool must remain tethered to the console, even when the cabled device is not in use. For most cabled devices, the introduction of a joint poses considerable expense. Rather than the introduction of a joint that would leave the distal portion of the cable permanently occupying a position on the tool, making that position unavailable for attaching any other line or cable, quick disconnectability is provided through the use of quick release clips or elastic bands.

Unlike an auxiliary syringe holder as addressed in the section of the parent application entitled Use of Commercial Syringes and Extension Tubes, controls for autonomous apparatus, at least when these are obtrusive, are not mounted on the insertion tool, the availability of an assistant assumed. Clips are more suited to use with stay insertion tools that are limited to a repeated procedure, so that the number of lines and their location relative to stay ejection slot 248 is consistent. Otherwise, small nonallergenic elastic bands are used, as addressed in the paragraph to follow. For this reason, and because clips are familiar, clips have been omitted from the drawing figures.

The number of cabled devices that can be run alongside the stay insertion tool is neither indicated by or limited to the front or side clips provided; additional devices can be mounted with tape, ties, or nonallergenic elastic bands, for example, the determinant being the need to avoid hindrance in access to the work site. Controls for lines attached to the tool that can be manipulated by touch alone and clamped directly onto the gown or to a belt. With a lamp or endoscope and cold and hot air line attached, for example, the stay insertion tool can be used to apply heat or cold to a ductus from without. Because thrombogenic temperatures cannot be avoided, doing this with an artery assumes that a platelet blocker or a vein that an anticoagulant has been administered.

However, such medication is always administered in interventional procedures, and here, because no foreign object is left in the vessel, the need for such medication should not extend beyond the periprocedural. Any lines used to deliver or remove materials from the work site arrive and depart at the top of the tool through "stay away" extended grommets of a nonallergenic elastic of the kind seen in steam irons or a wire helix as not to interfere with passing the tool through the entry wound and with the lines least obtrusive when extended over the patient to the opposite side. Fasteners for holding lines alongside the tool can be any of several types.

One is a conventional spring clutching rounded arm type clip, such as the type used to fasten wires to circuit boards, or "body clips" made, for example, by Traxxas, L.P., Plano, Texas Other types are miniature side or top acceptance cable clamps or wire phone clips made of stainless spring steel, plastic with pressure sensitive adhesive backing, multiple wire to wall fastening strips, strips of tape, or small ring gauge nonallergenic elastic bands. Of these, small bands are preferred as allowing any number of lines in any arrangement to be held against the sides of the stay insertion tool, and allowing these to be rotated about the perimeter so that the substance discharged can be made to emit at a certain location in relation to ejection slot 248.

Clips for holding can be either of two types. The first type are conventional spring clutching rounded arm types, such as the type used to fasten wires to circuit boards "body clips" made, for example, by Traxxas, L.P., Plano, Texas, or side or top acceptance clips made of stainless spring steel. The latter are made in the form of simple curved leaf springs fastened at one end by a rivet to allow rotation and having a short length to the front that is bent slightly upward to assist in lifting each spring-clip up and over the tube to be inserted beneath it.

The clips ideally include rounded arch-shaped elevations that have been sized to hold down tubes of at least the two most common size ranges, to include microcatheters and rigid endoscopes. The U-configured type spring-clip that clutches about the tube is unsuitable as little adaptive to more than minor changes in the diameter of the tube to be held. Various tubular attachments are discussed below. Stainless spring steel can be obtained from numerous companies, to include Sandvik Materials Technology, Sandviken, Sweden, and finished clips of the kind described can be provided by numerous companies, to include the Newcomb Spring Corporation, Decatur, Georgia Use of Stay Insertion Tool Side Mounting Clips to Laterally Juxtaposition (Fasten Alongside) an Endoscope An endoscope (medical borescope) or an angioscope, whether rigid or a fiberscope, with viewing end (objective lens) at the foot of the stay insertion tool can allow the working area and the functioning of the tool to be observed through a small entry wound. Approaching from outside the ductus, stay insertion is best when the insertion arc is in expansion. For work in the arterial tree, viewing the rhythm of the systoles, to which peak the insertion of the stay is best timed, is made easier. Advancement in rigid endoscopes allow a sufficient field of vision or the view to be manipulated with mirrors and/or prisms, and an inline plate with flat screen monitor and manipulation controls is ergonomically advantageous compared to the use of a video monitor. The means for adapting to a pulse that is too fast and/or irregular are addressed in the section of the parent application entitled Motional Stabilization of the Implant Insertion Site.

The diameter of such endoscopes, made, for example, by Ethicon Endosurgery, Cincinnati, Ohio, is one centimeter (see, for example, Kim, K., Kim, D., Matsumiya, K., Kobayashi, E., and Dohi, T. 2005. "Wide FOV [Field of Vision] Wedge Prism Endoscope," *Institute of Electrical and Electronics Engineers Engineering in Medicine and Biology Society Conference Proceedings* 6:5758-5761; Ryndin, I., Lukasewycz, S., Hoffman, N., Nakib, N. A., Best, S., and Monga, M. 2005. "Impact of Heads-up Display Imaging on Endoscopic Task Performance," *Journal of Endourology* 19(8):964-967; Kobayashi, E., Sakuma, I., Konishi, K., Hashizume, M., and Dohi, T. 2004. "A Robotic Wide-angle View Endoscope Using Wedge Prisms," *Surgical Endoscopy* 18(9):1396-1399; Schier, F., Beyerlein, S., and Gauderer, M. W. 2002 "Imaging for Endoscopic Surgery: New Developments Applicable to Pediatric Surgical Interventions," *Pediatric Surgery International* 18(5-6):459-462; Kobayashi, E., Daeyong, K., Sakuma, I., and Dohi, T. 2001. "A New Wide-angle View Endoscopic Robot Using Wedge Prisms," *Computer Assisted Radiology and Surgery* 1230:149-153). Some current wireless video fiberscopes (flexible boroscopes), such as the Tactical Electronics and Military Supply L.L.C., Broken Arrow, Oklahoma Model VFS 2 can be attached.

Examination of the insertion tool when not functioning smoothly is generally determined and any buildup of adhesive accomplished by withdrawal of the tool from the work area for direct viewing, which the transparency of the materials used allows. When the entry wound is large enough, the overhead lamps and head lamp should provide adequate illumination down through the entry wound, and binocular telescopes should afford sufficient magnification; however, to minimize trauma, means are applied to allow access and visibility with the least incision. Using the side mounting clips, small downward directed lamp that draws power from the internal battery can be attached to the side of the tool.

An endoscope can, however, provide a more detailed view of the work area. To allow a closer view, a conventional flexible or fiber optic endoscope with light delivery system can be affixed alongside the tool. To attach the endoscope, the clips are positioned at intervals down the sides of the stay insertion tool. The endoscope can target the ductus to receive the stay implants or to discover that adhesive is not properly applied before this becomes apparent through clogging sensed tactually, the front edge of the ejection slot roof. The roof of ejection slot stay ejection slot 248 and the sides of the insertion tool are transparent, allowing the reflective liquid adhesive to be distinguished from the flat tantalum coating of the stays.

Use of Stay Insertion Tool Side Mounting Clips to Juxtaposition (Fasten Alongside) a Vacuum (Aspiration, Suction) Line The incorporation into the stay inserter of an onboard wholly contained miniature aspirator pump to drive a closed circuit suction line with suction inlet at the foot of the tool to allow drawing a collapsed or receding near ductus wall up to the foot or sole of the inserter with the object of eliminating a piped aspiration line is discounted as constantly fouled by the entry of body fluids. Clips on the side of the stay insertion tool opposite those for the attachment of an endoscope allow a vacuum (aspiration, suction) line to be fastened alongside the tool. While the suction line is available for the conventional removal of fluid that obscures the view, its primary a means for supporting the ductus so that it can be implanted without collapsing beneath the tool as discussed in the section of the parent application entitled Arcuate Stent-stays (Stays, Stent-ribs, Ribs) or Stays for Use with Stent-jackets.

When suction works, it eliminates the need to station a muzzle-head at the level of implantation as, thus preserving a major advantage in the use of stays as opposed to miniballs. To distribute the force of suction on the outer surface of the ductus to be treated, the distal soft tip of the suction tube may be flared outward towards the sides as aligned to the long axis of the ductus. A collapsed or collapsing ductus can then be drawn up toward the sole of the tool to allow the stays to be inserted to the depth sought. The disposal of used vacuum tubes and control of the vacuum level as, for example, by means of a magnetoresistive or Hall effect flow meter, lies outside the present scope.

Bands and clips for fastening various kinds of lines, such as those of cold air gun and vacuum lines alongside the stay insertion tool are addressed in the section to follow. A small-gauge length of tubing can, for example, be secured to the side of the insertion tool with its outlet fixed in position beside the stay ejection slot. This tube can be transferred from the cold or hot air outlet of a vortex tube, or 'cold air gun,' for example, to a vacuum pump to serve as a suction (aspiration) line, for example. This can be accomplished either by redirecting or switching the proximal end of the tube through an air switch valve or by physically disconnecting the end of the tube and reconnecting it to the pump.

The couplings (joints, unions) and valves for such purpose well known. As specified in the section above entitled Turret-motor Operational Modes, reducing the mobility and the level of chemical activity in the tissue to be implanted can allow greater precision and a lessening if not the avoidance of unwanted immediate and postprocedural reactions such as swelling. Although the use of stays should not result in contact with the intima, the stabilization afforded by cold pertains to the media as well. A cold air gun or supply line in the form of a narrow hose or tube from a source of cold air allows the tissue for treatment to be stabilized.

Use of Stay Insertion Tool Side Mounting Clips to Juxtaposition (Fasten Alongside) a $CO_2$ Cylinder or Cold Air Gun Line Unlike ballistic implantation, where the exit velocity and not the restorative force of the thumb plunger rod return spring 245 in a control syringe-configured stay insertion tool as shown in FIGS. 2 and 3 or the direct tactile control of a pistol-configured tool as shown in FIG. 4 determines the force and depth of penetration, the increased hardness of the tissue has little consequence with a hand tool. Excessive or inadequate restorative force of the spring in a control syringe-configured tool is easily adjusted with the thumb. Temperature change with or without application of a supporting solution can sometimes be used to affect tissue hardness.

To counteract the retardation in the rate of curing of the tissue sealant or adhesive applied by the stay insertion tool during implantation (addressed above) that chilling would also effect, an immediate source of warm air to follow the cold air is necessary. Furthermore, an immediate remedy should be available if through human error the temperature were set so low that it would freeze and not just chill tissue. Quickly returning the tissue to a warmer temperature is accomplished by switching the air supply line from the cold to the hot outlet of the same cold air gun, existing means for accomplishing such numerous.

Provided an assistant is present, for this immediate reversibility between cold and hot temperatures, the use of a cold air gun is preferred. The unassisted use of cold gas is most easily and least divertingly obtained by fastening a medical cryospray gun, can, or $CO_2$ cartridge with attached nozzle and connector to the proximal end of a delivery line (length of catheter) clipped alongside the insertion tool. Fastening the gun or can at the side or front of the gown and allowing sufficient slack, tethering hindrance and the need for more than touch alone are virtually eliminated.

Use of Stay Insertion Tool

The use of stay insertion tool mounting clips is addressed above in separate sections. Stay retention, retraction, and recovery electromagnet 242 and magnet controls 262 are tested on a small ferrous metal object that poses the same resistance to attraction. Any auxiliary lines, whether for temperature-changing ('cooling' catheter), aspiration, or a cabled device such as an endoscope cable, lamp, or a holder and delivery line for an auxiliary dual-cartridge as addressed above in the section entitled Stay Insertion Tool Auxiliary Syringes are attached and tested. When cyanoacrylate cement is to be used, a cartridge containing acetic acid can be used first to flush through the delivery line.

As a retardant, acetic acid reduces the tendency for the cement to cake and clog at the distal tip. To avoid wasting stays, this and the step that follows must done before a clip of stays is introduced into the stay chamber (stay bay). Shown in FIG. 2, surgical cement, a fluid pharmaceutical or therapeutic, medication, tissue strengthener, binder-fixative, or hardener, or fixative refill cartridge 236 is inserted into the refill cartridge compartment 235, lower end first. Pushing the upper end of refill cartridge 236 into refill cartridge compartment 235 causes hollow tissue cement or therapeutic fluid delivery line 260 inlet hollow puncture needle 237, which protrudes up through the floor of refill cartridge compartment 235 at the inception or upper end of the surgical cement or other fluid supply line 260, to puncture the bottom of the refill cartridge 236 much as does loading a $CO_2$ cartridge into an airgun.

In FIGS. 2 and 5, tissue cement or therapeutic fluid delivery line 260 conducts fluid from fluid refill cartridge 236 down the front of the stay insertion tool to an overhang at the stay ejection slot 248. Repeatedly depressing thumb rod ring 244 and thus thumb rod 238 when rod 238 is engaged with pump piston 233—or with the pistol-configured embodiment shown in FIG. 4—repeatedly pulling trigger 261, causes cement compartment pump piston 233, to advance cement or other fluid 236 down through fluid feed line 260 in increments until cement begins to emerge at the lower or distal end of fluid feed line 260 to coat each stay as it is ejected.

The tip of the adhesive line is wiped clean with a sterile acetone-soaked cloth. To allow refill cartridge 236 to be inserted into refill cartridge compartment 235 easily, the top of refill cartridge 236 and/or upper ledge or lip of fluid refill cartridge compartment 235 interface or meet at a slight incline. Since a separate syringe can be connected directly to inlet hollow puncture needle 237 or preliminary cartridges used to prime fluid feed line 260 so that fluid will emerge with the first stay to be ejected, the capacity of refill cartridge 236 in refill cartridge compartment 235 is not governed by the volume of fluid needed to fill fluid feed line 260 before stays 231 are coated.

Such a separate syringe or multiple refill cartridges 236 can be used to preload, prime, or flush fluid feed line 260. The lower or distal portion of feed line 260 passes through the entry incision, and to allow the incision to be as small as practicable and take up the least volume of fluid from the smallest practicable refill cartridge 236, is held to the smallest usable diameter. The cyanoacrylate cement loaded is usually light in viscosity and consistent with a feed line of slightly greater than capillary diameter. If necessary, fluid feed line 260 is flushed of set cement by removal from the patient and insertion of a refill cartridge 236 in refill cartridge compartment 235 containing acetone, which is run through the line.

A cement cartridge is then fully discharged through the line before the tool is reintroduced into the patient. A clip or strip of stays 231 is inserted into stay refill cartridge compartment 250. The setting and response of dual interval relay module 293 is checked and if necessary, adjusted. Two or more stays are ejected to test the tool for properly coordinated timing between stay and cement ejection before introducing the working end of the insertion tool through the entry wound. If necessary, the adhesive ejection timing slide valve in the side of the cement air pump and refill cartridge holding chamber (cylinder) is used to adjust the moment of inception for adhesive ejection.

If the tool still does not perform correctly, the transparent tool allows the cause of malfunction to be directly observed. If used, auxiliary syringes in holding frames must be charged (filled) down to the exit tip or tips. The setting on an attached commercial tissue sealant or medication holding frame or frames must be tested, as must any other attachments used. As applicable, the timing coordination between an auxiliary syringe or syringes in relation to the stay ejection cycle and another holding frame if present must be tested to the accuracy actually needed. The amount of substance released determined by the duration of discharge, timing must be adjusted to control this factor as well as to properly coordinate the action of the holding frame or frames with that of the tool.

A small diameter endoscope and aspirator line will almost always be used and should be pretested. When the preliminary tests described below for inter- and intralaminar separation are omitted, a dental probe-hook is should still be used to evaluate the pliancy of the ductus. Upon completion of the procedure, the stay refill-strip and adhesive cartridge are removed, discarded, and inmate adhesive delivery line or tube 260 flushed through with a refill cartridge containing acetone or a commercial long chain cyanoacrylate glue remover or solvent such as Duro® Super Glue Remover, or acetone, which may be in the form of nail polish remover.

Alternatively, the line can be flushed through by placing the distal end of a tube connected to a syringe containing the solvent over stay cement supply feed line or applicator tube 260 inlet hollow puncture needle 237. The tool must always be sterilized immediately following and preceding use. Referring to FIG. 6, taking care to slip toe 253 through the entry wound (incision, portal) first, the stay insertion tool is passed through the entry wound and positioned on the ductus with toe 253 and arcuate bottom of the working end flush. The depth of implantation is set by adjusting the downward force on the ductus.

When properly employed on a ductus of the prescribed diameter for the specific tool used, setting positioning sole 254 with no more downward force than is necessary to keep the tool from shifting will achieve subadventitial placement. The attachment of a suction hose (aspiration line) as discussed in the section of the parent application entitled Use of Stay Insertion Tool Side Mounting Clips to Laterally Juxtaposition (Fasten Alongside) a Vacuum (Aspiration, Suction) Line and cold air line as discussed in the section of the parent application entitled Use of Stay Insertion Tool Side Mounting Clips to Laterally Juxtaposition (Fasten Alongside) a Cold Air Gun Line can assist in reducing any tendency for an empty ductus to collapse under the tool.

The tool can be used to direct cold or hot air at the outside of a ductus through the incision made to insert the stays and/or the stent-jacket, and since it can be quickly switched between hot and cold air (or gas), is conveniently used thus even when the intraductal implants are miniballs. Applying somewhat more force will cause the stays to enter more deeply into the media as is unavoidable should upon testing as described under the section in the parent application entitled Site-test on Extraluminal Approach for Intra- or inter-laminar Separation (Delamination) the adventitia reveal a propensity to delaminate from the subjacent tunic.

Whenever the inmate cyanoacrylate or an auxiliary syringe containing tissue sealant is used to automatically apply cement to each stay as it exits, retracting a stay that failed to enter true back into the ejection slot would introduce cement into and likely clog the ejection slot. However, once a stay has completely ejected, even though turning up the magnetic field strength (battery current) allows it to be withdrawn and retained on the tool, the stay cannot be returned to the attitude necessary to cause it to reenter into the ejection slot; gravity pulls the stay downward. precluding reverse reentry.

No attempt should be made to reenter the stay into the ejection slot, and the operator should not allow the restorative force of the thumb plunger spring to cause the stay to drop off the end of the tool before the tool has been completely withdrawn from the body and the clinging stay removed. The front of the ejection slot should then be cleaned of any cement. Any concern that the tool may not eject properly should prompt the discharge of a test stay. The amount of downward force might be quantified with a built in digital force gauge or scale; however, clinical experience is preferable, the recommendation of specific forces for variable conditions ill advised. While improbable, a ductus that slides or rolls aside despite the indented sole of the tool is stabilized with the aid of a probe.

The stay is inserted. To tamp down and seal the incision, the tool is moved slightly forward or reversed, and a slight downward force applied. If implantation is suspected to be mispositioned prior to ejection, the recovery magnet is energized to withdraw the stay and the tool tested outside the body. The operator confirms the successful sealing of each before proceeding to the next. If the ductus stay insertion incision is not sealed, the tool is removed and a long chain methacrylate adhesive introduced into the ductus stay insertion incision by means of a microcatheter as described above in the section entitled 378.3 or at the tip of a narrow probe. The stay insertion tool is tested outside the body.

In situ, transparency serves not only to improve the viewability of the work area from different angles to confirm proper contact and circumferential relation of the tool sole to the ductus surface, but with the aid of an optionally attachable endoscope, allows the stays to be observed as these pass through stay ejection slot shown in FIG. 5 as part number 248. Should the ductus t be stay-implanted be collapsed or collapse under the stay insertion tool or waver due to smooth muscle action, a vacuum (aspiration, suction) line fastened to the side of the tool opposite the endoscope is used to better stabilize and achieve the tool-ductus relation required. In some instances, an artery may require to be immobilized with a forceps or hemostat.

The invention claimed is:

1. A surgical stay system comprising:
   a stay for insertion at an insertion site beneath an outer tunic of a tubular anatomical structure having a lumen, wherein the insertion site is defined within a wall surrounding the lumen of said tubular anatomical structure,
   wherein said stays comprises a substantially elliptical band that is arcuate and convex as seen from outside the tubular anatomical structure,
   wherein said stay comprises one or more of a medication, cement, metal, polymer, radionuclide, and magnetically susceptible matter; and
   a surgical hand tool configured as a control syringe for inserting the stay, comprising:
      an upper end and a lower end opposite the upper end and defining a lumen therethrough, wherein the lower end of the surgical hand tool defines an ejection slot;
      a handle at an upper end of the control syringe defining a stationary index hole and middle finger holes defined along lateral sides of the upper end of the control syringe;
      a plunger movable between an undepressed and a depressed position, the plunger comprising an upper end that defines a thumb hole and a spring-loaded rod extending from the upper end toward a tip at a lower end of the plunger,
      wherein the spring-loaded rod is disposed within the lumen of the surgical hand tool and extends to the lower end of the surgical hand tool, wherein the tip of the spring-loaded rod comprises a flat configured to engage one of a plurality of stays contained within a spring-loaded stay cue in communication with the lumen of the surgical hand tool, wherein the spring-loaded rod is biased toward the undepressed position, wherein application of a distally-directed axial force on the spring-loaded plunger moves the plunger to the depressed position, thereby engaging the tip against the one of a plurality of stays, driving the tip and stay through the ejection slot of the surgical hand tool, and inserting the stay into the insertion site, wherein return of the plunger to the undepressed position causes another of the plurality of stays to be released from the spring-loaded stay cue into the lumen of the surgical hand tool so as to be aligned with the tip for subsequent insertions; and a retractable probe disposed alongside the spring-loaded rod and extending along a length of the surgical hand tool to the lower end of the surgical hand tool, the retractable probe being operatively connected to an electromagnet having a soft iron core, extending from the handle to the tip of the plunger, wherein the electromagnet is operatively connected to a battery in a battery compartment disposed above the electromagnet, wherein said electromagnet comprises an on-off switch configured to reversibly induce a magnetic flux within the retractable probe in order to attract the stay, thereby enabling an operator to retract the stay for repositioning.

2. The surgical stay system according to claim 1, wherein the surgical hand tool further comprises a container with a release switch configured to allow the operator to coat each stay with a viscid fluid as each stay is ejected.

3. The surgical stay system according to claim 1, further comprising:
   a mounting frame for receiving an auxiliary syringe and a motor operatively connected to the auxiliary syringe;
   wherein the surgical hand tool further comprises a mechanical socket with electrical contacts disposed on an upper side of the battery compartment, said mechanical socket configured to receive a supporting arm of the mounting frame,
   wherein said electrical contacts are configured to deliver current from said battery, thereby facilitating operative coupling with an auxiliary syringe so as to enable delivery of a tissue sealant or medication provided in the auxiliary syringe.

4. The surgical stay system according to claim 3, further comprising a dual interval delay/on-timing module,
   wherein the mechanical socket further comprises break-contact terminals configured to initiate a timing of tissue sealant and/or medication delivery by controlling the electrical current to the dual interval delay/on-timing module in slave mode, facilitating operative coupling with an auxiliary syringe so as to enable delivery of a tissue sealant or medication provided in the auxiliary syringes.

5. The surgical stay system according to claim 1, further comprising clips mounted along sides of the surgical hand tool to allow attachment of an aspiration line, scope, lamp, laser, or other miniature cabled device.

6. The surgical stay system according to claim 2, wherein the viscid fluid is a cement or an antimicrobial.

* * * * *